United States Patent [19]

Shintani et al.

[11] Patent Number: 5,721,865
[45] Date of Patent: Feb. 24, 1998

[54] INFORMATION PROCESSING APPARATUS WITH PREFETCH CONTROL FOR PREFETCHING DATA STRUCTURE FROM MEMORY THROUGH CACHE MEMORY

[75] Inventors: Yooichi Shintani, Machida; Yoshikazu Tanaka, Tokorozawa; Naohiko Irie, Kokubunji, all of Japan; William S. Worley, Jr., Denver, Colo.; B. Ramakrishna Rau, Los Altos, Calif.; Rajiv Gupta, Los Altos, Calif.; Frederic C. Amerson, Los Altos, Calif.

[73] Assignees: Hitachi, Ltd., Tokyo, Japan; Hewlett-Packard Company, Palo Alto, Calif.

[21] Appl. No.: 588,503

[22] Filed: Jan. 18, 1996

[30] Foreign Application Priority Data

Jan. 20, 1995 [JP] Japan ..................... 7-007388

[51] Int. Cl.⁶ ............................. G06F 9/34
[52] U.S. Cl. ...................... 395/464; 395/383
[58] Field of Search .................. 395/464, 800, 395/383, 381

[56] References Cited

U.S. PATENT DOCUMENTS

| | | | |
|---|---|---|---|
| 4,860,199 | 8/1989 | Langendorf et al. | 395/464 X |
| 5,327,547 | 7/1994 | Stiles et al. | 395/464 |
| 5,499,355 | 3/1996 | Krishnamohan et al. | 395/464 |
| 5,537,573 | 7/1996 | Ware et al. | 395/421.03 X |
| 5,553,254 | 9/1996 | Berstis et al. | 395/464 |

FOREIGN PATENT DOCUMENTS

| | | |
|---|---|---|
| 43 45 475 | 1/1994 | Germany . |
| 6-222990 | 12/1994 | Japan . |
| 89 06397 | 7/1989 | WIPO . |

OTHER PUBLICATIONS

"Architecture and Evaluation of Ochanomiz-1", Information Processing Institute of Japan, Computer Architecture, Nakazato et al, Aug. 20, 1993, No. 101-8, pp. 57-64., with partial English translation.

"General Purpose Fine-Grained Parallel Processor: Ochanomizu-1—Architecture and Performance Evaluation", Proceedings of Parallel Processing Symposium JSPP '94, Information Processing Institute of Japan, May 1994, Totsuka et al, pp. 70-83.

Primary Examiner—David L. Robertson
Attorney, Agent, or Firm—Fay,Sharpe,Beall,Fagan,Minnich & McKee

[57] ABSTRACT

To improve the function of a circuit for prefetching data accessed by a processor, a prefetch unit incorporates therein a circuit for issuing a request to read out one group of data to be prefetched and registers for holding the group of data read in response to the read request therein. The group of data are read out from a cache memory or a main memory under the control of a cache request unit. A plurality of groups of data can be prefetched. When data designation is made, the processor requests the cache memory to read a block to which the data to be prefetched belongs. A circuit is also included in the prefetch unit, wherein when prefetched data is subsequently updated by the processor, its updated data is made invalid. Elements of a vector complex in structure, such as an indexed vector or the like can be also read out. It is also possible to cope with an interrupt generated within the processor.

15 Claims, 28 Drawing Sheets

FIG. 13Aa
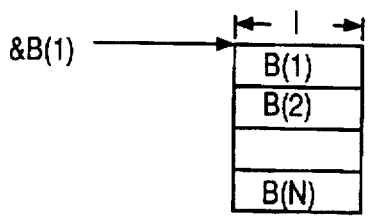
FIG. 13Ab
```
DO 10 I=1,N
10    =B(I)
```
FIG. 13Ac
```
DO 10 I=1, N, 5
10    =B(I)
```
FIG. 13Ba
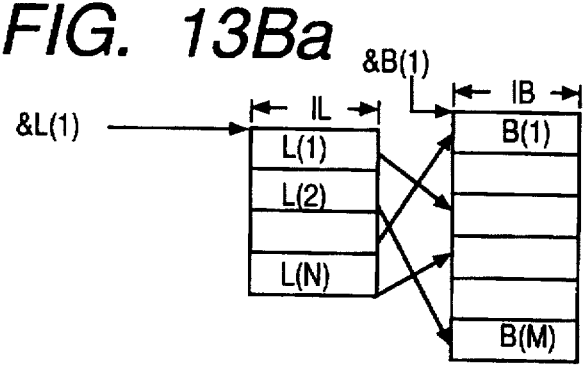
FIG. 13Bb
```
DO 10 I=1, N
10    =B(L(I))
```
FIG. 13Ca
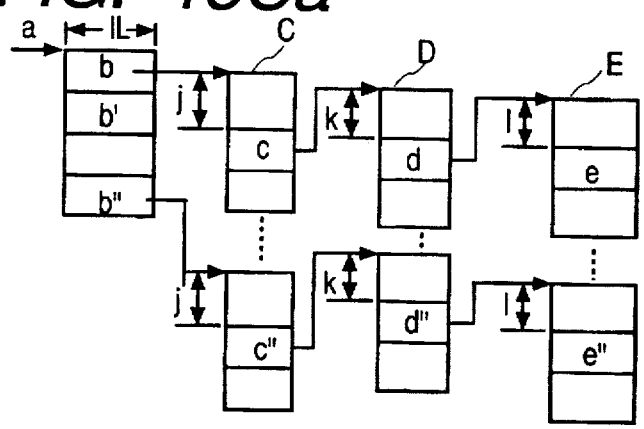
FIG. 13Cb
```
for(i=0;i<s*n;i+=s)
  b=*(a+i);
  c=*(b+j);
  d=*(c+k);
  e=*(d+l);
```
FIG. 13Da
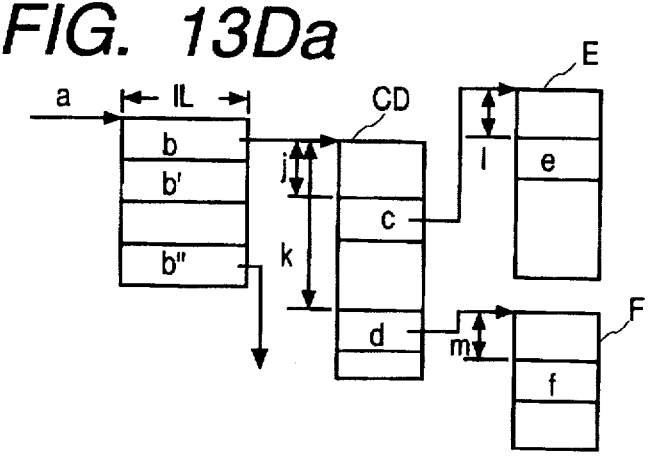
FIG. 13Db
```
for(i=0;i<s*n;i+=s)
  b=*(a+i);
  c=*(b+j);
  d=*(b+k);
  e=*(c+l);
  f=*(d+m);
```

FIG. 14

302 PREFETCH CONTROL REGISTER (PCR)

FIG. 14A

| bit<br>Byte | 0 | 1 | 2 | 3 | 4 | 5 | 6 | 7 |
|---|---|---|---|---|---|---|---|---|
| 0 | VLD | ACT | ORG | / | DL | DL | LA | SKIP |
| 1 | BUF | IID | IID | IID | IID | IID | IID | IID |
| 2 | PDRTP | | | | | | | |
| 3 | BAL | | | | | | | |
| 4 | MOE | | | | NR | NR | NR | NR |
| 5 | LAC | | | | | | | |
| 6 | PDROP | | | | | | | |
| 7 | RDC | | | | | | | |

FIG. 14B

| bit<br>Byte | 0 | 1 | 2 | 3 | 4 | 5 | 6 | 7 |
|---|---|---|---|---|---|---|---|---|
| 0 | | | | | | | | |
| 1 | | | | | | | | |
| 2 | | | | | | | | |
| 3 | | | | PFA | | | | |
| 4 | | | | | | | | |
| 5 | | | | | | | | |
| 6 | | | | | | | | |
| 7 | | | | | | | | |

FIG. 14C

| bit<br>Byte | 0 | 1 | 2 | 3 | 4 | 5 | 6 | 7 |
|---|---|---|---|---|---|---|---|---|
| 0 | | | | | | | | |
| 1 | | | | | | | | |
| 2 | | | | | | | | |
| 3 | | | | MOD | | | | |
| 4 | | | | | | | | |
| 5 | | | | | | | | |
| 6 | | | | | | | | |
| 7 | | | | | | | | |

FIG. 14D

| bit<br>Byte | 0 | 1 | 2 | 3 | 4 | 5 | 6 | 7 |
|---|---|---|---|---|---|---|---|---|
| 0 | LL | | | | LPCR | LPCR | LPCR | LPCR |
| 1 | PDRQP | | | | | | | |
| 2 | | | | | | | | |
| 3 | SKIPCNT | | | | | | | |
| 4 | SKIPP | | | | | | | |
| 5 | | | | | | | | |
| 6 | SKIPGAP | | | | | | | |
| 7 | | | | | | | | |

FIG. 16A
```
         DO 10 J=1,199
         DO 10 I=1,99
10           =A(I,J)
```
FIG. 16B
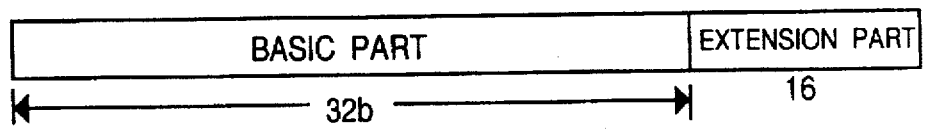
FIG. 17A
| BASIC PART | EXTENSION PART |
|---|---|
| ←—— 32b ——→ | 16 |
FIG. 17B
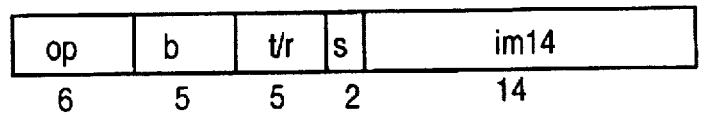
FIG. 17C
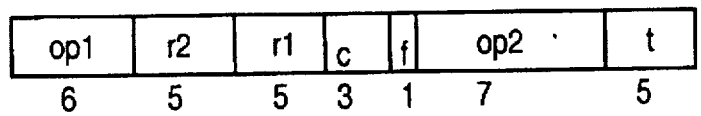
FIG. 17D
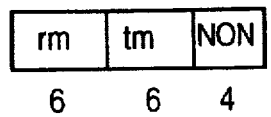
FIG. 18

example.
DO 10 I=5,N
 =A(I-4)
 A(I)=
10 CONTINUE

| ROW | FIRST COLUMN | SECOND COLUMN | THIRD COLUMN |
|---|---|---|---|
| 1) Loop | [MR2]Fload (GR12) ->FR2; B(I) | [MR3]And MR3, MR10 -> MR3 | [MR4]Fstore FR4 -> (GR13); A(I+2) |
| 2) | [MR2]Add GR12+d1 -> GR12 | [MR1]Set 1 to MR3 | [MR4]Add GR13+d2 -> GR13 |
| 3) | - | [MR1]And MR3, MR10 -> MR3 | [MR4]And MR4, MR10 -> MR4 |
| 4) | - | [MR3]Fload (GR12) ->FR3; B(I+1) | [MR1]Set 1 to MR4 |
| 5) | [MR2]Fstore FR2 -> (GR13); A(I) | [MR3]Add GR12+d1 -> GR12 | [MR1]And MR4, MR10 -> MR4 |
| 6) | [MR2]Add GR13+d2 -> GR13 | - | [MR4]Fload (GR12) ->FR4; B(I+2) |
| 7) | [MR1]Compare GR12 < max -> MR10 | - | [MR4]Add GR12+d1 -> GR12 |
| 8) | [MR2]And MR2, MR10 -> MR2 | [MR3]Fstore FR3 -> (GR13); A(I+1) | - |
| 9) | - | [MR3]Add GR13+d2 -> GR13 | - |
| 10) | Branch to Loop if MR10=1 | | |

FIG. 24

| ROW | FIRST COLUMN | SECOND COLUMN | THIRD COLUMN |
|---|---|---|---|
| 1) Loop | [MR2]Fload (GR12) ->FR2; B(I) | [MR3]And MR3, MR10 -> MR3 | |
| 2) | [MR2]Add GR12+d1 -> GR12 | [MR1]Set 1 to MR3 | |
| 3) | . | [MR1]And MR3, MR10 -> MR3 | |
| 4) | . | [MR3]Fload (GR12) ->FR3; B(I+1) | |
| 5) | [MR2]Fstore FR2 -> (GR13); A(I) | [MR3]Add GR12+d1 -> GR12 | [MR4]Fstore FR4 -> (GR13); A(I+2) |
| 6) | [MR2]Add GR13+d2 -> GR13 | . | [MR4]Add GR13+d2 -> GR13 |
| 7) | [MR1]Compare GR12 < max -> MR10 | . | [MR4]And MR4, MR10 -> MR4 |
| 8) | [MR2]And MR2, MR10 -> MR2 | [MR3]Fstore FR3 -> (GR13); A(I+1) | [MR1]Set 1 to MR4 |
| 9) | . | [MR3]Add GR13+d2 -> GR13 | [MR1]And MR4, MR10 -> MR4 |
| 10) | Branch to Loop if MR10=1 | . | [MR4]Fload (GR12) ->FR4; B(I+2) |
| 11) | [MR2]Fload (GR12) ->FR2; B(I) | . | [MR4]Add GR12+d1 -> GR12 |
| 12) | [MR2]Add GR12+d1 -> GR12 | [MR3]And MR3, MR10 -> MR3 | . |
| 13) | . | [MR1]Set 1 to MR3 | . |
| 14) | . | [MR1]And MR3, MR10 -> MR3 | . |
| 15) | [MR2]Fstore FR2 -> (GR13); A(I) | [MR3]Fload (GR12) ->FR3; B(I+1) | [MR4]Fstore FR4 -> (GR13); A(I+2) |
| 16) | [MR2]Add GR13+d2 -> GR13 | [MR3]Add GR12+d1 -> GR12 | [MR4]Add GR13+d2 -> GR13 |
| 17) | [MR1]Compare GR12 < max -> MR10 | . | [MR4]And MR4, MR10 -> MR4 |
| 18) | [MR2]And MR2, MR10 -> MR2 | . | [MR1]Set 1 to MR4 |
| 19) | . | [MR3]Fstore FR3 -> (GR13); A(I+1) | [MR1]And MR4, MR10 -> MR4 |
| 20) | Branch to Loop if MR10=1 | [MR3]Add GR13+d2 -> GR13 | [MR4]Fload (GR12) ->FR4; B(I+2) |
| | | | [MR4]Add GR12+d1 -> GR12 |

(NOTE) INITIAL VALUES OF MASK REGISTERS : MR2=1, MR3=MR4=0

TERMS INSIDE ☐ ARE EXECUTED AND OTHERS ARE SUPPRESSED

FIG. 25

| ROW | FIRST COLUMN | SECOND COLUMN | THIRD COLUMN |
|---|---|---|---|
| 21) | [MR2]Fload (GR12) ->FR2; B(I) | | |
| 22) | [MR2]Add GR12+d1 -> GR12 | [MR3]And MR3, MR10 -> MR3 | |
| 23) | - | [MR1]Set 1 to MR3 | |
| 24) | | [MR1]And MR3, MR10 -> MR3 | [MR4]Fstore FR4 -> (GR13); A(I+2) |
| 25) | [MR2]Fstore FR2 -> (GR13); A(I) | [MR3]Fload (GR12) ->FR3; B(I+1) | [MR4]Add GR13+d2 -> GR13 |
| 26) | [MR2]Add GR13+d2 -> GR13 | [MR3]Add GR12+d1 -> GR12 | [MR4]And MR4, MR10 -> MR4 |
| 27) | [MR1]Compare GR12 < max -> MR10 | - | [MR1]Set 1 to MR4 |
| 28) | [MR2]And MR2, MR10 -> MR2 | - | [MR1]And MR4, MR10 -> MR4 |
| 29) | | [MR3]Fstore FR3 -> (GR13); A(I+1) | [MR4]Fload (GR12) ->FR4; B(I+2) |
| 30) | Branch to Loop if MR10=1 | [MR3]Add GR13+d2 -> GR13 | [MR4]Add GR12+d1 -> GR12 |

| ROW | FIRST COLUMN | SECOND COLUMN | THIRD COLUMN |
|---|---|---|---|
| 1) | Loop [MR2]Load (GR10) ->GR2; L(l) | - | [MR4]Add GR10+d1 -> GR10 |
| 2) | [MR2]Add GR10+d1 -> GR10 | - | - |
| 3) | - | [MR3]Fstore FR3 -> (GR13); A(l+1) | - |
| 4) | - | [MR3]Add GR13+d2 -> GR13 | - |
| 5) | - | - | - |
| 6) | - | [MR1]Set 1 to MR3 | [MR4]Shift&Add GR4,GR11 -> GR12 |
| 7) | [MR2]Shift&Add GR2,GR11 -> GR12 | [MR1]And MR3, MR10 -> MR3 | [MR4]Fload (GR12) ->FR4; B(L(l+2)) |
| 8) | [MR2]Fload (GR12) ->FR2; B(L(l)) | [MR3]Load (GR10) ->GR3; L(l+1) | - |
| 9) | - | [MR3]Add GR10+d1 -> GR10 | - |
| 10) | - | - | - |
| 11) | [MR2]Fstore FR2 -> (GR13); A(l) | - | [MR4]Fstore FR4 -> (GR13); A(l+2) |
| 12) | [MR2]Add GR13+d2 -> GR13 | - | [MR4]Add GR13+d2 -> GR13 |
| 13) | [MR1]Compare GR10<max -> MR10 | - | - |
| 14) | [MR2]And MR2, MR10 -> MR2 | [MR3]Shift&Add GR3,GR11 -> GR12 | [MR1]Set 1 to MR4 |
| 15) | - | [MR3]Fload (GR12) ->FR3; B(L(l+1)) | [MR1]And MR4, MR10 -> MR4 |
| 16) | Branch to Loop if MR10=1 | - | [MR4]Load (GR10) ->GR4; L(l+2) |

FIG. 28

| ROW | FIRST COLUMN | SECOND COLUMN | THIRD COLUMN |
|---|---|---|---|
| 1) Loop | [MR2]Load (GR10) ->GR2; L(I) | | |
| 2) | [MR2]Add GR10+d1 -> GR10 | | [MR4]Add GR10+d1 -> GR10 |
| 3) | - | - | - |
| 4) | - | [MR3]Fstore FR3 -> (GR13); A(I+1) | - |
| 5) | - | [MR3]Add GR13+d2 -> GR13 | - |
| 6) | [MR2]Shift&Add GR2,GR11 -> GR12 | [MR1]Set 1 to MR3 | [MR4]Shift&Add GR4,GR11 -> GR12 |
| 7) | [MR2]Fload (GR12) ->FR2; B(L(I)) | [MR1]And MR3, MR10 -> MR3 | [MR4]Fload (GR12) ->FR4; B(L(I+2)) |
| 8) | - | [MR3]Load (GR10) ->GR3; L(I+1) | - |
| 9) | - | [MR3]Add GR10+d1 -> GR10 | - |
| 10) | [MR2]Fstore FR2 -> (GR13); A(I) | - | [MR4]Fstore FR4 -> (GR13); A(I+2) |
| 11) | [MR2]Add GR13+d2 -> GR13 | - | [MR4]Add GR13+d2 -> GR13 |
| 12) | - | - | - |
| 13) | [MR1]Compare GR10<max -> MR10 | [MR3]Shift&Add GR3,GR11 -> GR12 | [MR1]Set 1 to MR4 |
| 14) | [MR2]And MR2, MR10 -> MR2 | [MR3]Fload (GR12) ->FR3; B(L(I+1)) | [MR1]And MR4, MR10 -> MR4 |
| 15) | - | - | [MR4]Load (GR10) ->GR4; L(I+2) |
| 16) | Branch to Loop if MR10=1 | - | - |

(NOTE) INITIAL VALUES OF MASK
REGISTERS SR2=1,MR3=MR4=0

TERMS INSIDE ☐ ARE EXECUTED AND OTHERS ARE SUPPRESSED

FIG. 29

| ROW | FIRST COLUMN | SECOND COLUMN | THIRD COLUMN |
|---|---|---|---|
| 17) | [MR2]Load (GR10) ->GR2; L(I) | - | - |
| 18) | [MR2]Add GR10+d1 -> GR10 | - | [MR4]Add GR10+d1 -> GR10 |
| 19) | - | - | - |
| 20) | - | [MR3]Fstore FR3 -> (GR13); A(I+1) | - |
| 21) | - | [MR3]Add GR13+d2 -> GR13 | - |
| 22) | [MR2]Shift&Add GR2,GR11 -> GR12 | - | - |
| 23) | [MR2]Fload (GR12) ->FR2; B(L(I)) | [MR1]Set 1 to MR3 | - |
| 24) | - | [MR1]And MR3, MR10 -> MR3 | - |
| 25) | - | [MR3]Load (GR10) ->GR3; L(I+1) | [MR4]Shift&Add GR4,GR11 -> GR12 |
| 26) | - | [MR3]Add GR10+d1 -> GR10 | [MR4]Fload (GR12) ->FR4; B(L(I+2)) |
| 27) | [MR2]Fstore FR2 -> (GR13); A(I) | - | - |
| 28) | [MR2]Add GR13+d2 -> GR13 | - | [MR4]Fstore FR4 -> (GR13); A(I+2) |
| 29) | [MR1]Compare GR10<max -> MR10 | - | [MR4]Add GR13+d2 -> GR13 |
| 30) | [MR2]And MR2, MR10 -> MR2 | [MR3]Shift&Add GR3,GR11 -> GR12 | [MR1]Set 1 to MR4 |
| 31) | - | [MR3]Fload (GR12) ->FR3; B(L(I+1)) | [MR1]And MR4, MR10 -> MR4 |
| 32) | Branch to Loop if MR10=1 | - | [MR4]Load (GR10) ->GR4; L(I+2) |

FIG. 31

| ROW | FIRST COLUMN | SECOND COLUMN | THIRD COLUMN |
|---|---|---|---|
| 1) Loop | [MR2]Load (GR10) ->GR2; L(I) | - | - |
| 2) | [MR2]Add GR10+d1 -> GR10 | - | [MR4]Add GR10+d1 -> GR10 |
| 3) | - | [MR3]Fstore FR3 -> (GR13); A(I+1) | - |
| 4) | - | [MR3]Add GR13+d2 -> GR13 | - |
| 5) | [MR2]Compare GR2 > 0 -> MR6 | [MR1]Set 1 to MR3 | [MR4]Compare GR4 > 0 -> MR8 |
| 6) | [MR2]And MR2, MR6 -> MR2 | [MR1]And MR3, MR10 -> MR3 | [MR4]And MR4, MR8 -> MR4 |
| 7) | [MR2]Shift&Add GR2,GR11 -> GR12 | [MR3]Load (GR10) ->GR3; L(I+1) | [MR4]Shift&Add GR4,GR11 -> GR12 |
| 8) | [MR2]Fload (GR12) ->FR2; B(IX) | [MR3]Add GR10+d1 -> GR10 | [MR4]Fload (GR12) ->FR4; B(IX) |
| 9) | - | - | - |
| 10) | [MR2]Fstore FR2 -> (GR13); A(I) | - | [MR4]Fstore FR4 -> (GR13); A(I+2) |
| 11) | [MR2]Add GR13+d2 -> GR13 | - | [MR4]Add GR13+d2 -> GR13 |
| 12) | [MR1]Compare GR10 < max -> MR10 | [MR3]Compare GR3 > 0 -> MR7 | - |
| 13) | [MR2]And MR2, MR10 -> MR2 | [MR3]And MR3, MR7 -> MR3 | [MR1]Set 1 to MR4 |
| 14) | - | [MR3]Shift&Add GR3,GR11 -> GR12 | [MR1]And MR4, MR10 -> MR4 |
| 15) | - | [MR3]Fload (GR12) ->FR3; B(IX) | [MR4]Load (GR10) ->GR4; L(I+2) |
| 16) | Branch to Loop if MR10=1 | - | - |

FIG. 32

| ROW | FIRST COLUMN | SECOND COLUMN | THIRD COLUMN |
|---|---|---|---|
| 1) Loop | [MR2]Load (GR10) ->GR2; L(I) | | |
| 2) | [MR2]Add GR10+d1 -> GR10 | | |
| 3) | - | | |
| 4) | - | [MR3]Fstore FR3 -> (GR13); A(I+1) | |
| 5) | [MR2]Compare GR2 > 0 -> MR6 | [MR3]Add GR13+d2 -> GR13 | |
| 6) | [MR2]And MR2, MR6 -> MR2 | [MR1]Set 1 to MR3 | |
| 7) | [MR2]Shift&Add GR2,GR11 -> GR12 | [MR1]And MR3, MR10 -> MR3 | |
| 8) | [MR2]Fload (GR12) ->FR2; B(IX) | [MR3]Load (GR10) ->GR3; L(I+1) | |
| 9) | - | [MR3]Add GR10+d1 -> GR10 | |
| 10) | [MR2]Fstore FR2 -> (GR13); A(I) | - | [MR4]Fstore FR4 -> (GR13); A(I+2) |
| 11) | [MR2]Add GR13+d2 -> GR13 | [MR3]Compare GR3 > 0 -> MR7 | [MR4]Add GR13+d2 -> GR13 |
| 12) | [MR1]Compare GR10 <max -> MR10 | [MR3]And MR3, MR7 -> MR3 | |
| 13) | [MR2]And MR2, MR10 -> MR2 | [MR3]Shift&Add GR3,GR11 -> GR12 | |
| 14) | | [MR3]Fload (GR12) ->FR3; B(IX) | |
| 15) | | - | [MR1]Set 1 to MR4 |
| | | | [MR1]And MR4, MR10 -> MR4 |
| | | | [MR4]Load (GR10) ->GR4; L(I+2) |
| 16) | Branch to Loop if MR10=1 | | |

(NOTE) INITIAL VALUES OF MASK REGISTERS
MR2=1,MR3=MR4=0

TERMS INSIDE ▢ ARE EXECUTED AND OTHERS ARE SUPPRESSED

FIG. 33

| ROW | FIRST COLUMN | SECOND COLUMN | THIRD COLUMN |
|---|---|---|---|
| 17) | [MR2]Load (GR10) ->GR2; L(I) | - | [MR4]Add GR10+d1 -> GR10 |
| 18) | [MR2]Add GR10+d1 -> GR10 | - | - |
| 19) | - | [MR3]Fstore FR3 -> (GR13); A(I+1) | - |
| 20) | - | [MR3]Add GR13+d2 -> GR13 | - |
| 21) | [MR2]Compare GR2 > 0 -> MR6 | - | [MR4]Compare GR4 > 0 -> MR8 |
| 22) | [MR2]And MR2, MR6 -> MR2 | [MR1]Set 1 to MR3 | [MR4]And MR4, MR8 -> MR4 |
| 23) | [MR2]Shift&Add GR2,GR11 -> GR12 | [MR1]And MR3, MR10 -> MR3 | [MR4]Shift&Add GR4,GR11 -> GR12 |
| 24) | [MR2]Fload (GR12) ->FR2; B(IX) | [MR3]Load (GR10) ->GR3; L(I+1) | [MR4]Fload (GR12) ->FR4; B(IX) |
| 25) | - | [MR3]Add GR10+d1 -> GR10 | - |
| 26) | - | - | - |
| 27) | [MR2]Fstore FR2 -> (GR13); A(I) | - | [MR4]Fstore FR4 -> (GR13); A(I+2) |
| 28) | [MR2]Add GR13+d2 -> GR13 | [MR3]Compare GR3 > 0 -> MR7 | [MR4]Add GR13+d2 -> GR13 |
| 29) | [MR1]Compare GR10 <max -> MR10 | [MR3]And MR3, MR7 -> MR3 | - |
| 30) | [MR2]And MR2, MR10 -> MR2 | [MR3]Shift&Add GR3,GR11 -> GR12 | [MR1]Set 1 to MR4 |
| 31) | - | [MR3]Fload (GR12) ->FR3; B(IX) | [MR1]And MR4, MR10 -> MR4 |
| 32) | Branch to Loop if MR10=1 | - | [MR4]Load (GR10) ->GR4; L(I+2) |

INFORMATION PROCESSING APPARATUS WITH PREFETCH CONTROL FOR PREFETCHING DATA STRUCTURE FROM MEMORY THROUGH CACHE MEMORY

BACKGROUND OF THE INVENTION

The present invention relates to an information processing apparatus for prefetching a group of data having a specific structure, such as an array data, etc. from a memory such as a main memory or the like.

A conventional high-performance information processing apparatus normally includes an instruction processing device, a cache and a memory. The information processing apparatus causes the memory to store a program and ata therein and processes the data in the memory in accordance with each instruction described in the program. The cache is a memory having a short access time when accessed by the instruction processing device and that is relatively small in capacity, which temporarily stores some of the programs and data therein. Data necessary for the execution of the instruction are read from the memory. A data block inclduing the data is also copied into one of the cache lines. When an access or reference to the data in the block is designated subsequently, the cache line is accessed for the data. The transfer of the data block from the memory to the cache line is called block or line transfer. When no necessary data exists in the cache upon instruction execution, this is called cache miss. When the cache miss occurs, the line transfer is executed. In the conventional information processing apparatus, when the line transfer occurs with the instruction execution, the execution of the instruction is placed in a waiting state until the line transfer is completed. Thus, when the cache miss frequently occurs, a problem arises that the time required to execute the program increases due to the waoiting of completion of the line transfer and the information processing apparatus is reduced in processing performance. The problem is serious with a program which executes technical calculations for handling large-scale data or with a program for database processing in particular.

On the other hand, an attempt to avoid a decrease in performance incident to the line transfer by executing a special instruction for designating look-ahead to data prior to an instruction having a possibility of inducing a cache miss to the data (that is, an instruction which accesses the data) has been recently made to a program. The data look-ahead is also called a data prefetch or simply called prefetch. A memory access instruction (hereinafter called load GR0 type prefetch instruction) to a general purpose register 0 number) is used as one means for realizing the preftech mentioned above in a microprocessor PA7100 of U.S. Hewlett-Packard Company (hereinafter may be called first prior art). The load GR0 type prefetch instruction reads out data located in a designated operand address and the read out data is stored in the cache, but the read out data is abandoned after its readout, that is, the read out data is not stored in any register accessible by an instruction. When a cache miss occurs at execution of the instruction, the line transfer is executed. Thus, since the data is held in the cache when the instruction for accessing the data is executed later on, the degradation in performance can be avoided.

When, however, the prefetch instruction is used, four problems to be described below arise. The first problem is that when, for example, a program having a loop structure, which successively refer to or accesses vector data, is executed using the prefetch, it is necessary to execute two instructions comprising a memory access instruction for loading data into a register storing an operand therein and the prefetch instruction with respect to one vector element, thereby causing an increase in instruction processing time correspondingly. Assuming now that codes obtained by adding the prefetch instruction to a program at which large amounts of data are held in a cache, are executed, there is the potential that an instruction processing time increases as compared with a program no added with the prefetch instruction and the performance is degraded on the contrary.

The second problem is that when the execution of the program is placed in a waiting state due to some causes since the prefetch instruction is described in the program, the execution of the prefetch instruction, itself is also placed in a waiting state, thereby reducing an effect brought about by prefetching that data reading is started as earlier as possible. In order to avoid this, the prefetch instruction is required to be issued at the time so earlier than that at its corresponding memory access instruction. However, this will cause a problem that the corresponding program is rendered complex in structure and the size of the program is increased.

The third problem is that since large-scale vector data are successively loaded or captured into a cache under to the load GR0 type prefetch instruction, other data already stored in the cache are expelled therefrom, thereby causing the potential that a cache miss increases and consequently the performance of the information processing apparatus is degraded.

The fourth problem is that since a data access is performed in line units of the cache under the load GR0 type prefetch, even non-accessed data are read where the data access is applied to the access of non-contiguous vector data, thereby causing a reduction in performance.

As other prior art, there has been proposed a technique for providing a prefetch unit which is initially set by a processor and subsequently reads out data in asynchronism with the processor. Refer to, for example, Nakazato et al, "Architecture and evaluation of OCHANOMIZ-1", Research Report by Information Processing Institute of Japan, Computer Architecture, No. 101-8, pp. 57–64, Aug. 20, 1993. The technique described in the literature may be called second prior art. A technique for prefetching array data by every processor in a system having a plurality of processors has been disclosed in the prior art. Namely, a technique is disclosed wherein prefetch controllers for the processors prefetch a plurality of elements in array data in accordance with addresses, strides, lengths of the array data to be prefetched, which are designated by the respective processors and the elements are respectively stored in prefetch buffers provided so as to correspond to the processors. Another report on the same machine is discribed in Totsuka et al, "General purpose fine-grained parallel processor: OCHANOMIZU-1-Architecture and Performance Evaluation-", in Proc. of Parallel processing symposium JSPP '94, pp. 70–83, May 1994 by Information processing Institute of Japan.

SUMMARY OF THE INVENTION

According to the second prior art, the problems described in connection with the first prior art are reduced. However, the following problems arise upon realization of the second prior art.

In the second prior art, a cache memory for holding data stored in a main storage is disclosed so as to correspond to each processor. However, no description will be made of how to use the cache memory upon prefetching data by the prefetch unit.

Further, in the second prior art, a technique for prefetching a plurality of data having addresses separated from one another at predetermined address intervals as in the case of the plurality of data in the above array, is simple disclosed. However, data, like elements of an indexed vector, whose addresses are determined by other group of data, also exist within a group of data processed by a program.

Other various problems to be solved are involved in the second prior art to put the second prior art into practical use.

An object of the present invention is to solve the problems of the second prior art and provide an information processing apparatus having a prefetch circuit with a higher function.

A more specific object of the present invention is to provide an information processing apparatus capable of speeding up prefetching by skillfully utilizing a cache memory in a memory such as a main memory or the like.

An another object of the present invention is to provide an information processing apparatus capable of prefetching a plurality of groups of data.

A further object of the present invention is to provide an information processing apparatus capable of prefetching a group of data forming an indexed vector.

A still further object of the present invention is to provide an information processing apparatus which has solved other practical problems involved in the second prior art referred to above.

According to a first invention of the present application, for achieving the above objects, a prefetch data request circuit for successively outputting a group of read requests made to a group of data to a cache control circuit for controlling accesses to a cache memory and successively storing a group of data supplied responsive to the group of read requests in a group of sequentially-ordered storage regions provided within a circuit for prefetching the group of data to be prefetched requested from a processor, is provided as a circuit activated to prefetch the group of data.

Further, the cache control circuit includes, as circuits activated upon prefetching the group of data, a circuit for transferring any of the group of data designated by the group of read requests from the cache memory to the prefetch circuit when any of the group of data is held in the cache memory, and a prefetch data read request circuit for requesting the storage control circuit to read at least data designated by any of the group of prefetch data read requests from the storage device when the designated data is not held in the cache memory.

The storage device control circuit includes a storage device access circuit for supplying data designated by a request issued from the prefetch data request circuit to the prefetch circuit.

Further, the prefetch circuit includes therein, as a circuit activated when the processor utilizes the group of already prefetched data, a prefetch data supply circuit for detecting whether data designated by the data read request issued from the processor is held in the group of storage regions and for transferring, when the designated data is held in the group of storage regions, the held data to the processor.

Thus, when the prefetch circuit requests the data held within the cache memory upon prefetching the group of data, the data can be supplied from the cache memory to the prefetch circuit, thereby making it possible to prefetch the data at high speed.

In a more preferred embodiment of the present invention, a data transfer prohibit circuit, which prohibits the cache control circuit from transferring the designated data from the cache memory to the processor when the designated data is held in the group of storage regions, is provided within the prefetch circuit.

According to a second invention of the present application, the same data is held in both a cache memory and a prefetch circuit. When, however, a processor uses prefetched data subsequently, the prefetch circuit provides the processor with the data and the prohibit circuit prohibits the cache memory from providing it with the data. As a result, the same data can be prevented from being doubly supplied to the processor. Further, the prefetch circuit can properly manage whether or not the prefetched data has been read into the processor.

In other preferred embodiment of the present invention, when any of the group of data each subjected to a data prefetch request does not exist within the cache memory, a circuit for requesting the cache memory to transfer a block including the data is provided within the cache control circuit. Thus, when other data that belong to the block, exist as plural within the group of data requested by the processor, prefetching of other data can be performed at high speed using the data within the transferred block. However, there is also potential that the number of data that simultaneously belong to the same block, of a plurality of data constituting a group of data to be prefetched, is zero or less provided. In this case, the third and fourth problems described in the first prior art referred to above arise. Thus, in the more preferred embodiment of the present invention, a circuit is provided which controls whether or not to perform the block transfer in dependence on information designated as some of the data prefetch requests by the processor.

In the second invention of the present application as well, a circuit for supplying a plurality of data prefetch requests for designating, as some of the data prefetch requests, numbers for base registers used to calculate addresses of a group of data to be prefetched, to the prefetch circuit, is provided within the processor to allow a plurality of groups of data to be prefetched.

The prefetch circuit includes therein:

a plurality of groups of sequentially-ordered storage regions each used for a group of prefetched data;

a circuit responsive to each of a plurality of data prefetch requests issued by the processor, for assigning one group of storage regions within the plurality of groups of storage regions;

a circuit for storing therein, in correspondence to each group of storage regions, a base register number designated by a data prefetch request which has been assigned to each group of storage regions; and a circuit for storing therein, a base register number designated by a data prefetch request which has been assigned to each group of storage regions.

Thus, the plurality of groups of storage regions are associated with different base register numbers designated by different data prefetch requests.

Further, a circuit for supplying, in case each data read request is supplied to the prefetch circuit in response to a data read instruction for requesting the storage device to read data, a base register number designated by the instruction to the prefetch circuit as part of the data read requests, is provided within the processor.

The prefetch circuit includes therein:

a circuit responsive to a data read request issued from the processor, for detecting, based on a base register number stored so as to correspond to each group of storage regions, whether a group of storage regions assigned to a data prefetch request that has designated a base register number designated by the data read request, exist; and a prefetch data supply circuit for transferring, in case a group of storage regions assigned to a base register designated by the data read request exist, the prefetched data held in the group of storage regions to the processor.

Thus, after a plurality of groups of data have been prefetched and the prefetched data have been held in the prefetch circuit, the plurality of groups of storage regions can be utilized by different base register numbers designated by different data read requests executed by the processor.

Further, according to a third invention of the present application, a circuit for firstly prefetching other data group used as an index for an indexed vector in order to prefetch a group of data forming the indexed vector, holding same within a prefetch circuit and prefetching the group of data using other data group, is provided within the prefetch circuit. Thus, the indexed vector can be prefetched by using the prefetch circuit.

Furthermore, according to other invention of the present application, an information processing apparatus is provided which has solved other problems.

BRIEF DESCRIPTION OF THE DRAWINGS

FIG. 13A*a* shows a structure of a sequential vector to be prefetched, which are obtained by the information processing apparatus shown in FIG. 1.

FIG. 13A*b* shows a program for contiguous access of the sequential vector.

FIG. 13A*c* shows a program for stride access of the sequential vector.

FIG. 13B*a* shows a structure of an indexed vector to be prefetched, which are obtained by the information processing apparatus shown in FIG. 1.

FIG. 13B*b* shows a program for accessing the indexed vector.

FIG. 13C*a* shows a structure of an array of simple linked lists to be prefetched, which are obtained by the information processing apparatus shown in FIG. 1.

FIG. 13C*b* shows a program for accessing the array of simple linked lists.

FIG. 13D*a* shows a structure of an array of trees to be prefetched, which are obtained by the information processing apparatus shown in FIG. 1.

FIG. 13D*b* shows a program for accessing the array of trees.

FIG. 14A shows the configuration of the first group of a prefetch control register employed in the information processing apparatus shown in FIG. 1.

FIG. 14B shows the configuration of the second group of the prefetch control register.

FIG. 14C shows the configuration of the third group of the prefetch control register.

FIG. 14D shows the configuration of the fourth group of the prefetch control register.

FIG. 16A shows an example of a source code used to access a two-dimensional array employed in the information processing apparatus shown in FIG. 1.

FIG. 16B shows an example of a two-dimensional array accessed by the source code.

FIG. 17A shows a general format for instructions employed in the information processing apparatus shown in FIG. 1.

FIG. 17B shows a format of a basic part of a memory access instruction employed in the information processing apparatus shown in FIG. 1.

FIG. 17C shows a format of a basic part of a computation instruction employed in the information processing apparatus shown in FIG. 1.

FIG. 17D shows a general format of an extension part of an instruction employed in the information processing apparatus shown in FIG. 1.

FIG. 18 shows a view depicting the configuration of a mask register employed in the information processing apparatus shown in FIG. 1.

FIG. 23 shows a view for describing a loop object program of the program example 1.

FIG. 24 shows a view for describing an upper half of an instruction execution trace of the program example 1.

FIG. 25 shows a view for describing a lower half of the instruction execution trace of the program example 1.

FIG. 26A shows an example of another source program employed in the information processing apparatus shown in FIG. 1.

FIG. 26B shows an example of a program obtained after triple loop unrolling of the another source program.

FIG. 27 shows a view for describing a loop object program of the program example 2.

FIG. 28 shows a view for describing an instruction execution trace (upper half) of the program example 2.

FIG. 29 shows a view for describing an instruction execution trace (lower half) of the program example 2.

FIG. 30A shows an example of further another source program employed in the information processing apparatus shown in FIG. 1.

FIG. 30B shows an example of a program obtained after triple loop unrolling of the further another source program.

FIG. 31 shows a view for describing a loop object program of the program example 3.

FIG. 32 shows a view for describing an instruction execution trace (upper half) of the program example 3.

FIG. 33 shows a view for describing an instruction execution trace (lower half) of the program example 3.

DESCRIPTION OF AN EMBODIMENT

An information processing apparatus according to the present invention will hereinafter be described in further details with reference to embodiments illustrated in the accompanying drawings.

<Outline of Apparatus>

Figure 1:
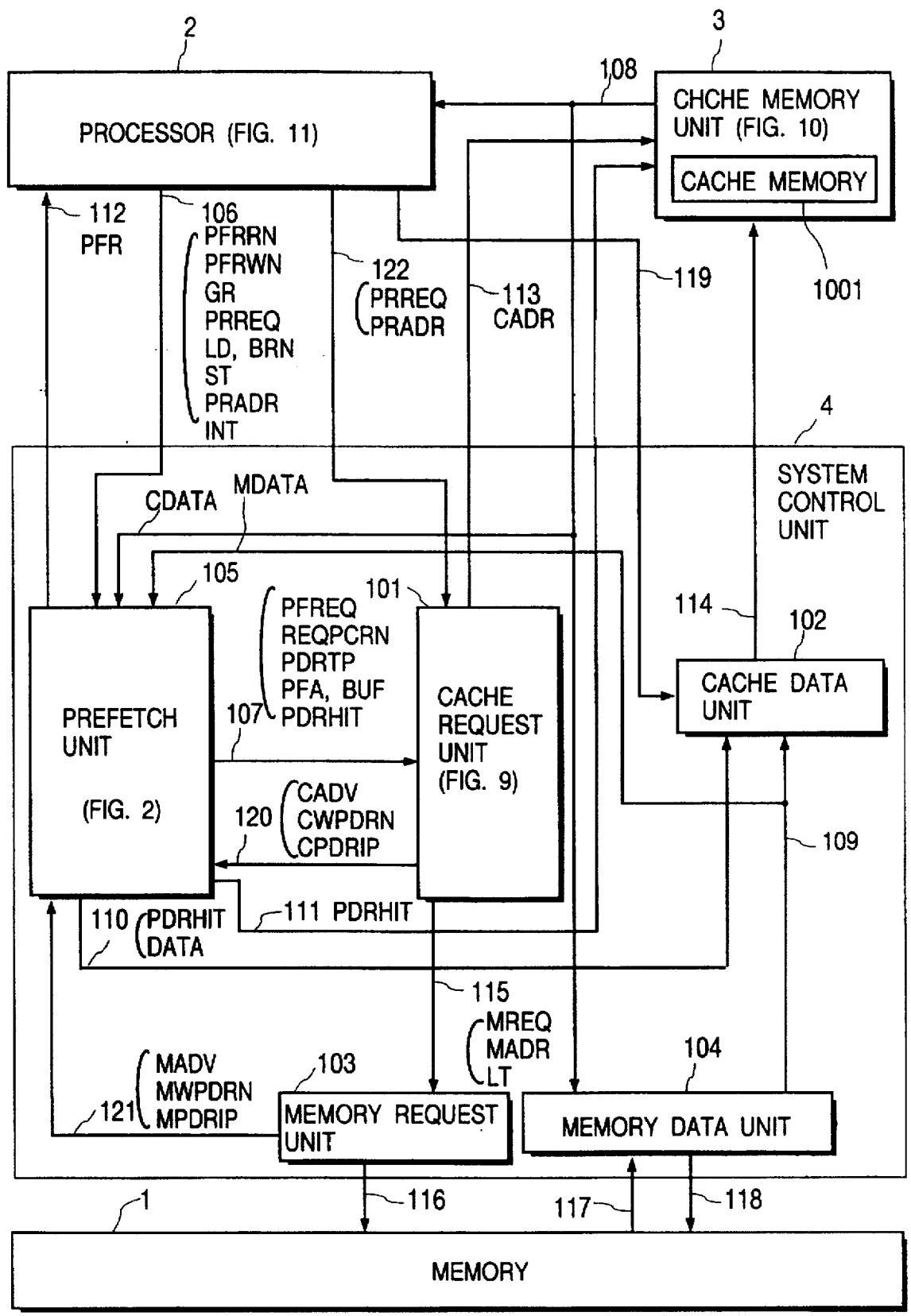
FIG. 1 shows a view showing the overall configuration of an information processing apparatus according to one embodiment of the present invention.

FIG. 1 shows the overall structure of an embodiment of an information processing apparatus according to the present invention. However, peripheral devices such as an input/output device, etc. are omitted.

Reference numeral 1 indicates a memory which stores a program and data therein. Reference numeral 2 indicates a processor which successively reads instructions included in the program stored in the memory 1 and successively executes them. Reference numeral 3 indicates a cache memory unit which incorporates therein a cache memory 1001 for storing partial copies in the memory 1 therein. Reference numeral 4 indicates a system control unit which is of a circuit for obtaining access to the cache memory 1001 or the memory 1 in response to a memory request (memory access request) issued by the processor 2. However, the present embodiment presents a great feature that a prefetch unit 105 is included.

This circuit will be described in detail later. Therefore, outlines of the prefetch unit 105 and data prefetch operations thereof will be described herein. The prefetch unit 105 executes, based on prefetch control information initially set by the program executed by the processor 2, a group of data designated by the prefetch control information, e.g., look-ahead (prefetch) data of a plurality of elements in a certain array in asynchronism with an instruction execution performed by the processor 2. The prefetched data is temporarily stored in one of a plurality of prefetched-data registers (PDR) (704(FIG. 7)) provided within the prefetch unit 105. Further, when a memory access instruction that needs the data is executed by the processor 2 later, the prefetch unit 105 transfers prefetched data designated by this instruction from the register to the processor 2. Thus, when the data is not held in the cache memory 1004, the data can be faster supplied to the processor 2 as compared with the conventional case where the data is supplied to the processor 2 from the memory 1.

The prefetch control information is pre-created in a general purpose register GR in the processor 2 in accordance with the program being executed by the processor 2. Further, the prefetch control information is shifted from the processor 2 to the inside of the prefetch unit 105 through a signal line or conductor 106 in accordance with an initialize instruction and is written into a prefetch status control register (PFR) provided within the prefetch unit 105. As will be described later, the PFR designates a combination of a prefetch status register (PSR)(301(FIG. 3)) and a prefetch control register (PCR) (302(FIG. 3)). A PFR write register number PFRWN indicative of the number of a register to be written is designated by the initialize instruction and is supplied to the prefetch unit 105 from the processor 2.

The prefetch unit 105 prefetches a group of data designated by the prefetch control information under the control of a cache request unit 101 in the following manner. The prefetch unit 105 firstly sends a prefetch request PFREQ, a prefetch address PFA, a REQPCRN indicative of the number of a PCR for holding prefetch control information about data to be prefetched therein, a PDRTP signal indicative of a position in a PDR where prefetched data is stored, and a BUF signal for designating the presence or absence of line transfer to the cache request unit 101 through a signal line 107.

The cache request unit 101 detects whether data designated by the prefetch address has been held in the cache memory 1001. If it is detected that the data has been held in the cache memory 1004, then the cache request unit 101 sends a cache address CADR corresponding to this address PFA to the cache unit 3 through a line 1132 and requests the cache unit 3 to read out the data. This data CDATA is transferred from the cache memory 1001 to the prefetch unit 105 through a line 108. The cache request unit 101 sends a data delivery instruction CADV signal, a PDR number CWPDRN, and a PDR-in storage position CPDRIP to the prefetch unit 105 through a signal line 120. The prefetch unit 105 allows the PDR to store the data CDATA therein in accordance with these signals. When the data requested from the prefetch unit 105 is not included in the cache memory 1001, the cache request unit 101 sends a memory read request MREQ and a memory address MADR to a memory request unit 103 to request the memory request unit 103 to read the data from the memory 1.

The memory request unit 103 sends these signals to the memory 1 and transmits a data delivery instruction MADV, a PDR number MWPDRN and a PDR-in storage position MPDRIP to the prefetch unit 105 through a signal line 121. When the data is read out from the memory 1, a memory data unit 104 sends the data MDATA to the prefetch unit 105 through a line 109. When no line transfer is designated to data subjected to a prefetch request, the data is not written into the cache memory 1001.

The prefetch unit 105 repeatedly effects the above operations on a group of data to be prefetched. It is now of importance that the data access request is outputted from the prefetch unit independent of the processor 2 as described above to process the data. The individual PDR respectively have a plurality of sequentially-ordered storage positions where the prefetched group of data are held and successively hold the prefetched group of data at different storage positions in accordance with the order of these storage positions. Further, when the readout of these data is requested, the prefetched data are successively read out in accordance with these storage positions as will be described later. This makes it easy to control the write and read-out positions of the group of data. Each PDR is suited for holding therein a group of data associated with a structure complex as compared with a simple vector.

If the line transfer is designated to the data to be prefetched, then the cache request unit supplies a line transfer request LT to the memory request unit 103 when the memory request unit 103 is requested to read the data to be prefetched. In this case, an operation for sending data of one block read out in accordance with the line transfer request LT to the cache memory unit 3 through the line 109, a cache data unit 102 and a line 114 is added to the memory data unit 104. When a prefetch request is made to a plurality of data included in the same block, it is effective to carry out the line transfer. In the present embodiment, whether or not the line transfer should be done based on the value of the BUF signal for designating the absence or presence of the line transfer, which is included in the prefetch control information, can be designated by a program.

When the processor 2 executes a memory access instruction which requests readout of data, the processor 2 sends a memory access request PRREQ and a memory address PRADR to the cache request unit 101 as usual regardless of whether data designated by the request has been subjected to the prefetch request, and at the same time transmits a memory request PRREQ, a memory access instruction decode information LD and a base register number BRN of the above memory access instruction to the prefetch unit 105 through the signal line 106.

The prefetch unit 105 makes a decision as to whether the requested data is held in any one of a plurality of PDR provided therein. When the requested data exists in the PDR, the prefetch unit 105 transmits its data DATA and a PDR hit signal PDRHIT to the cache data unit 102 through a signal line 110. Further, the cache data unit 102 transfers them to the cache memory unit 3 through the signal line 114. Thereafter, they pass through the cache memory unit 3 and are finally transferred to the processor 2 through the signal line 108. Therefore, the prefetch unit 105 sends a DATA transfer instruction PDRHIT to the cache memory unit 3 through a signal line 111, whereby the above data transferred via the signal line 114 is outputted to the signal line 108 by way of a bypass provided inside the cache memory unit 3 to be described later.

In the present embodiment, since permission is granted to read out the data from the cache memory 1001 when the data is prefetched, there is the potential that data whose readout request is made by the processor 2, exists in any one of PDR of the prefetch unit 105 and exists in the cache memory 1001 as well. In the present embodiment, the data to exist in each PDR is supplied from the PDR but is not read out from the cache memory. Therefore, when the PDR hit signal is supplied to the cache memory unit 3, the cache memory unit 3 sends the data DATA read out of the PDR to the line 108. Thus, as will be described in detail later, the data in the prefetch unit 105 can be managed by setting both the prefetch unit and the cache memory 1001 not so as to output the same data and preferentially sending the data in the prefetch unit 105 to the processing apparatus, without depending on the presence or absence of the hit supplied to the cache memory 1001.

When the prefetch unit 105 is not hit against the memory access request for reading out the data from the processor, the data are read out from the cache memory 1001 and the memory 1 in the following manner. The cache request unit 101 receives a memory request PRREQ and an operand address PRADR supplied from the processor 2 through a signal line 122 and checks whether a data block including the data designated by this request exists in the cache memory 1001. If the answer is Yes, then the cache request unit 101 sends a cache memory address CADR for the corresponding data block to the cache memory unit 3 through a signal line 113. If the answer is No, then the cache request unit 101 issues a memory request MREQ and an address MADR for reading out the corresponding data to the memory request unit 103 through a signal line 115. When the cache memory 1001 is not hit against the data memory access request issued from the processor as is normally the case in the present embodiment, the memory request unit 103 requests the memory 1 to read out a block including data at the memory address MADR and the memory data unit 104 transfers the data held in the block to the cache memory 1001.

If the memory access request PRREQ supplied from the processor 1 is of a data write request, then write data is transferred from the processor 2 to the cache data unit 102 through a signal line 119 and is subsequently written into the cache memory 1001 through the signal line 114. Since a method of writing the data into the cache adopts a so-called store-in method in the present embodiment, it is unnecessary to transfer the write data into the memory 1. The reflection of the data on the memory 1 is realized by writing back the corresponding data block into the memory 1 when a modified data block on the cache memory 1001 is expelled from a line. Therefore, the data block read out from the cache memory 1001 is transferred to the memory data unit 104 through the signal line 108 and is subsequently written into the memory 1 through a signal line 118.

A problem incident to the memory access request for this data writing is as follows: When the processor 2 executes a store instruction for changing corresponding data after the data has been read out by prefetching, the prefetched data becomes invalid when this store instruction exists before a memory access instruction for accessing to the corresponding data from the viewpoint of the program. The present embodiment presents an important feature as well in that at least part of addresses for the prefetched data are held along with the prefetched data, addresses for the store instruction executed by the processor 2 are compared with the part one by one, if there is a possibility that a change in address for given prefetched data has been made to invalidate it, it is detected, and changed data is fetched by accessing the memory other than PDR upon execution of the memory access instruction in regard to the invalid data, thereby solving the problem. For the sake of the above control, the processor 2 sends a store instruction execution command ST and an operand address PRADR to the prefetch unit 105 through the signal line 106. Further, the prefetch unit 105 transmits a PDRHIT signal to the cache request unit 101.

In the present embodiment as well, when the processor outputs the prefetch control information to the prefetch unit 105 and issues the memory access request, it designates the base register number BRN in either case. Thus, the PDR for holding the prefetched group of data therein is associated with the base register number designated by the prefetch control information. Thereafter, the processor 1 detects, based on a base register number designated when the processor 1 has output data and a memory access request for readout of data, whether the PDR associated with the base register number exists. If the corresponding PDR exists, then one of the group of prefetched data in the PDR is read out. Thus, a circuit for holding a plurality of groups of data therein is simplified.

Further, in the present embodiment, a group of data having structures complex like elements constituting an indexed vector or linked vector or the like can be also prefetched as well as a group of data constituting a simple vector.

Furthermore, in the present embodiment, a so-called address skip can be also realized wherein an interval between addresses for data to be prefetched is changed according to the data to be prefetched in order to allow a group of data composed of data that belong to a plurality of rows in an array to be continuously prefetched.

Still further, the present embodiment can be applied even to the case where an IF statement exists in a loop if prefetched data are skipped by empty transfer even when a conditional memory access instruction is suppressed from execution.

Still further, the present embodiment can also cope with an interrupt that takes place with respect to an instruction execution of the processor 2. Namely, the processor 2 notifies an interrupt signal INT to the prefetch unit through the signal line 106. Upon receipt of this, the prefetch unit pauses its prefetch operation. When the paused prefetch operation is resumed after completion of interrupt processing, a save recovery of PCR and PSR is executed. Therefore, the processor 2 sends register address information PFRRN for reading out these registers related to the prefetch to the prefetch unit through the signal line 106. The read information is sent to the processor 2 through a signal line 112.

A structure and operations of the present embodiment will hereinafter be described in more details inclusive of other characteristics of the present embodiment.

<Processor>

Figure 11:
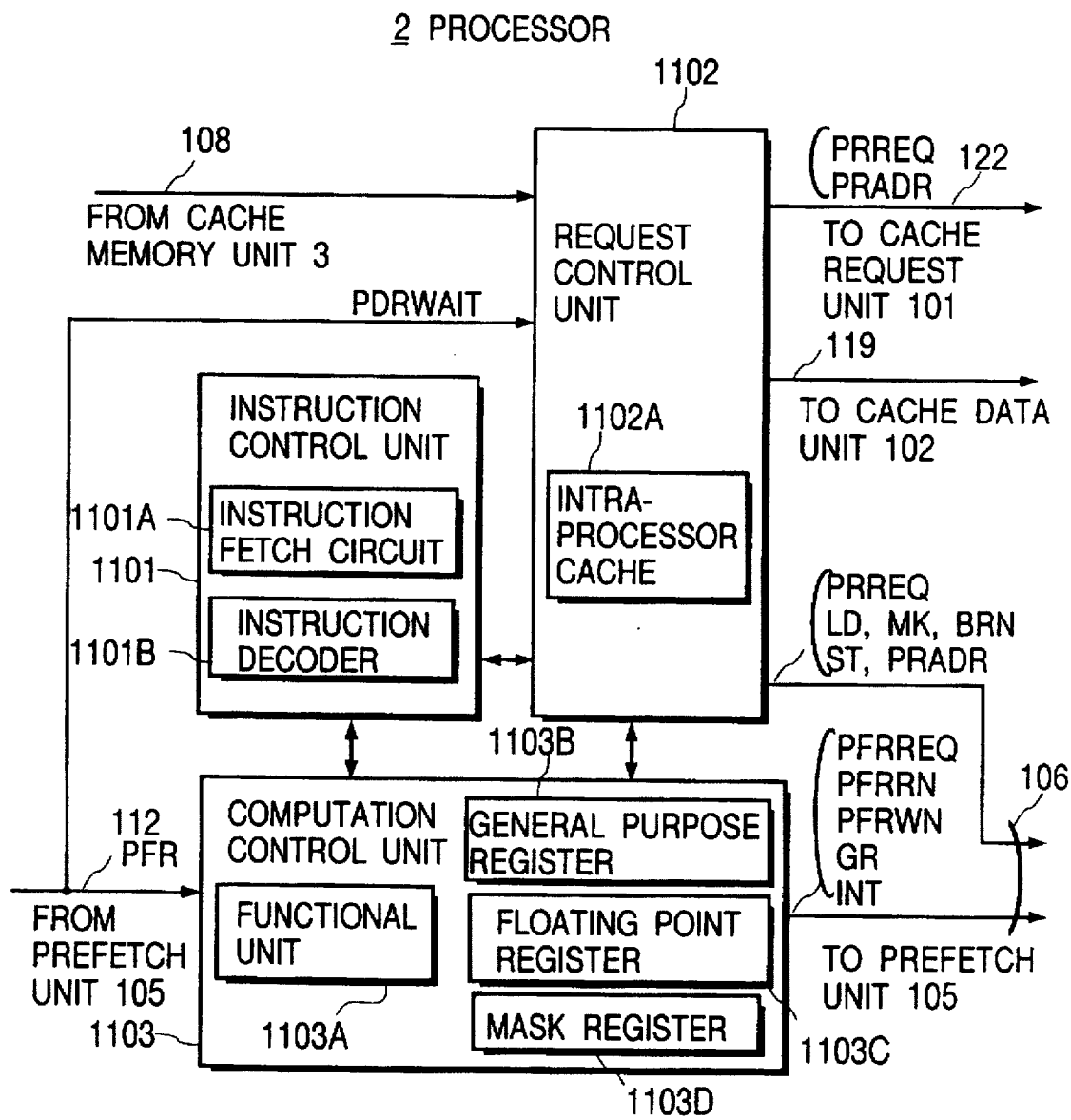
FIG. 11 shows a view schematically illustrating the configuration of a processor 2 employed in the information processing apparatus shown in FIG. 1.

FIG. 11 is a view schematically showing the structure of the processor 2. Reference numeral 1101 indicates an instruction control unit which has an instruction fetch circuit 1101A for fetching an instruction from the memory 1 and an instruction decoder 1101B for decoding it. Reference numeral 1102 indicates a request control unit which generates a memory request PRREQ for making an instruction fetch request and requesting reading or writing of memory data, based on a request issued from the instruction control unit 1101. A small capacity type intraprocessor cache 1102A can be also provided inside the request control unit 1102. Reference numeral 1103 indicates a computation control unit which includes therein a functional unit 1103A, a general purpose register (GR) group 1103B, a floating point register group 1103C, a mask register 103D, etc.

The request control unit 1102 sends the memory request PRREQ and its address PRADR to the cache request unit 101 through the signal line 122 and transmits write data to the cache data unit 102 through the signal line 119 upon writing. Incidentally to a request made under a memory access instruction, the request control unit 1102 receives decoded information LD thereof and a base register number BRN thereof from the instruction control unit 1101 and receives a mask register value MK from the computation control unit 1103. Further, the request control unit 1102 sends them to the prefetch unit 105 through the signal line 106 together with the PRREQ and PRADR. The request control unit 1102 receives a store instruction execution command ST from the instruction control unit 1101 incident to a request made under a store instruction and sends it to the prefetch unit 105 in the same manner as described above. When a data readout request is made, read data is supplied from the cache memory unit 3 to the request unit 1102 through the signal line 108.

When the computation control unit 1103 receives an access instruction with respect to a prefetch register PFR from the instruction control unit 1101, the computation control unit 1103 generates an access request signal PFR-REQ and a PFRRN and a PFRWN for designating read and write registers. Upon writing, the computation control unit 1103 fetches or reads the general register GR and sends these to the prefetch unit 105 through the signal line 106. The read contents of PFR are inputted from the prefetch unit 105 through the signal line 112.

Further, the computation control unit 1103 detects an interrupt factor upon instruction execution. When it is detected by the computation control unit 1103, the computation control unit 1103 generates an INT signal and notifies it to the prefetch unit 105 through the signal line 106. In addition, the request control unit 1102 receives a PDRWAIT signal from the prefetch unit 105 through the signal line 112. When no data arrives from the prefetched-data register PDR, the request control unit 1102 puts the issuance of the subsequent memory request PRREQ on hold in accordance with the signal.

<Examples of Data Structures to be Prefetched>

Before the detailed description of prefetch control, the data structures to be applied to a prefetch system showing the present embodiment will be described. The data structures for the present prefetch system are classified into four types shown in FIGS. 13A$a$ to 13D$b$. Program examples that obtain access to respective structured data, will be added to the same drawing.

1) Sequential Vector

A data structure shown in FIG. 13A$a$ shows a vector in which N elements each having a length of 1 are sequentially arranged on the memory 1. A leading address thereof is of an &B(1). The respective elements are represented as B(1), B(2), ... B(N). A program example that contiguously accesses these, will be shown in FIG. 13A$b$. In this case, an interval between the elements accessed at each loop coincides with the element length 1. Further, a program example that performs stride access, will be shown in FIG. 13A$c$. In this case, an access interval is of 5×1.

2) Indexed Vector

The present data structure is composed of two sequential vectors $L(i)$ ($1 \leq i \leq N$) and $B(j)$ ($1 \leq j \leq M$) shown in FIG. 13B$a$. Element lengths and leading addresses of $L(i)$ and $B(j)$ are respectively represented as 1L and &L(1) and 1B and &B(1). In the indexed vector, elements of first level (hereinafter called "indexed vector or risk vector") $L(i)$ respectively show element numbers of second level (hereinafter called "target vector") $B(j)$.

A program example that accesses the indexed vector, will be shown in FIG. 13B$b$. In the example, the access to the indexed vector is effected on the contiguous elements in turn. A single indexed vector is occasionally used for the access of a plurality of target vectors according to a user code. The present embodiment can be applied even in this case.

3) Array of Simple Linked Lists

The present data structure is composed of the set of data represented in plural levels. The most significant level corresponds to a sequential vector composed of a leading address a and an element length 1L. Each of elements b, b', ... b" thereof holds a leading address of each table in which data of a second level is placed. Data of levels lower than the second level are of data held in the table and whose each position is designated by its corresponding leading address in the table and a displacement from the head. The present embodiment is intended for the case where the displacement is held constant to all the data within the same level. However, an extension for allowing the displacement to vary at each data can be also carried out. Each data having the level lower than the second level exclusive of the least significant level shows the leading address in the table for storing data of the next level therein.

In the example shown in the drawing, the most significant leading element b of the vector shows a table C including data c of a second level. The data c is placed in a position corresponding to a predetermined displacement j. The data c shows a table D including data d of a third level and the data d is placed in a position corresponding to a predetermined displacement k. The data d represents a table E including data e of the least significant level and the data e is placed in a position corresponding to a predetermined displacement l. An example of a program that accesses the array of the simple linked lists, will be shown in FIG. 13C$b$. In addition to this example, the present function is suited to accessing to an array of structs easy to be described by C language.

4) Array of Trees

The present data structure is substantially similar to the array of the simple linked lists described in the paragraph 3). As shown in FIG. 13D$a$, the data structure is composed of the set of data of a plurality of levels. The most significant level is of a sequential vector composed of a leading address a and an element length 1L. Respective elements b, b', ... b" respectively hold leading addresses in tables in which data of second levels are placed. Data of respective levels lower than the second levels are of data in the tables. Its data position is designated by a leading address of each table and a displacement from the head.

The array of the trees differs from the array of the simple linked lists described in the paragraph 3) in that the data of the levels lower than the second levels exist as plural with respect to the corresponding data high by one level. The plurality of data are placed on the same table and each displacement from the head of the table is designated in advance. The present embodiment is intended for the case where the displacement is held constant to all the data with the same level. However, an extension for allowing the displacement to vary at each data can be also carried out. Each data having the level lower than the second level exclusive of the least significant level shows the leading address in the table for storing data of the next level therein.

In the example shown in the drawing, the most significant leading element b of the vector shows a table CD including data c and d of second levels. The data c and d are placed in positions corresponding to predetermined displacements j and k. The data c shows a table E including data e of the least significant level and the data e is placed in a position corresponding to a predetermined displacement l. The data d represents a table F including data f of the least significant level and the data f is placed in a position corresponding to a predetermined displacement m. An example of a program that accesses the array of the trees, will be shown in FIG. 13D$b$.

<Instruction Formats>

FIGS. 17A to 17D show instruction formats employed in the present embodiment. FIG. 17A shows a general instruction format. An instruction comprises a basic part of 32 bits and an extension part of 16 bits. The basic part conforms to the PA-RISC architecture of U.S. Hewlett-Packard Company. FIG. 17B shows a basic part format of a memory access instruction. Symbols op, b, t/r, s and im14 represent an instruction code, a base register number, an operand register number, a space register designation and a 14-bit immediate respectively. FIG. 17C indicates a basic part format of a computation instruction. Symbols op1 and op2 respectively designate instruction codes, symbols r1 and r2 respectively designate operand register numbers, symbol t designates a register number at which the result is stored, and symbols c and f respectively designate instruction suppress conditions. For detailed information, refer to: "PA-RISC 1.1 Architecture and Instruction Set Reference Manual", Second edition, pp. C-1 to C-6, Hewlett-Packard, HP Part Number: 09740-90039, 1992.

FIG. 17D shows a format of an extension part. Symbols rm and tm respectively indicate a read mask number and a write mask number both of which designate a mask register MR shown in FIG. 18. The mask register is composed of 62 one-bit registers. The mask register stores conditional values corresponding to the result of computation by a computation instruction. Namely, upon execution of the computation instruction, a condition corresponding to the result of computation by the computation instruction is stored in a mask register designated by tm in accordance with the designation of the c and f fields of the basic part. If the value of a register designated by rm is 1, then the instruction designated by the basic part is executed. If the value thereof is 0, the instruction thereof is suppressed. Controlling the presence or absence of the instruction execution by the mask register is called "conditioned execution control". When the numbers 0 and 1 are designated by rm, mask values 0 and 1 are identically read out. Further, when the number 0 or 1 is designated by tm, the contents of each mask register remain unchanged.

Specifications of a specific instruction for prefetch control will be described below. In the following description, symbol [m] indicates a read mask field. The execution of the instruction is controlled in accordance with the contents of a mask register designated by m. The next field shows the type of instruction and several operand fields further continue after the next field. The type of instruction and the operand will be described at each instruction.

1) Setup and Save/Recovery Instructions of Prefetch Status Register (PSR)

Move GR to PSR; [m] MVRPSR, s1

The present instruction sets the value of PSR in accordance with the contents of a general purpose register (GR) designated by s1. The present instruction is used to recover PSR at a context switch such as initialization of PSR, an interrupt to PSR or the like.

Move to PSR Immediate; [m]MVPSRI, imm16

The present instruction sets PSR in accordance with an instruction 16-bit immediate field. The present instruction is used to initialize PSR.

Move PSR to GR; [m]MVPSRR, t

The present instruction allows the contents of PSR to be stored in GR designated by t. The present instruction is used to obtain access to PSR.

2) Setup and Save/Recovery Instructions of Prefetch Control Register (PCR)

Move GR to PCR; [m]MVRPCR, s1, t

The present instruction sets the value of PCR designated by t in accordance with the contents of GR designated by s1. The present instruction is used to recover PCR at a context switch such as initialization of PCR, an interrupt thereof or the like.

Move PCR to GR; [m]MVPCRR, s1, t

The present instruction allows the contents of PCR designated by s1 to be stored in GR designated by t. The present instruction is used for saving of PCR at a context switch such as an access and an interrupt of PCR or the like.

4) Control Instruction

The following are used as instructions for updating specific fields of PSR and PCR alone.

Set PCR ACT; [m]SPCRACT, imm8, t

The present instruction brings an ACT flag (FIG. 14A) of PCR designated by t up to date in accordance with the value of an imm8 field.

Set PSR SUSP; [m]SPSRSUSP, imm8

The present instruction updates an SUSP flag (FIG. 3) of PSR in accordance with the value of the imm8 field.

Initialize PCR; [m]IPCR, all, t

The present instruction resets VLD and ACT flags (FIG. 14A) of PCR designated by t. If, however, all is 1, the present instruction effects reset on all the PCR.

Initialize PDR; [m]IPDR

The present instruction resets RC fields related to all the elements of all PDSR to 0.

<Prefetch Unit>

Figure 2:
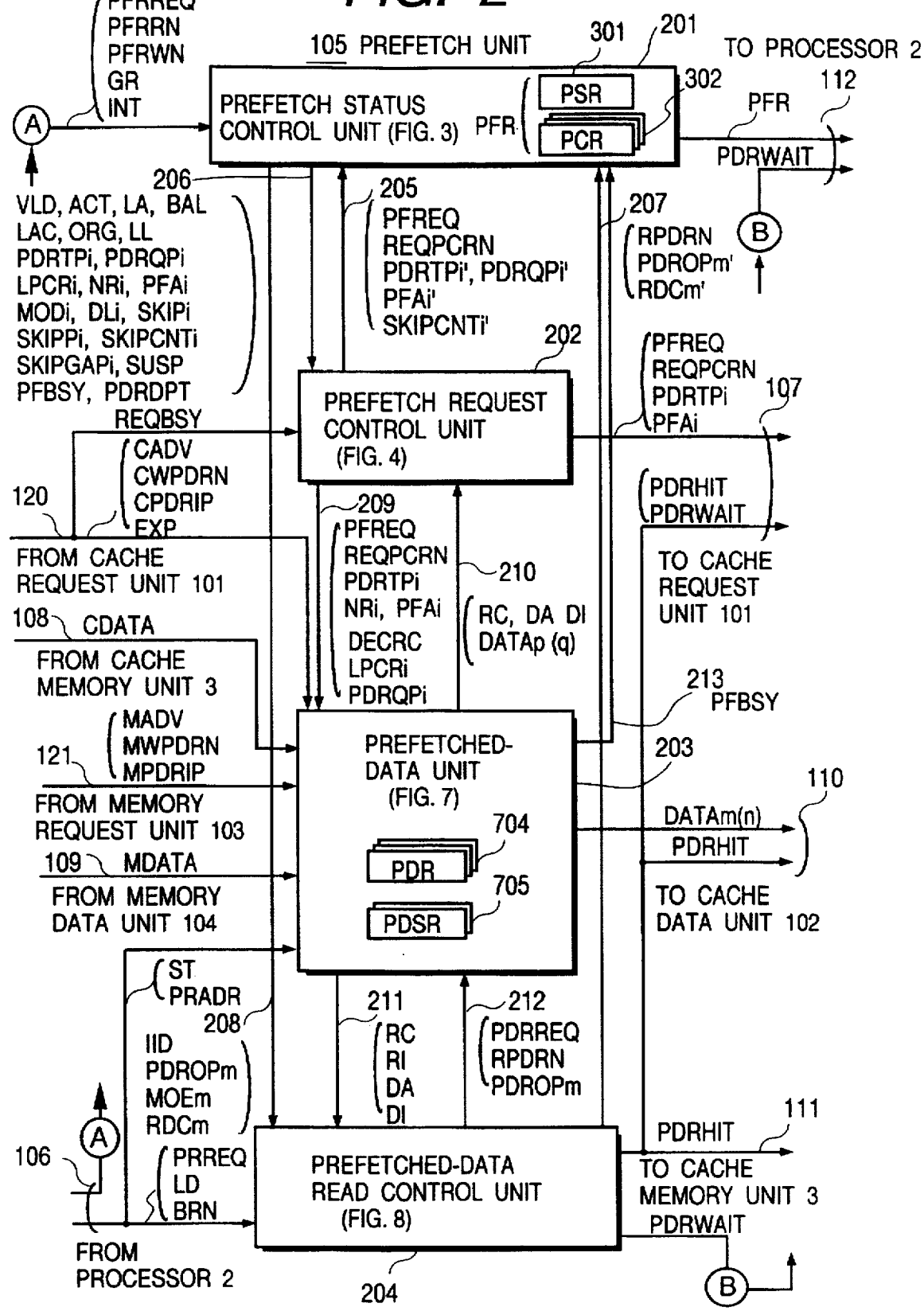
FIG. 2 shows a view schematically illustrating the configuration of a prefetch unit employed in the information processing apparatus shown in FIG. 1.

FIG. 2 illustrates major signals transferred between four units forming the prefetch unit 105 and between these and apparatus components other than the prefetch unit. A supplemental description will be made of detailed senses of the respective signals and a method of generating the signals with reference to explanatory drawings for every units later. Schematic configurations of the respective units and their operations will now be described using only the major ones of signals shown in FIG. 2.

Reference numeral 201 indicates a prefetch status control unit for effecting read/write control on the prefetch status register (PSR) 301 and the prefetch control register (PCR) 302. The PSR and PCR are called "prefetch status control unit (PFR) in combination. When the prefetch is allowed to operate, the prefetch status control unit 201 sets information for designating an object data structure and a prefetch operation mode to PFR under the execution of a program by the processor 2.

Upon setting the PFR by the program, the set information is stored in the general purpose register (GR) in the processor 2 in advance. Next, the set information is written into the PFR designated by the aforementioned prefetch control instruction. With the execution of the prefetch control instruction at this time, the prefetch unit 105 receives a PFR write command PFRREQ, a PFR identification number PFRWN and the data in the GR from the processor 2 through the signal line 106.

Reference numeral 202 indicates a prefetch request control unit for issuing a prefetch request and updating a PCR and a prefetched-data status register PDSR to be described later in response to the issuance of the prefetch request. The prefetch request control unit 202 reads a PSR and a PCR through a signal line 206 and reads a PDSR from a prefetched-data unit 203 through a signal line 210. Further, the prefetch request control unit 202 checks whether a request issuable one exists in 16 PCR. If the answer is Yes, then the prefetch request control unit 202 selects a PCR for issuing a request next time based on a predetermined standard to be described later. Thereafter, the prefetch request control unit 202 sends a prefetch request PFREQ and a PCR number REQPCRN (whose value will hereinafter be called "i") to the prefetch status control unit 201 through a signal line 205. The prefetch request control unit 202 reads a field incident to the request from an i-th prefetch control register PCRi designated by the REQPCRN and takes it in through the signal line 206. Each field of the PCR is hereinafter represented by applying a subscript i thereto.

As major ones in these, may be mentioned a prefetch address PFAi and a PDR top pointer PDRTPi indicative of the position where the read data is stored in the PDR. These are sent to the cache request unit 101 through the signal line 107 together with the PFREQ and REQPCRN signals. The state of each PDSR in the prefetched-data unit 203 is displayed as request issued through a signal line 209. A PDSR position for this is designated by the REQPCRN and PDRTPi. As initialize information, may be mentioned at least part of PFAi and the number of accesses NRi to be described later.

With the issuance of the PFREQ, the prefetch request control unit 202 next generates updated values (hereinafter updated values of respective fields of the PCR and PDSR are added with ' as field names) of fields of PCRi related to the request issuance, such as the PFAi and PDRTPi or the like and sends them to the prefetch status control unit 201 through the signal line 205. In order to generate the updated value of the prefetch address PFAi, an address modifier MODi or the like to be described later is read from the PCRi. Since the processing of the previously-accepted prefetch request is not yet completed, the cache request unit 101 sends a busy signal REQBSY indicative of a state in which the request is non-accepted at present to the prefetch request control unit 202 through the signal line 120.

The prefetched-data unit 203 includes a plurality of prefetched-data registers (PDR) 704 for temporarily storing prefetched data therein and prefetched-data status registers (PDSR) 705 for storing read control information thereof therein. When the prefetched data is read out of the cache memory 1001, the prefetch unit 105 takes in the data delivery instruction CADV, the CWPDRN indicative of the storage PDR number and the CPDRIP indicative of each element position in the PDR each having the PDR number through the signal line 120 and stores therein the data CDATA delivered from the cache memory 1001 in accordance with this taken-in processing.

When the prefetched data is read from the memory 1, the prefetch unit 105 takes in the data delivery instruction MADV, the MWPDRN indicative of the storage PDR number and the MPDRIP indicative of each element position in the PDR each having the PDR number and stores therein the data MDATA in accordance with the taken-in processing. With the storage of the data therein, the state of PDSR is displayed as data arrived.

In order to pause the prefetch operation according to the generation of an interrupt by the processor 2, the prefetched-data unit 203 sends a status signal PFBSY for identifying the completion of a prefetch request process to the prefetch status control unit 201 through a signal line 213.

Reference numeral 204 indicates a prefetched-data read control unit for controlling the transfer of data temporarily stored in the corresponding prefetched-data register PDR to the processor 2. The prefetched-data read control unit 204 takes in the memory request PRREQ and the memory access instruction decode information LD through the signal line 106. The present embodiment provides one feature that the base register number BRN at which the operand address for this instruction has been stored, is associated with each PDR as a key simultaneously at this time.

Namely, since the base register number made under the memory access instruction is stored in an instruction identifier IID field of a PCR corresponding to the PDR associated with the base register number BRN, it is possible to identify that the corresponding PDR is associated with the base register number by comparing the above BRN with the stored base register number. Therefore, the prefetched-data read control unit 204 takes in the values of IID fields of all the PCR through a signal line 208. The prefetched-data read control unit 204 sends the thus-identified PDR number to the prefetch status control unit 201 as a RPDRN signal (whose value is regarded as m) through a signal line 207. Further, the prefetched-data read control unit 204 reads a PDR out pointer field PDROPm (whose value is regarded as n) from the designated PCRm and takes it in through the signal line 208. The prefetched data-read control unit 204 sends a PDR read instruction PDRREQ, a read PDR number RPDRN and the above PDROPm to the prefetched-data unit 203 through a signal line 212. Thereafter, the prefetched-data read control unit 204 reads out data DATAm (n) from an nth element of an mth PDR and sends it to the cache data unit 102 through the signal line 110. At this time, the prefetched-data read control unit 204 checks the validity of the data stored at the PDR position and sends a PDRHIT signal indicative of the validity of the data to the cache memory unit 3 through the signal line 111, the cache data unit 102 through the signal line 110 and the cache request unit 101 through the signal line 107, respectively. Thus, the cache request unit 101 suppresses a memory request operation based on the memory access instruction.

If no data arrives at the corresponding PDR position, then the prefetched-data read control unit 204 generates a PDRWAIT signal and sends it to the cache request unit 101 and the processor 2. In response to this signal, the cache request unit 101 holds a cache access request made under the memory access instruction. The cache request unit 101 holds the PDRWAIT signal until the corresponding prefetched data arrives, and releases it from holding upon arrival. At this time, the prefetched-data read control unit 204 checks the validity of the data and generates a PDRHIT from the result of check in the same manner as described above. When the data in each PDR is invalid, the PDRHIT is not established and hence the memory request operation made under the memory access instruction is processed without being suppressed. It is thus possible to read the up-to-date data from the cache or memory 1. As a result, a problem related to the invalidation of data due to updating of the prefetched data by a store instruction can be resolved. Incidentally, the processor 2 that received the PDRWAIT therein, will hold a continuing memory request while the processor 2 is being turned on. The prefetched-data unit 203 reads respective fields RC, RI, DA and DI of each PDSR to be described later through the signal line 212 to generate the above PDRHIT and PDRWAIT and inputs them to the prefetched-data read control circuit 204.

Upon execution of the store instruction, the prefetched-data unit 203 takes in the memory request PRREQ, the store instruction execution command ST and the operand address PRADR through the signal line 106. At this time, they are compared with at least some of prefetch addresses held every elements of respective PDR corresponding to respective PDSR. When they coincide with each other, the invalidity of read data is displayed on the corresponding PDR element as the presence of an update possibility.

More detailed structures of the respective units that form the prefetch unit 105 will be described below.

(Prefetch Status Control Unit 201)

Figure 3:
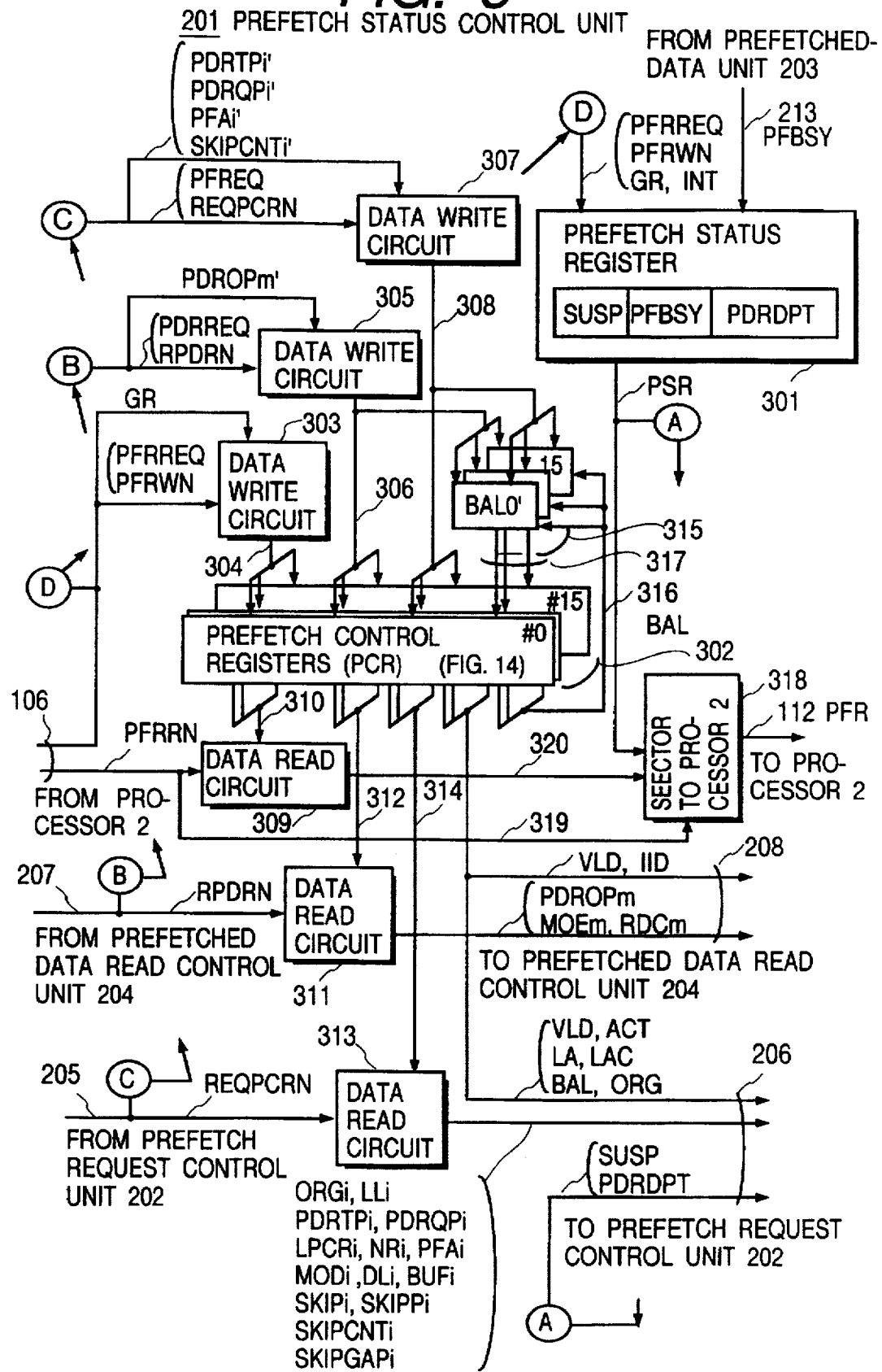
FIG. 3 shows a view schematically showing the configuration of a prefetch status control unit employed in the information processing apparatus shown in FIG. 1.

FIG. 3 shows the details of the prefetch status control unit 201.

Reference numeral 301 indicates the prefetch status register (PSR) which holds therein an SUSP for displaying a stopped state of issuance of a prefetch request, a prefetch request busy flag PFBSY for displaying the presence or absence of an acting prefetch request and a PDRDPT for displaying the depth of PDR. When the PFRREQ signal is on and the PFRWN designates a PSR, the writing of data into the PSR301 is performed. At this time, the contents of the GR delivered from the processor 2 are written into the PSR301. However, no data is written into the PFBSY flag. The PSR310 inputs the INT signal for notifying the generation of an interrupt from the processor 2 and sets the SUSP flag in response to the INT signal. The PSR310 inputs the PFBSY signal from the prefetched-data unit 203 through the signal line 213 and displays it on the PFBSY flag.

The reading of data from the corresponding PSR by the processor 2 is performed by designating a read address PFRRN and a PSR in accordance with a program and selecting the contents thereof by a selector 318. The PFRRN is supplied to the selector 318 through a signal line 319. The output of the selector 318 is sent to the processor 2 through the signal line 112. Further, the contents of PSR are sent to the prefetch request control unit 202 through the signal line 206.

Meanings of respective fields in PSR are as follows:
Pause Flag: SUSP

The SUSP indicates a state in which a prefetch mechanism leading to the present embodiment is in a request stop state. When the SUSP is on, the prefetch mechanism is in the request halt state. Even if active ones exist in the corresponding prefetch control register PCR, no prefetch request is issued. When the SUSP is off, the prefetch request can be issued. When an interrupt is generated due to an exception of storage protection, for example, the processor 2 notifies it to the prefetch status register through the signal line 106 based on the INT signal so as to set the SUSP flag of the corresponding PSR. The SUSP can be set by the program.
Prefetch Request Busy Flag; PFBSY The PFBSY represents the existence of a prefetch request indicative of non-completion of data reading. The PFBSY is used for bringing the SUSP to on upon generation of an interrupt to stop the issuance of the request and identifying that the prefetch mechanism is brought into a pause state owing to the turning off of the PFBSY flag.
PDR Depth; PDRDPT The PDRDPT shows the number of elements of each of 16 PDR. Thus, 16×PDRDPT register elements each having a 8-byte width are prepared for temporary storage of prefetched data in the entire apparatus.

The SUSP and PFBSY flags will be described in detail upon interrupt processing to be described later.

Reference numeral 302 indicates 16 prefetch control registers PCR0 through PCR15 for storing prefetch control information therein respectively. When no chaos is caused, either a single prefetch control register or all the prefetch control registers will be simply described as PCR. The PCR comprises information for describing positions and structures of data to be prefetched, identification information about an instruction which requests prefetched data, information about data read request control, control information for reading out data held in each PDR, etc.

Referring to FIG. 3, reference numerals 303, 305 and 307 respectively indicate data write circuits provided so as to correspond to PCR. The data write circuits respectively write GR, PDROPm' and (PDRTPi', PDRQPi', PFAi', SKIPCNTi') into PCR having numbers indicated by PFRWN, RPDRN and REQPCRN through signal lines 304, 306 and 308 in accordance with instructions of PFRREQ, PDRREQ and PFREQ in turn.

Reference numeral 315 indicates balance 2(BAL) field update circuits provided every PCR. Each of the update circuits 315 is inputted with a balance field BAL for its corresponding PCR through a signal line 316, a BAL increment instruction incident to the issuance of PFREQ through the signal line 308 and a balance (BAL) decrement instruction incident to the issuance of PDRREQ through the signal line 306. A balance (BAL) is added by one with respect to the increment instruction and is reduced by one with respect to the decrement instruction. When both instructions are simultaneously received, an updated value is generated as it is and is set to its corresponding balance BAL through a signal line 317. Thus, the number of elements of PDR which do not effect reading on the processor 2, of those that have issued requests, is displayed on the corresponding balance BAL.

Reference numerals 309, 311 and 313 indicate PCR data read circuits respectively. The data read circuits 309, 311 and 313 are respectively sequentially inputted with the contents of PCR through signal lines 310, 312 and 314, select PCR having numbers indicated by PFRRN, RPDRN and REQPCRN and output the contents (PDROPm, MOEm, RDCm) and (ORGi, LLi, PDRTPi, PDRQPi, LPCRi, NRi, PFAi, MODi, DLi, BUFi, SKIPi, SKIPPi, SKIPCNTi and SKIPGAPi) of PCR, which are set in double word units, through a signal line 320, the signal line 208 and the signal line 206. Further, VLD and IID fields of all the PCR are outputted to the signal line 208 and similarly, all the VLD, ACT, LA, LAC, BAL and ORG fields are outputted to the signal line 206.

A single PCR is composed of four double words as shown in FIGS. 14A to 14D. It is necessary for a context switch incident to an interrupt or the like to perform save/recovery of related PCR by a program. Since the respective fields are classified into groups according to functions and are respectively assigned in double words and accesses by the program are executed in double word units, groups related to unnecessary functions can be excluded from the objects to be save/recover. Thus, an advantageous effect can be brought about that the number of program execution steps incident to interrupt processing and initialization can be reduced.

The transfer of information between GR and PCR is performed in accordance with the aforementioned dedicated transfer instruction. Incidentally, a discrete access to a specific field can be also executed as a PCR access in addition to the double word units via the GR. Since these can be easily realized by a normal technique, detailed structures for its illustration will not be shown in particular.

Meanings of the respective fields of PCR will be described below.

1) First Group: Basic Prefetch Control Information

Valid Flag; VLD

The VLD shows that the corresponding PCR is valid under the present context.

Active Flag; ACT

The ACT represents that the corresponding PCR is in an active state. When the PCR is active, a prefetch operation corresponding to designated data is executed.

Original Flag; ORG

The ORG represents that the corresponding PCR designates a sequential vector or an indexed vector and an initial PCR of a PCR link at prefetching in a linked list. There may be cases where a PCR whose ORG is on, is called original PCR and others are called linked PCR.

Prefetched-Data Length; DL

The DL designates an operand length of a memory access instruction, which is to be prefetched. However, the operand length is defined as an exponent obtained when expressed by the square of width of 2.

Prefetch Buffer Designation; BUF

The BUF designates a location where prefetched data is held, i.e., a prefetch buffer. When the BUF is off, data is stored only in a PDR used as the prefetch buffer. When the BUF is on, data are stored in both of a PDR and a cache. Namely, when the BUF is off, a single data is required of the memory 1 upon cache miss, whereas when the BUF is on, line transfer is required of the memory 1.

Instruction Identifier; IID

The IID is used to identify a memory access instruction which becomes an object for the corresponding prefetch. A base address register number for a memory access instruction is used for its identification. The present field is compared with the base address register number upon execution of the memory access instruction. When they coincide with each other, a prefetched-data register transfers data to the corresponding memory access instruction.

Look-Ahead Control Designation; LA

The LA makes a look-ahead or prefetch control function effective. When the prefetch control function is valid or effective, a look-ahead count LAC to be described below designates the number of times to be executed in which look ahead is allowed, to the corresponding memory access instruction.

Look-Ahead Count; LAC

The LAC designates a value indicative of the maximum number of times to be executed in which the prefetching is allowed, to the corresponding memory access instruction.

Address Skip Designation; SKIP

The SKIP makes an address skip function valid or effective. When the address skip function is effective, a prefetch address is updated by a length designated by a skip gap SKIPGAP to be described below every data prefetch requests corresponding to the number designated by a skip-count SKIPCNT to be described below.

PDR Top Pointer; PDRTP

The PDRTP indicates the position of an element for holding data based on the latest request in a PDR therein.

Processing Request Counter; BAL

The BAL indicates the number of processing requests under which data transfer is not performed.

Number of References; NR

The NR indicates the number of times in which the same data read out based on the designation of the corresponding PCR is referred to. The reference called herein includes a reference defined as an address or modifier (both of which will be called linked data) necessary for data reading defined as an operand based on the corresponding memory access instruction and a data fetch operation designated by a baby PCR. The NR indicates the number determined depending on a data structure. In the present embodiment, however, the number can be designated up to 16 at the maximum. Individual data stored in the PDR are regarded as has been used and completed after references corresponding to the number of times designated by the NR. Refer to RC fields in each PDSR to be described later.

Mask Override Designation; MOE

The MOE designates whether a data read request made from a PDR incidentally to the execution of a memory access instruction depends on the value of a mask register, which indicates a condition for execution of the corresponding memory access instruction. If an IF statement exists in a loop and the corresponding memory access is executed in dependence on an IF settlement condition, then empty reading of the PDR at the time that a mask value is 0 by bringing the MOE to on, is performed.

PDR Out Pointer; PDROP

The PDROP indicates the position of each element in a PDR that is holding data to be transferred when the corresponding memory access instruction is executed.

Redirection Data Counter; RDC

The RDC indicates the number of elements, to redirected by a prefetch buffer redirection function to be described later, of effective data held in a PDR. This will be described in detail later upon interrupt processing.

2) Second Group: Option Information

Prefetch Address; PFA

The PFA represents a memory address for prefetch, which is brought up to the next address together with the issuance of a request in the case of an origin PCR (sequential vector). Thus, a value read out from a PFA field is regarded as the prefetch address as it is upon issuance of the next prefetch request. In the case of a linked PCR, an address generated by a predetermined method and stored in the corresponding PFA field is regarded as the prefetch address.

3) Third Group; Option Information

Address Modifier; MOD

The MOD is of a 64 b address modifier. In the case of the sequential vector, the MOD designates an interval between data elements. In the case of an indexed vector, the MOD designates a displacement from a leading address of a target vector, whereas the MOD designates a displacement from an address in a liked table in the case of a linked list. The details of the MOD will be described later with reference to FIGS. 15A to 15C.

4) Fourth Group; Option Information

Linked List Prefetch Designation; LL

The LL shows that the corresponding PCR is of a baby PCR for designating prefetch in the linked list. At this time, a memory address is generated by adding linked data read out from a parent PCR to the address modifier of the corresponding PCR and is held at a PFA.

Link PCR Number; LPCR

The LPCR shows the number of a parent PCR, which is used for prefetch of an indexed vector and a linked list. A plurality of babies PCR can be normally designated with a common PCR as parent. Thus, when reference is made to two types of target vectors under the use of a common indexed vector, for example, the prefetch can be applied even when index reference for generating addresses of the two types of target vectors is programmed so as to be read out from a GR other than the memory 1, which stored an index for one type of target vector therein. This is one feature obtained from the present embodiment.

PDR Request Pointer; PDRQP

The PDRQP indicates the position of each element in a parent PDR in which data for accessing an address generating index or a table address at an indexed vector or prefetch of a linked list is held.

Skip Interval; SKIPP

The SKIPP shows a request interval at which an address skip to be described later is performed.

Skip Gap; SKIPGAP

The SKIPGAP indicates the value of an address increment at each address skip. When the address skip is made, one obtained by adding the SKIPGAP to a PFA is regarded as the next address.

Skip Count; SKIPCNT

The SKIPCNT indicates the number of requests issued after the recently-executed address skip.

Figure 15A:
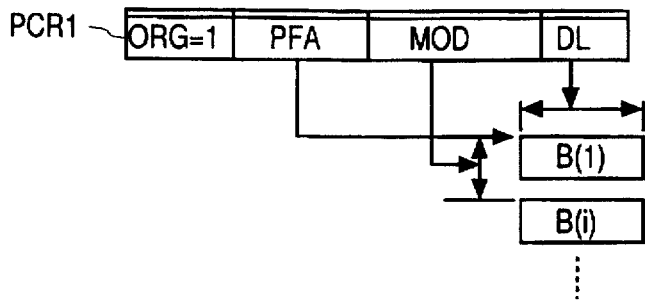
FIG. 15A illustrates information to designates sequential vector data used in the information processing apparatus shown in FIG. 1.
Figure 15B:
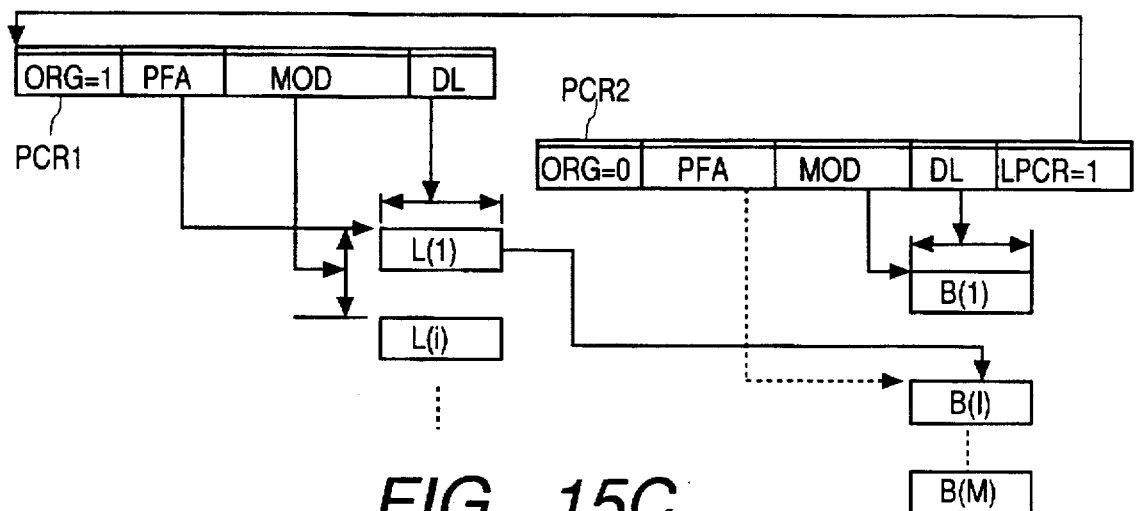
FIG. 15B illustrates information to designates indexed vector data used in the information processing apparatus shown in FIG. 1.
Figure 15C:
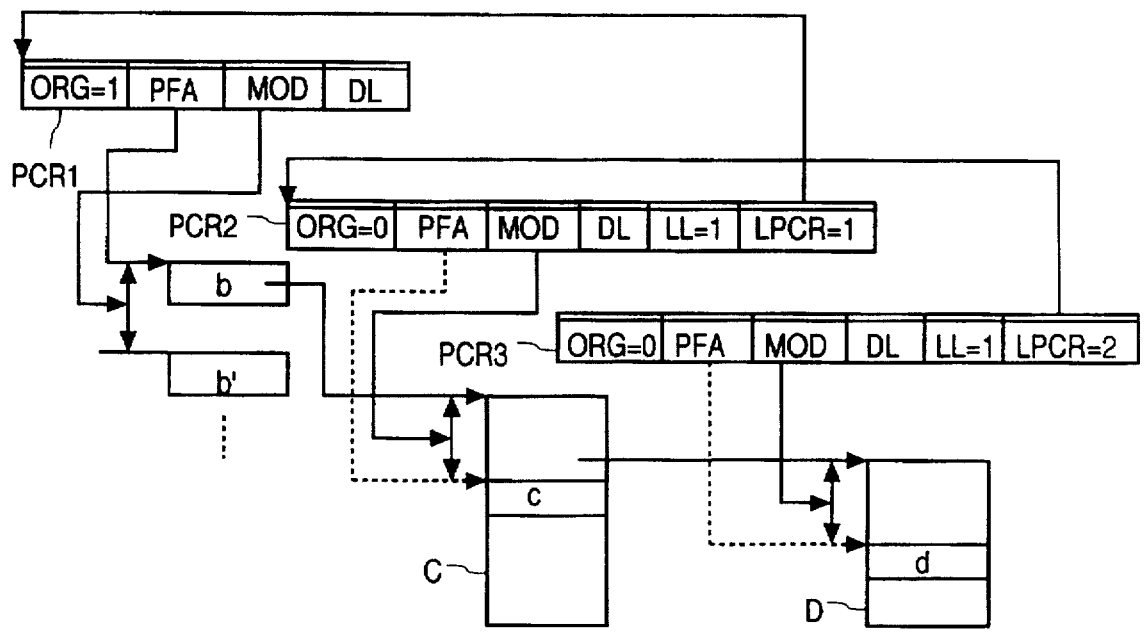
FIG. 15C illustrates information to designates a linked list used in the information processing apparatus shown in FIG. 1.

Next, designated examples of PCR and data structures based thereupon are shown in FIGS. 15A to 15C. However, fields that have no bearing on their description are not illustrated. Two PCR are used for the prefetch of the indexed vector. For prefetch of simple linked lists, PCR corresponding to the number of levels thereof are used. (1): The PCR1 designates a method of prefetching a vector B(i). The PFA designates a leading address and the address modifier MOD designates a reference interval. (2): The PCR1 and PCR2 designate a method of prefetching an indexed vector. The PCR1 corresponds to an indexed vector and the PCR2 corresponds to a target vector. In particular, an LPCR field in the PCR2 shows that a parent PCR is of the PCR1. (3): The PCR1 through PCR3 designate a method of prefetching a three-level linked list. MOD designated by the PCR2 and PCR3 indicate displacements from the heads of tables C and D to intended data c and d respectively.

(Prefetch Request Control Unit 202)

Figure 4:
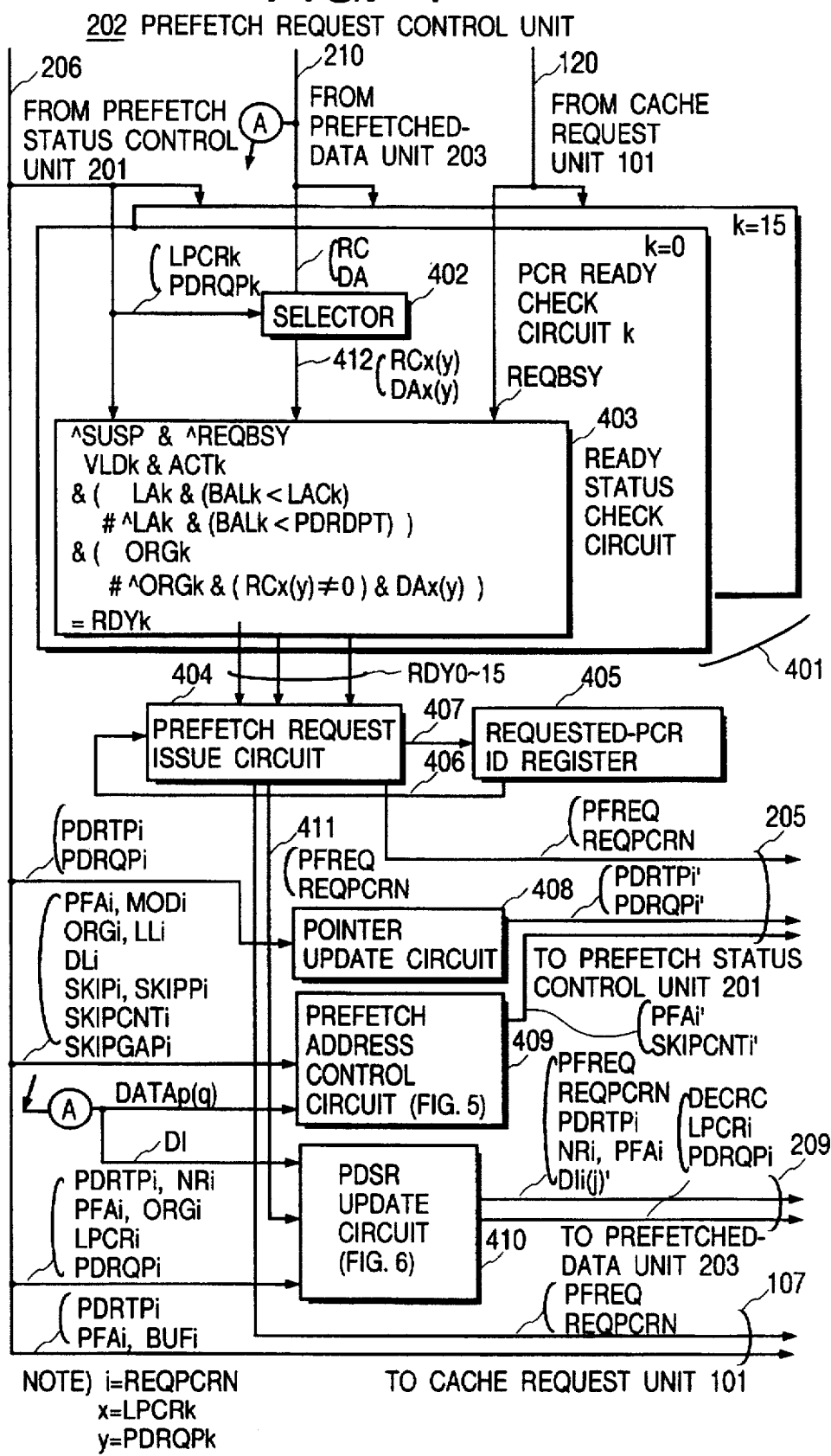
FIG. 4 shows a view schematically depicting the configuration of a prefetch request control unit employed in the information processing apparatus shown in FIG. 1.

FIG. 4 shows details of a prefetch request control unit 202. Reference numeral 401 indicates sixteen sets of PCR ready check circuits 0 through 15 which are provided so as to correspond to PCR0 through PCR15 and check whether respective PCR are in prefetch request issuable ready states. The PCR ready check circuits k is supplied with the contents SUSP and PDRDPT of a prefetch status register PSR through the signal line 206, with VLDk, ACTk, LAk, BALk, LACk, ORGk, LPCRk and PDRQPk from a prefetch control register PCRk, with RC and DA fields from all the PDSR through the signal line 210 and with a REQBSY from the cache request unit 101 through the signal line 120.

Reference numeral 402 indicates a selector, which selects status flags RCx(y) and DAx(y) corresponding to a PDSRx corresponding to a PDR of a number (whose value is defined as x) indicated by LPCRk and corresponding to an element of a number (whose value is defined as y) indicated by PDRQPk with respect to the RC and DA fields of all the PDSR, and outputs the selected ones to the corresponding circuit 403 through a signal line 412. When the PCRk is of a linked PCR, the status flag DAx(y) indicates whether linked data necessary for the PCRk to generate a prefetch address is read into a PDRx accompanied by a parent PCR. Incidentally, the DAx(y) indicates that when an unreference count RCx(y) is of a non-zero, its indication is effective.

Reference numeral 403 indicates the ready status check circuit for checking whether the PCRk is in a ready state and outputting a RDYk signal indicative of the result of check therefrom. Now, symbols &, #, ^ and < indicate a logical product, a logical sum, a logical NOT and a sign of inequality respectively. Conditions under which the RDYk is established, are represented within a block indicative of the circuit 403 shown in the drawing. However, the meanings of the conditions are as follows:

(1) The prefetch mechanism is not in the request stop state (SUSP is off)
(2) The cache request unit 101 can accept the prefetch request (REQBSY is off)
(3) The corresponding PCR is effective (VLD is on) and in the active state (ACT is on)
(4) When the look-ahead or prefetch control is designated (LA is on), the number of processing requests (BAL) does not reach the look-ahead count (LAC). On the other hand, when the look-ahead control is not designated (LA is off), the BAL does not reach the depth of PDR (PDRDPT)

(6) When the corresponding PCR is of the origin PCR (ORG is on) or is not the origin PCR (ORG is off), the linked data necessary for the corresponding PCR to generate the prefetch address is read into its corresponding PDR (DAx(y) is on).

Ready signals RDY0 through RDY15 associated with the respective PCR are sent to a prefetch request issue circuit 404 to thereby select a PCR for issuing a request next time from these. Reference numeral 405 indicates a requested-PCR ID register which holds a PCR ID that has issued a request at the final stage and notifies it to the prefetch request issue circuit 404 through a signal line 406. The prefetch request issue circuit 404 checks ready states of PCR in order from a PCR subsequent to the PCR that has issued the request at the final stage. The prefetch request issue circuit 404 determines the ready PCR that has been firstly found, as one for issuing a request next time and outputs its ID as a request PCR ID REQPCRN. The RDY signals are checked in increasing order of the PCR IDs and continues to be checked from the 0th signal after the fifteenth signal. When the ready PCR exists, the prefetch request issue circuit 404 issues a prefetch request PFREQ. In response to the PFREQ, the prefetch request issue circuit 404 sends a REQPCRN to the requested-PCR ID register 405 through a signal line 407 to update its contents.

Since the aforementioned request control is performed, the program can easily and efficiently assign the memory access instructions to be prefetched in the loop to the PCR in accordance with their description order.

The prefetch request issue circuit 404 sends the PFREQ and REQPCRN (whose value is defined as i) to the prefetch status control unit 201 through the signal line 205. Thereafter, the prefetch status control unit 201 reads out the contents of PCRi designated by these so as to be captured in the prefetch request control unit 202 through the signal line 206.

Reference numeral 408 indicates a pointer update unit which controls updating of a PDRTPi and a PDRQPi in response to the PFREQ. Therefore, the pointer update unit 408 takes in the present PDRTPi and PDRQPi through the signal line 206 and outputs values obtained by adding 1 to these with the PDRDPT as a modulus therefrom as updated values so as to be sent to the prefetch status control unit 201 through the signal line 205. These values are written into the corresponding field of the PCRi in response to the PFREQ.

Reference numeral 409 indicates a prefetch address control circuit which sends an updated value PFAi' of the prefetch address and an updated value SKIPCNTi' of the address skip count to the prefetch status control unit 201 through the signal line 205.

Reference numeral 410 indicates a PDSR update circuit for controlling the initialization or updating of a PDSR required incident to the issuance of the PFREQ. Upon issuance of the prefetch request, the PDSR update circuit 410 sends information for initially setting status flags of a PDSRi(j) incident to a PDRi(j) for storing data therein to the prefetched-data unit 203 through the signal line 209. These signals are of initially-set values of PFREQ, REQPCRN, PDRTPi, NRi, PFAi and DIi(j). Further, when the corresponding prefetch request is made from a linked PCR, the PDSR update circuit 410 also sends information for updating a status flag RC of a PDR for storing linked data therein simultaneously with the above.

The prefetch request control unit 202 sends the prefetch request and information accompanied thereby to the cache request unit 101 through the signal line 107. As the accompanied information, may be mentioned a PDR number REQPCRN at which data is stored thereat and its element position PDRTPi, a prefetch address PFAi and a BUFi.

Figure 5:
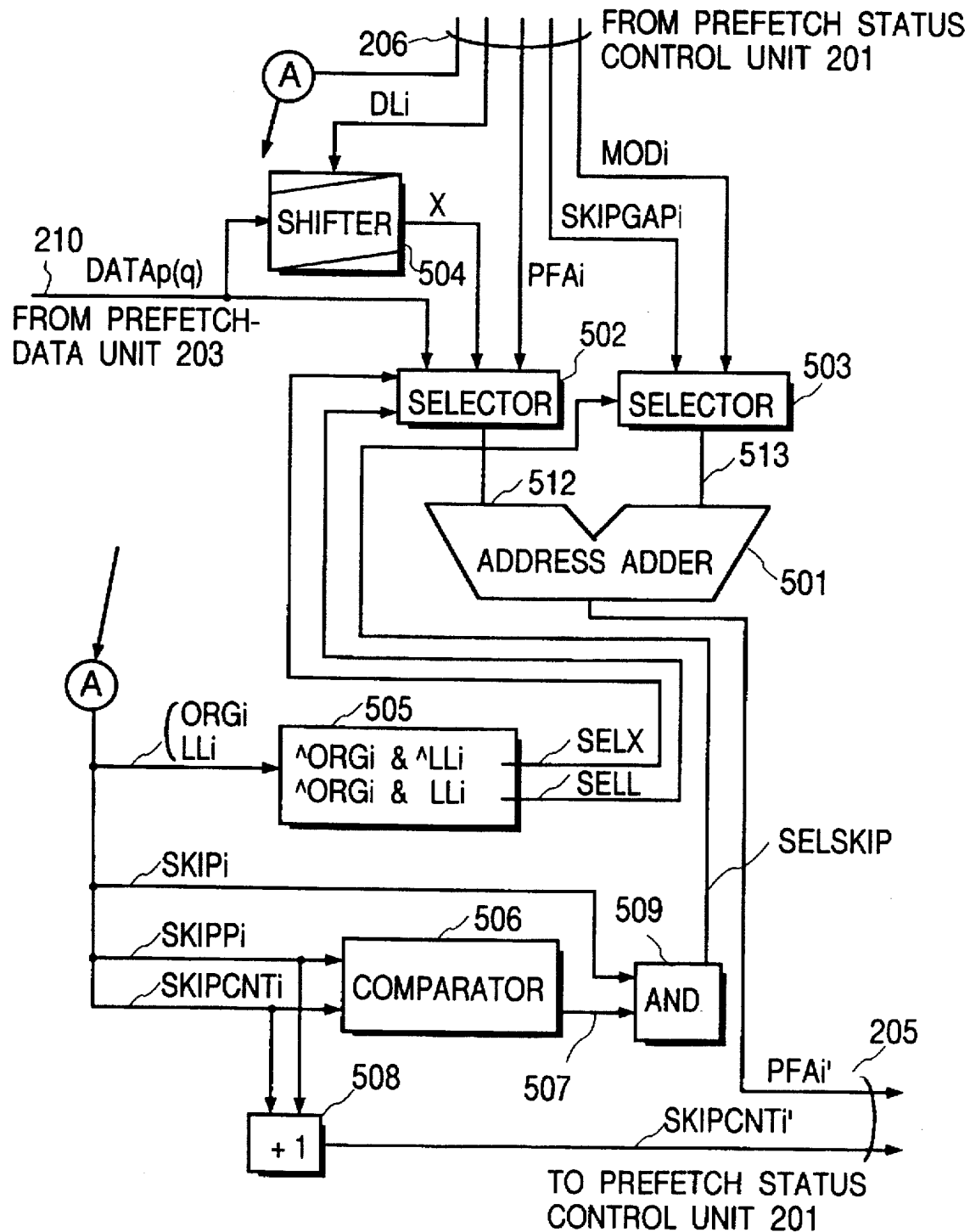
FIG. 5 shows a view schematically showing the configuration of a prefetch address control circuit employed in the information processing apparatus shown in FIG. 1.

The prefetch address control circuit 409 will be described in more detail using FIG. 5.

Reference numeral 501 indicates an address adder which sends the result of addition of input data to the prefetch status control unit 201 through the signal line 205 as the updated value PFAi' of the prefetch address. The input data are supplied from selectors 502 and 503 through signals lines 512 and 513 respectively.

The selector 502 selects one from a PFAi, an index X and linked data DATAp (q) in accordance with control lines SELX and SELL. The linked data DATAp(q) is inputted from the prefetched-data unit 203 through the signal line 210. Reference numeral 504 indicates a shifter which is supplied with the DATAp(q) and outputs the result obtained by shifting the data in a high-order bit direction by the number of bits designated by a prefetch length DLi as the index X. Reference numeral 505 indicates a control signal generation circuit for the selector 502, which is inputted with an ORGi and an LLi to generate the SELX and SELL. The SELX represents a select instruction for the index X and is on when a target vector relative to an indexed vector is prefetched. Further, the SELL shows a select instruction for the linked data DATAp(q) and is on when data of a second level or less in a linked list is prefetched.

The selector 503 selects either one of a MODi and a SKIPGAPi in accordance with a control line SELSKIP. When a SKIPCNTi reaches a SKIPPi upon designating the address skip (when SKIPi is on), the SELSKIP is on. Therefore, a comparator 506 compares the SKIPCNTi and the SKIPPi and sends the result of comparison to an AND circuit 509 through a signal line 507. The AND circuit 509 brings the output SELSKIP to on when they coincide with each other from the result of comparison and the SKIPi is on. Reference numeral 508 indicates an incrementer for adding 1 to the SKIPCNTi with the SKIPPi as a modulus, which sends an updated value of the SKIPCNTi to the prefetch status control unit 201. The prefetch status control unit 201 allows the PCRi to take in the updated value in response to the PFREQ.

It is possible to generate an updated value of the prefetch address according to the prefetch request and capture it to the PCRi in response to the PFREQ under the above control.

Figure 6:
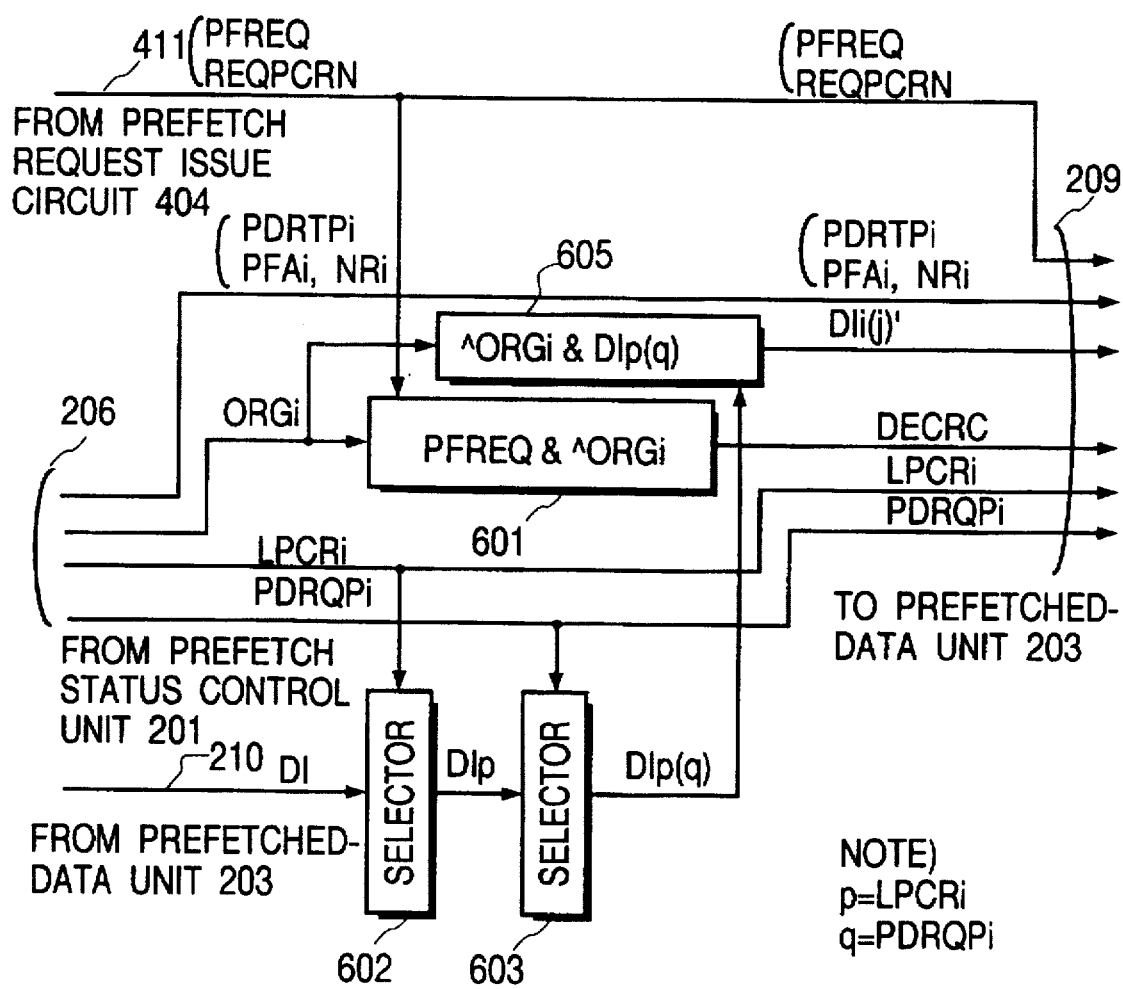
FIG. 6 shows a view schematically illustrating the configuration of a PDSR update control circuit employed in the information processing apparatus shown in FIG. 1.

The PDSR update circuit will be described in detail with reference to FIG. 6. When a PFREQ is issued from the origin PCR (ORGi is on), status information RC, RI, DA, DI and MDKEY incident to the PDSRi(j) are initially set. Namely, the number of references NRi is set to the RCi(j) and 1, 0 and 0 are respectively set to the RIi(j), DAi(j) and DIi(j). In the present embodiment, low-order 16 bits of the PFAi are set to an MDKEYi(j). Therefore, the PDSR update circuit 410 captures the PFREQ and REQPCRN from the prefetch request issue circuit 404 through a signal line 411 and takes in the PDRTPi, NRi and PFAi from the prefetch status control unit 201 through the signal line 206. The PDSR update circuit 410 sends these to the prefetched-data unit 203 through the signal line 209 as they are.

When the PFREQ is issued from the linked PCR (ORGi is off), it is necessary to update the status information RC belonged with the PDSR for storing linked data therein (subtract 1 therefrom). Therefore, the PDSR update circuit 410 takes in the ORGi through the signal line 206. The PDSR update circuit 410 also generates a RC update instruction DECRC signal using 601 and outputs it to the signal line 209. Further, the PDSR update circuit 410 reads out a number LPCRi (regarded as=p) of the corresponding PDSR and an element position PDRQPi (regarded as=q) through the signal line 206 and sends them to the prefetched-data unit 203.

A selector 602 selects the contents DIp of a number indicated by the LPCRi from DI fields of all the PDSR and supplies it to a selector 603. The selector 603 selects the contents DIp(q) of an element designated by the PDRQPi from the contents DIp and supplies it to an invalid flag generation circuit 605. The invalid flag generation circuit 605 generates an initially-set value of the DIi(j) at the time of the issuance of the PFREQ from the linked PCR. A condition for generating the value by the invalid flag generation circuit 605 means that when PDR data necessary to generate an address is invalid (DIp(q) is on) upon issuance of a linked request, there is the potential that the generated address and data read out using the address are invalid, thereby making it necessary to set the DI flag of the corresponding PDSR on (invalid). The initially-set value is sent to the prefetched-data unit together with the PFREQ and is set to the DIi(j).

(Prefetched-Data Unit 203)

Figure 7:
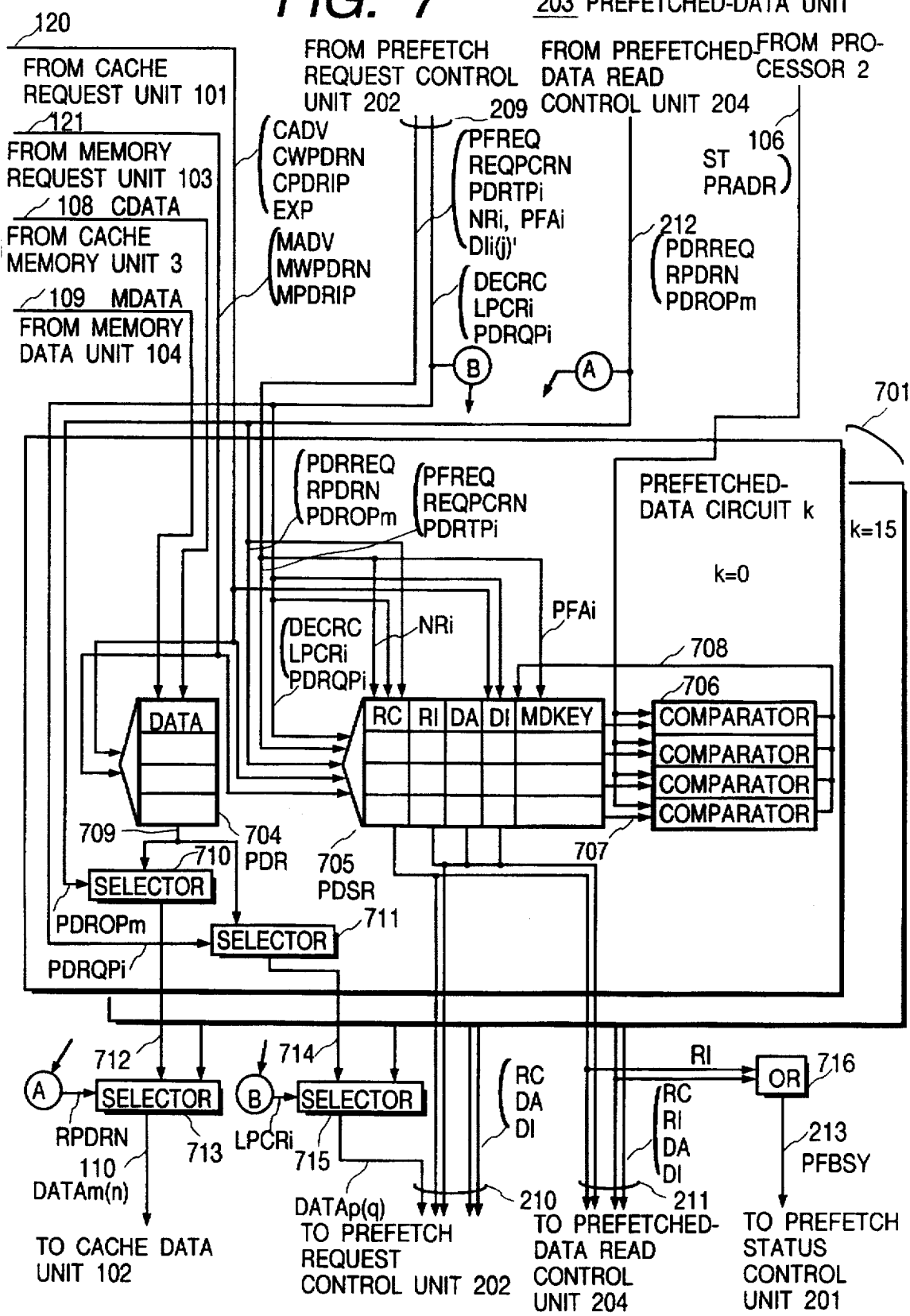
FIG. 7 shows a view schematically depicting the configuration of a prefetched-data unit employed in the information processing apparatus shown in FIG. 1.

The prefetched-data unit 203 will be described in more detail with reference to FIG. 7. The prefetched-data unit is provided with sixteen sets of prefetched-data circuits 701 corresponding to the PCR0 through 15. Each of the prefetched-data circuits is provided with the prefetched-data register (PDR) 704 composed of a plurality of data register elements each storing 8-byte data therein. The number of data register elements forming a single PDR is represented by a PDRDPT field of the corresponding PSR. There is a case in which the entire sixteen prefetched-data registers are called PDR. Data CDATA read out from the cache memory 1001 is stored in its corresponding PDR through the signal line 108. A data delivery instruction CADV, a PDR number CWPDRN and a storage element position CPDRIP for that purpose are supplied from the cache request unit 101 through the signal line 120. Data MDATA read out from the memory 1 is stored in the corresponding PDR through the signal line 109. A data delivery instruction MADV, a PDR number MWPDRN and a storage element position MPDRIP for this purpose are supplied from the memory request unit 103 through the signal line 121.

In order to read out data from the corresponding PDR upon the execution of an instruction by the processor 2, a PDRREQ, a RPDRN and a PDROPm are supplied from the prefetched-data read control unit 204. Each individual PDR supplies an element to a selector 710 through a signal line 709. The selector 710 selects it in response to the PDROPm (regarded as=n) and supplies the result of selection to a selector 713 through a signal line 712. The selector 713 selects data from a desired PDR based on the RPDRN (regarded as=m). This output data DATAm(n) is sent to the cache data unit 102 through the signal line 110.

In order to read linked data from the corresponding PDR in response to the issuance of a prefetch request from the linked PCR, the LPCRi and PDRQPi are supplied from the prefetch request control unit 202 through the signal line 209. Each individual PDR supplies an element to a selector 711 through the signal line 709. The selector 711 selects it in response to the PDRQPi (=q) and supplies it to a selector 715 through a signal line 714. The selector 715 selects data from a desired PDR based on the LPCRi (=p). This output DATAp(q) is sent to the prefetch request control unit 202 through the signal line 210.

Reference numeral 705 indicates a prefetched-data status register PDSR for holding status information corresponding to respective elements forming PDR therein. The meaning of the respective status information held in the PDSR, their initial setting and their update control will be described below.

Unreference Count; RC

The RC indicates the number of references that are not yet performed, of the number of references NR to be made to the corresponding element in a PDR. An element indicative of the fact that the RC becomes 0, is already used and is usable for the storage of data to be read out next time. When a prefetch request PFREQ with respect to the corresponding element using a PCRi is issued, the RC is used for initially setting the value of a reference number NRi field in the PCRi. Therefore, a PFREQ, a REQPCRN, a PDRTPi and an NRi are inputted to the present field of the PDSR 705. They are decremented each time data is transferred to the processor 2 and reference is made thereto in response to the issuance of a linked request. In order to perform data update at the time of the issuance of the linked request, a DECRC, an LPCRi and a PDRQPi are inputted to the PDSR 705. Further, a PDRREQ, a RPDRN and a PDROPm are inputted to the PDSR 705 to perform data update at the time of the transfer of the data to the processor 2.

Respective RI, DA, DI and MDKEY flags to be described below make representations valid only when the RC is of a non-zero.

Request Issued Flag; RI

The RI shows that a prefetch request for storing data in the corresponding element has been already issued and data do not yet arrive. The present flag is on upon issuance of PFREQ and is off when the data arrives. Therefore, the present flag of the PDSR 705 is inputted with a PFREQ, a REQPCRN and a PDRTPi for coping with the time when the request is issued, a CADV, a CWPDRN and a CPDRIP for coping with the time when the CDATA arrives, and an MADV, an MWPDRN and an MPDRIP for coping with the time when the MDATA arrives, respectively. Since on and off circuits for the respective flags can be easily configured, their description will be omitted. Flags and fields to be described later will be not described in the same manner.

Data Arrived Flag; DA

The DA represents that the corresponding data is in an already arrived and held state. The present flag is off when the PFREQ is issued, whereas it is on upon arrival of the data. Therefore, the present flag of the PDSR 705 is inputted with the PFREQ, REQPCRN and PDRTPi for coping with the time when the request is issued, the CADV, CWPDRN and CPDRIP for coping with the time when the CDATA arrives, and the MADV, MWPDRN and MPDRIP for coping with the time when the MDATA arrive, respectively.

Data Invalid Flag; DI

The DI shows whether data read out and held into the corresponding PDR element is valid. Data held in individual elements of the PDR are regarded as invalid when there is the potential that data at the corresponding memory address is brought up to date or renewed until the execution of a memory access instruction. Further, the data is also regarded as invalid even when an access exception is detected upon the corresponding data reference.

The initial setting of the present flag at the time of the issuance of the PFREQ differ according to whether the corresponding PCR is of the origin PCR or the linked PCR. When it is of the origin PCR, the present flag is initially set to 0. When it is of the linked PCR, a data invalid flag DIp(q) for linked data is initially set. This is because since there is a possibility that an address to be generated is also invalid when the linked data is invalid, data based on the address should be regarded as invalid. Therefore, an initially-set value DIi(j)' of the present flag annexed to the PFREQ is generated from the PDSR update circuit 410 and taken in the PDSR through the signal line 209 as described in FIG. 6. The PFREQ, REQPCRN and PDRTPi are inputted to the PDSR to designate an update time, a PDSR number and an element position.

When the access exception is detected by the cache request unit 101, the cache request unit 101 sends the access exception EXP along with the CADV signal through the signal line 120 and sets the present flag. The CADV, CWPDRN and CPDRIP are inputted to designate the update time, the PDSR number and the element position.

As will be described in the following MDKEY, the present flag is set when there is a possibility that prefetched data has been brought up to date in accordance with the store instruction executed by the processor 2.

Where the data in the PDR is found to be invalid when the memory access instruction that requests the prefetched data, is executed, the corresponding data is neglected and a memory request based on the memory access instruction is made active to read out data from the cache or memory 1 as usual. This operation is called prefetch buffer redirection PBR in the present specification but will be described in further detail.

Update Detection Key; MDKEY

The MDKEY is of a key for detecting the presence or absence of updating of an address of each prefetched data. The MDKEY sets prefetch addresses or some thereof upon issuance of the PFREQ. Therefore, the PFREQ, REQPCRN, PDRTPi and PFAi are inputted to the present field.

Reference numeral 706 indicates four sets of comparators for detecting the updating, which are provided every PDR elements. The comparator compares the operand address PRADR sent from the processor 2 and the value of the MDKEY supplied through a signal line 707 in response to the store instruction execution command ST sent through the signal line 106 from the processor 2. When they are found to coincide with each other from the result of comparison, the corresponding PDR data is regarded as invalid and the DI flag of the corresponding element is set on (invalid) through a signal line 708. In the embodiment in which the MDKEY is represented as some of the prefetch addresses, only the corresponding portion of the addresses is compared therewith. At this time, a comparison is established even when the address does not coincide with the above value in practice. In this case, however, no problem arises from the viewpoint of assurance of the proper operation of a program since the memory access instruction reads out data under the PBR operation.

Reference numeral 717 indicates a circuit for ORing all the RI flags. The circuit sends an output PFBSY to the prefetch status control unit 201 through the signal line 213. The PFBSY shows that a request is issued but no data arrived exists. A program refers to it to confirm whether the prefetch operation is brought into a pause state upon generation of an interrupt.

Each prefetched-data circuit sends the RC, DA and DI flags of all the PDSR to the prefetch request control unit 202 through the signal line 210 and transmits the RC, RI, DA and DI to the prefetched-data read control unit 204 thereto through the signal line 211.

Figure 12:
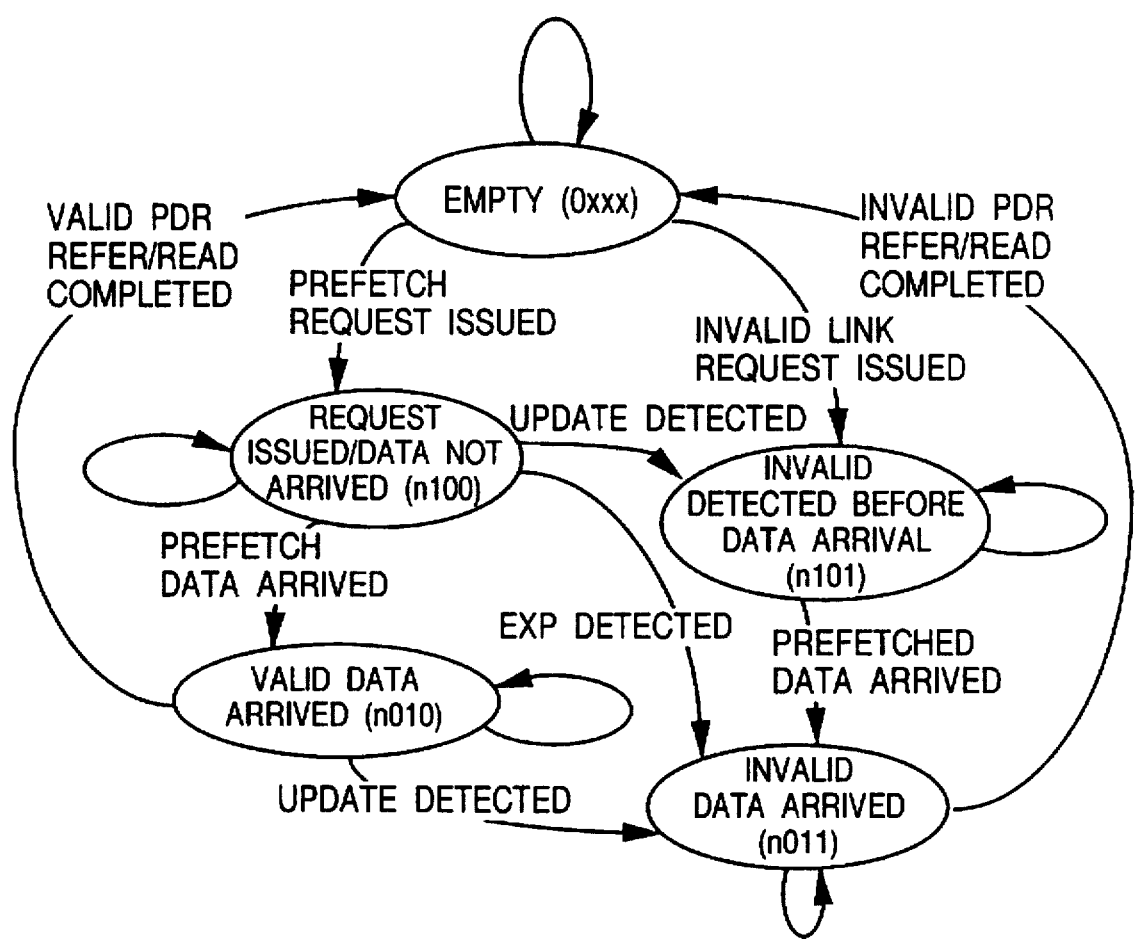
FIG. 12 shows a state transition diagram of PDR elements employed in the information processing apparatus shown in FIG. 1.

FIG. 12 shows a state transition diagram which relates to each element of a PDR and is indicated by the four types of status flags RC, RI, DA and DI.

Figure 8:
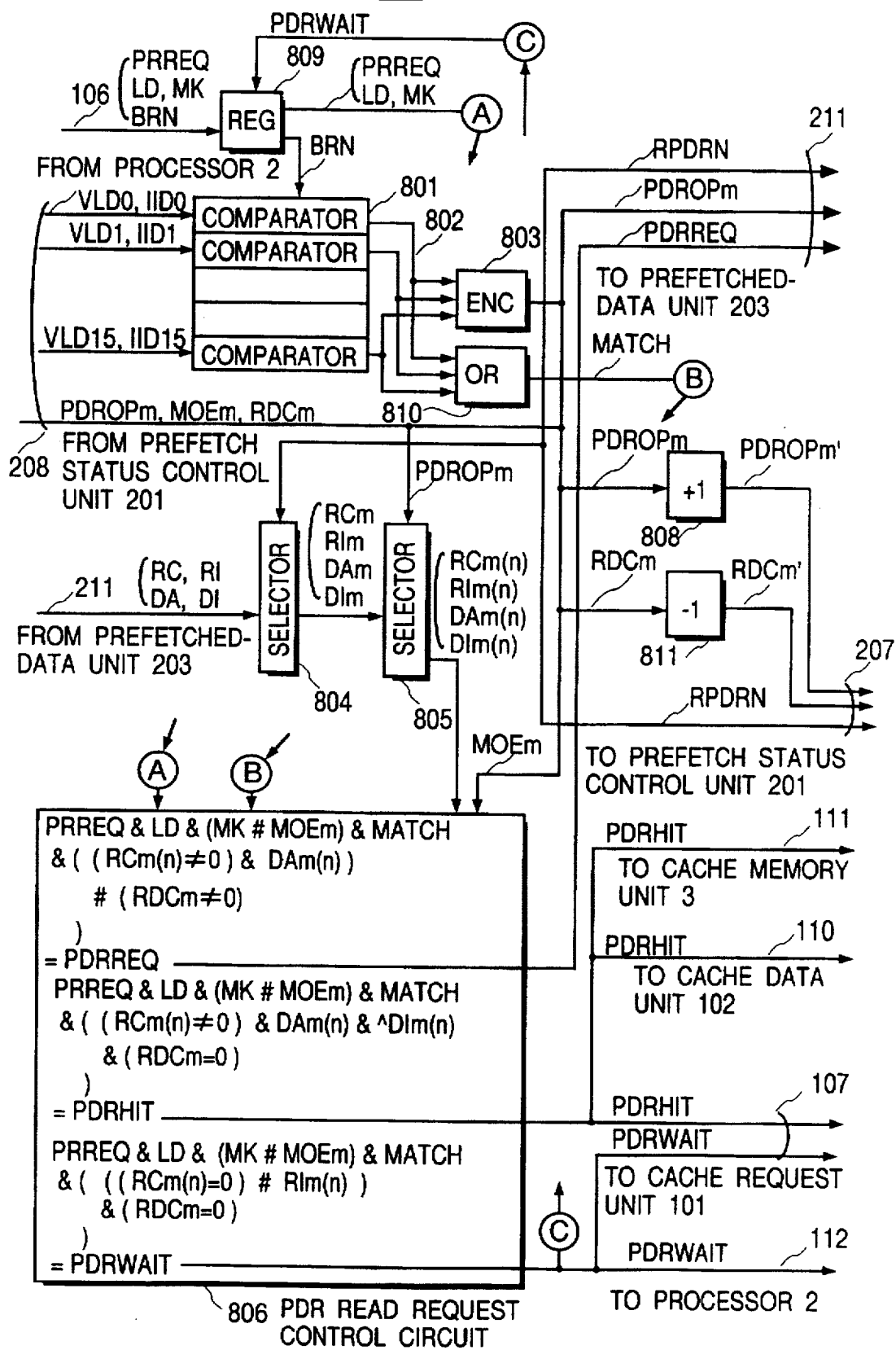
FIG. 8 shows a view showing the configuration of a prefetched-data read control unit employed in the information processing apparatus shown in FIG. 1.

FIG. 8 indicates the prefetched-data read control unit 204 for reading data from each PDR and controlling the transfer of the read data to the processor 2 and the like.

The prefetched-data read control unit 204 takes in the memory request PRREQ, the memory access instruction decode information LD, the base register number BRN of the memory access instruction and the mask register value MK indicative of the execution condition for the memory access instruction in response to the execution of the memory access instruction from the processor 2 through the signal line 106. When the MK is off, the corresponding instruction should be made invalid from the viewpoint of the program. However, processing is performed as if the MK is on inside the apparatus and only the writing of its result will be suppressed. Thus, the prefetched-data read control unit 204 can capture information about this instruction as well as the PRREQ regardless of the value of MK. Reference numeral 809 indicates a register for storing these taken-in information therein. When the PRREQ that requests the corresponding data, is issued before the prefetched data arrives, the register 809 holds these information therein until the arrival of data. Therefore, the PDRWAIT signal to be described later is inputted to the register 809 as a hold condition.

Reference numeral 801 indicates sixteen sets of comparators corresponding to each PCR. The comparators respectively compare respective IID fields thereof and the BRN supplied from the register 809 and respectively send the results of comparison to an encoder 803 and an OR circuit 810 through signal lines 802. Incidentally, a comparison is made to valid PCR (VLD is on) alone. The result of comparison about each ineffective PCR is constructed so as to insure 0.

The encoder 803 encodes a number of a PCR at which the coincidence is obtained from the results of comparison and outputs it therefrom as a RPDRN signal.

The output of the OR circuit 810 is of a MATCH signal indicative of the fact that each valid PCR associated with the corresponding memory access instruction exists.

A selector 804 is supplied with the RC, RI, DA and DI fields of all the PDSR from the prefetched-data unit 203 and selects the contents corresponding to a PDSR designated by the RPDRN signal at each field. RCm, RIm, DAm and DIm outputs produced from the selector 804 are inputted to a selector 805 from which the contents corresponding to each element of a PDSRm designated by the PDROPm sent through the signal line 208 are selected at each field.

An incrementer 808 is supplied with the PDROPm, adds 1 to the PDROPm with a PDRDPT as a modulus and outputs the result of addition as an updated value PDROPm'.

A decrementer 811 is inputted with the RDCm signal sent through the signal line 208 and outputs an updated value RDCm' obtained by subtracting 1 therefrom. When, however, the RDCm is already 0, it will remain at 0.

A PDR read request control circuit 806 is inputted with a PRREQ, an LD and an MK from the register 809, a MATCH from the OR circuit 810, a RCm(n), a RIm(n), a DAm(n) and a DIm(n) and a mask override designation MOEm from the signal line 208. The PDR read request control circuit 806 generates a PDR read request PDRREQ, a PDR hit signal PDRHIT and a PDR read wait signal PDRWAIT.

Conditions for generating the respective signals are represented as shown in the drawing. However, a description will be slightly made of their meanings. The condition for generating the PDRREQ will be considered in three parts.

(1) First Condition

The present condition is that a memory request based on a memory access instruction is issued from the processor 2 (PRREQ & LD are established). In this case, the memory access instruction should be either one of its execution being allowed (mask MK being on) and a designation that allows the designation of a mask to be neglected (MOEm being on).

(2) Second Condition

The present condition is that a valid PCR for prefetching data under the corresponding memory access instruction is designated (MATCH is on).

(3) Third Condition

The present condition is that data has been already read into a PDRm(n)((RCm(n)–0 & DAm(n) is established) or the reading of data for effecting the prefetch buffer redirection is unnecessary (RDCm–0).

In the case of the condition for generating the PDRHIT, only the third condition for the PDRREQ differs in the following manner. Namely, the present condition is that data valid for the PDRm(n) has been already read ((RCm(n)–0) & DAm(n) & ^DIm(n) are established) and it is necessary to read data (RDCm=0).

In the case of the condition for generating the PDRWAIT, only the third condition for the PDRREQ differs in the following manner. Namely, the present condition is that a request is not yet issued (RCm(n)=0) or no data arrives (RIm(n) is on) regardless of the fact that the reading of data into the PDRm(n) is necessary (RDCm=0).

The RPDRN, PDROPm and PDRREQ of the signals generated or captured by the prefetched-data read control unit 204 as described above are sent to the prefetched-data unit 203 through the signal line 211, the PDROPm', RDCm' and RPDRN of them are sent to the prefetch status control unit 201 through the signal line 207, the PDRHIT of them are respectively sent to the cache memory unit 3 and the cache data unit 102 through the signal lines 111 and 110, the PDRHIT and PDRWAIT of them are sent to the cache request unit 101 through the signal line 107, and the PDRWAIT of them is sent to the processor 2 through the signal line 112.

<Details of Circuit Units Related to Prefetch Unit>

Figure 9:
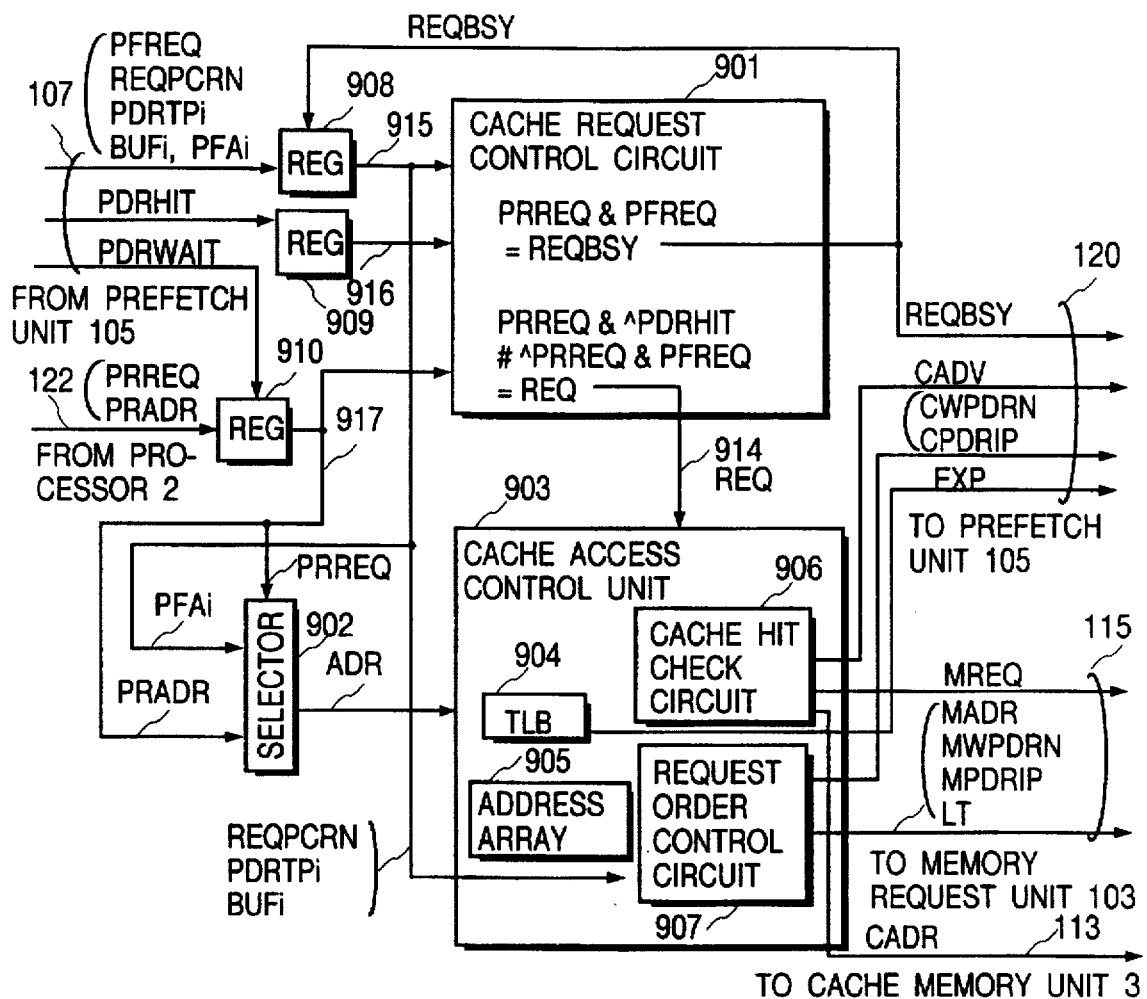
FIG. 9 shows a view schematically illustrating the configuration of a cache request unit 101 employed in the information processing apparatus shown in FIG. 1.

FIG. 9 shows the configuration of the cache request unit 101. The cache request unit 101 is inputted with the PFREQ, PDRHIT, PDRWAIT, PFAi, REQPCRN, PDRTPi and BUFi through the signal line 107. Further, the cache request unit 101 is supplied with the PRREQ and PRADR from the processor 2 through the signal line 122.

A register 908 is inputted with the prefetch request PFREQ and the PFAi, REQPCRN, PDRTPi and BUFi signals corresponding to its accompanying information. The register 908 holds the request and its accompanying information therein while the REQBSY to be described later is on and thereafter outputs same to a signal line 915. A register 909 is supplied with the PDRHIT signal and outputs it to a signal line 916 as it is. A register 910 is inputted with the PRREQ, PRADR and PDRWAIT. While the PDRWAIT is on, the register 910 holds the request and address therein and thereafter outputs same to a signal line 917.

Reference numeral 901 indicates a cache request control circuit. When memory requests are simultaneously issued, the cache request control circuit 901 assigns priorities to them. When the data is already read out by the prefetch unit, the cache request control circuit 901 suppresses an access to the cache memory 1001. Therefore, the cache request control unit 901 is inputted with the PFREQ through the signal line 915, the PRREQ through the signal line 917 and the PDRHIT through the signal line 916. The PDRHIT shows that the data valid or effective for the memory request PRREQ from the processor 2 has been already read out by the prefetch unit. In the present embodiment, the cache request control circuit gives priority to the PRREQ when the PFREQ and PPREQ are simultaneously issued. From the above, the request REQ signal to be sent to the cache memory 1001 or the memory 1 is generated when either one of the following two conditions is established.

1) PRREQ & ^PDRHIT
2) ^PRREQ & PFREQ

The REQ signal is sent to a cache access control unit 903 through a signal line 914.

When the PFREQ and PRREQ are simultaneously issued, the cache request control circuit 901 places PFREQ processing in a wait state. Further, the cache request control circuit 901 generates a REQBSY signal for putting the issuance of a subsequent prefetch request on hold and sends it to the prefetch unit 105 through the signal line 120.

A selector 902 selects an address in response to the selected request. Therefore, the selector 902 is supplied with the PFAi through the signal line 915 and the PRADR and PRREQ through the signal line 917. When the PRREQ is on, the selector 902 selects the PRADR and outputs it as an ADR signal therefrom. When the PRREQ is off, the selector 902 selects the PFAi and outputs it as the ADR signal therefrom.

Reference numeral 903 indicates the cache access control unit, which is provided with an address translation buffer mechanism (TLB) 904 for converting a virtual address into a real address, an address array 905 for holding addresses of data blocks registered in the cache memory 1001, a cache hit check circuit 906 for checking a cache hit from the result of retrieval by the TLB and the address array, and a request order control circuit 907 for holding and managing information affixed to a request. Since these are basically constructed under the application of the prior art to these, their detailed description will be omitted. The cache access control unit 903 is inputted with the REQ through the signal line 914 and the REQPCRN, PDRTPi and BUFi through the signal line 915. Further, the cache access control unit 903 is inputted with the ADR from the selector 902.

The cache access control unit 903 is responsive to the REQ given from the cache request control circuit 901 to thereby allow the TLB904 to convert an ADR indicative of a virtual address into a real address MADR. At this time, the TLB904 simultaneously checks the storage protection information registered in the TLB and generates an EXP signal when an access exception is detected. Next, the address array 905 is retrieved using the real address and the result of retrieval is checked by the cache hit check circuit 906. If the corresponding address is found to be registered, then the cache hit check circuit 906 judges the result of retrieval to be a cache hit. Further, the cache hit check circuit 906 generates a cache address CADR by the conventional method and sends it to the cache memory unit 3 through the signal line 113. Furthermore, the cache hit check circuit 906 generates a data delivery instruction CADV. If the corresponding address is found not to be registered, the cache hit check circuit 906 judges the result to be a cache miss and generates a memory request MREQ. The request order control circuit 907 sends the real address MADR to the memory request unit 103 through the signal line 115. When the prefetch buffer designation BUFi is on, the request order control circuit 907 sends a line transfer request LT incidentally to it.

The request order control circuit 907 takes in the REQPCRN and PDRTPi through the signal line 915. Upon the cache hit, the request order control circuit 907 sends both to the prefetch unit 105 as the CWPRRN and CPDRIP through the signal line 120. Upon the cache miss, the request order control circuit 907 sends both to the memory request unit 103 as the MWPDRN and MPDRIP through the signal line 115.

Figure 10:
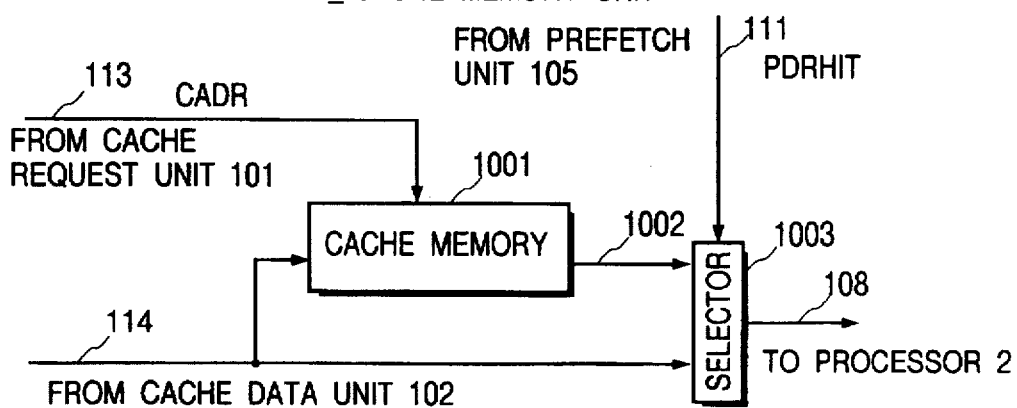
FIG. 10 shows a view schematically showing the configuration of a cache memory unit 3 employed in the information processing apparatus shown in FIG. 1.

FIG. 10 shows the details of the cache memory unit 3. The cache memory unit 3 captures the CADR from the cache request unit 101 through the signal line 113 and takes in data to be written into the cache and prefetched data from the cache data unit 102 through the signal line 114. Reference numeral 1001 indicates the cache memory which performs an access using the address CADR. The data to be written into the cache is inputted to the cache memory 1001 through the signal line 114. A selector 1003 is inputted with the data read from the cache memory 1001 and the data on the signal line 114 through a signal line 1002. The selector 1003 takes in the PDRHIT signal from the prefetch unit 105 through the signal line 111 and selects data in response to the signal. When the PDRHIT is on, the valid prefetched data read from the PDR is already sent to the signal line 114 and is selected by the selector 1003. The selector 1003 sends it to the processor 2 through the signal line 108. This brings about an advantageous effect for cost reduction because other data line becomes unnecessary upon construction of the processor 2.

<Supplementary Description of Prefetch Control>

A supplementary description will hereinafter be made of a prefetch function and operation and a method of executing the program, and the like with points unillustrated in the above description as the center.

(1) Type-Inherent Prefetch Control

A method of initially setting each PCR and prefetch control will be described below at each data structure type.

1) Sequential Vector

A prefetch for the sequential vector is designated by a single PCR. Initially-set information based on the program are as follows: The setting of fields with no description is unnecessary and hence this makes it useful in a reduction in set overhead. A description will be made below of examples of initially setting PCR based on a program example 1 shown in FIGS. 22A through 25. A PCR0 will be used herein.

ACT=1; start up prefetch operation
ORG=1; designate PCR as origin PCR
MOD=(8); stride is 8B
DL=(3); operand length is 8B
BUF=0; only PDR is used as prefetch buffer
IID=(GR12); 12 is designated as base register number of Load instruction
LA=1; designate existence of look-ahead control
LAC=(20); look ahead to 20 elements
SKIP=0; presence of address skip
PDRTP=0; designate leading element of PDR
BAL=0; (value identical to PDRTP)
NR=1; only memory access instruction accesses prefetched data
MOE=0; mask override designation is unnecessary
PFA=(&B(1)); initial element address of vector B (initial value of GR12)

2) Prefetch Control on Indexed Vector

The prefetch of the indexed vector is designated by the origin PCR for designating the control on the reading of an index and the linked PCR for controlling the reading of a target (normally represented as plural). A description will be made below of examples of initially setting PCR in a program example 2 shown in FIGS. 26A through 29 and examples of initially setting PCR in a program example 3 shown in FIGS. 30A through 33.

<Initialization of Origin PCR>PCR0 is used
ACT=1; start up prefetch operation
ORG=1; designate PCR as origin PCR for reading indexed vector
MOD=(8); stride is 8B
DL=(3); operand length of indexed vector is 8B
BUF=0; only PDR is used as prefetch buffer
IID=(GR10); 10 is designated as base register number of Load instruction
LA=1; designate existence of look-ahead control
LAC=(5); look ahead to 5 elements
SKIP=0; absence of address skip
PDRTP=0; designate leading element of PDR
BAL=0; (value identical to PDRTP)
NR=2; refer to corresponding PDR to generate prefetch addresses for Load instruction and Fload instruction
MOE=0; mask override designation is unnecessary
PFA=(&L(1)); initial element address of indexed vector L (initial value of GR10)

<Initialization of Linked PCR>PCR1 is used
ACT=1; start up prefetch operation
ORG=0; linked PCR for reading target vector B
MOD=(&B(1)); base address of target vector B
DL=(3); operand length of target vector B is 8B
BUF=1; both PDR and cache are designated as prefetch buffers
IID=(GR12); 12 is designated as base register number of Fload instruction
LA=0; designate absence of look-ahead control request is unnecessary because it belongs to reading of data in parent PCR
SKIP=0; absence of address skip
PDRTP=0; (program example 2)/1(program example 3)
BAL=0; (value identical to PDRTP)
NR=1; Fload instruction refers to corresponding PDR
MOE=0; (program example 2/1(program example 3)
LL=0; indicate that PCR is linked PCR for indexed vector
LPCR=(PCR0); designate origin PCR number
PDRQP=0; identical to PDRTP of origin PCR
PFA; no need for initialization Since the contents of PDR are empty-read in accordance with a Fload instruction (position (7,3) in FIG. 32) in a prologue stage, whose execution is suppressed by the designation of the mask override in the case of the program example 3, it is noted that the PDRTP of the linked PCR is initially set to 1.

Each of read addresses for the target vector is generated by adding a value obtained by shifting a read indexed-vector element by the number of bits designated by DL to a modifier for the linked PCR. The generated address is held in a PFA field of the linked PCR and used for a prefetch request.

3) Prefetch Control on Linked Lists

The prefetch of the linked lists is designated by two or more PCR for controlling the reading of data in a plurality of multi-level tables linked with the highest sequential vector and its elements as the starting points. Initially-set information based on a program are as follows:

<Origin PCR>
ACT=[0/1]; when ACT=1, start up prefetch operation
ORG=1; designate PCR as origin PCR for reading indexed vector
MOD=(stride)

DL=(designate operand length of indexed vector)

BUF=[0/1]; [PDR/cache]

IID=(base register number)

LA=[0/1]; designate presence or absence of look-ahead control

SKIP=[0/1]; when SKIP=1, need designation of SKIPP and SKIPGAP

PDRTP; when MOE=0 and MOE=1, designate the number of empty readings of PDR in prologue stage BAL=0; (value identical to PDRTP)

NR=[2/3/ ... ]; designate the number of accesses to PDR with table elements of highest levels stored therein MOE=[0/1]; mask override designation PFA=(base address); initial element address of indexed vector <Initialization of Linked PCR>

ACT=[0/1]: when ACT=1, start up prefetch operation

ORG=0; designate PCR as linked PCR for reading low-level list

MOD=(displacement); displacement of next level relative to linked data in table

DL=(designate length of linked data)

BUF=0/1; [PDR/cache]

IID=(base register number)

LA=0; designate absence of look-ahead control (request is unnecessary because it belongs to reading of data in parent PCR)

SKIP=0; skip is unnecessary

PDRTP; when MOE=0 and MOE=1, the number of executions of memory access instruction in prologue stage BAL=(value identical to PDRTP)

RN=[1/2/ ... ]; designate 1 in the case of PCP of the lowest level and designate the number of accesses to PDR storing corresponding data therein in the case of other levels MOE=[0/1]; mask override designation LL=1; designate PCP as being linked PCR in linked lists LPCR=(parent PCR number)

PDRQP=(identical to PDRTP of parent PCR)

PFA; initialization is unnecessary

Each of read addresses of data to be generated by a baby PCR is obtained by adding a modifier of the baby PCR to a high element (linked data) read by a parent PCR. The generated address is held in a PFA field of the baby PCR and used for a prefetch request. The control on the issuance of the prefetch request by the baby PCR is similar to that on the prefetch for the indexed vector.

(2) Address Skip Function

The present embodiment includes an address skip function. The address skip function is effective for applying the prefetch to a partial reference to a multidimensional array.

There may be a case where since elements on the periphery of the array provides a boundary condition upon numerical calculations using the multidimensional array, they are not used for principal calculations. There may also be a case where an array added with intentionally-unaccessed elements is defined to avoid competition between memory banks. FIGS. 16A and 16B show an example in which a partial access to a two-dimensional array is performed. In this case, an array A (100, 200) with 100 elements in column and 200 elements in row is read out on a column priority basis. In this program, a portion of A (1-99, 1-199) surrounded by a thick frame is accessed. Namely, it is necessary to continuously perform the prefetch from the top row element of the next column without accessing the final row element on each column upon data prefetch. Memory regions blocked by contiguous 99 elements among which intervals are defined one element by one element, are used as actually-accessed ones. When the prefetch is started up every times at each column, overheads are developed, thereby causing the risk that the speeding up cannot be sufficiently achieved. Since the blocked memory regions can be read out at each prefetch start-up even in this case, the present address skip function is effective for a reduction in overheads.

The address skip function can bring about a great effect where the entire capacity of data is large to the order of capacity exceeding that of the cache and a prefetch start-up time cannot be neglected as compared with an execution time of the innermost loop. When an execution cycle of the innermost loop is 50 cycles per iteration and an overhead of 25 cycles acts on the startup of the prefetch in the case of a three-dimensional array of 100×100×100, for example, the present function can provide the prospect of speedups of about 50%.

(3) Interrupt Processes

A detailed description will be made below of processes based on hardware and software at the time that an interrupt is triggered during a prefetch operation. The interrupt processes related to the prefetch operation differ according to the type of exception event indicative of the cause thereof. The type of exception event is classified into four as follows:

Recoverable Exceptions Detected During Prefetch Operation

Example: a page fault, a TLB misfault at prefetch

Unrecoverable Exceptions Detected During Prefetch Operation

Example: a data memory protection check, a nonalign data access trap at prefetch Recoverable Exceptions Detected Independent of Prefetch Operation Example: a page fault and a TLB misfault detected by memory accesses according to an external interrupt and an instruction execution Unrecoverable Exceptions Detected Independent of Prefetch Operation Example: a high priority machine check, a memory protection check detected by a memory access according to an instruction execution.

When the type of exception event indicative of the cause of an interrupt is of a recoverable one, the prefetch can continue after its resumption. In the present embodiment in this case, only necessary prefetch control information is saved and recovered and an overhead is reduced without saving and recovering data in a prefetched-data register.

Outlines of processes related to a prefetch at the time that an interrupt is generated in the information processing apparatus illustrative of the present invention, will be described below.

1) Detection of Exception

An access exception EXP incident to memory reading for the prefetch is detected based on the indexes of the TLB 904 in the cache request unit 101.

The detection of the access exception is required upon execution of the corresponding memory access instruction from the processor 2. This is because since the timing for executing and suppressing a subsequent instruction at the time of the detection of the exception is critical, there may be a case where it is difficult to use the result of detection obtained according to the request processing at the prefetch. Thus, the prefetch unit does not report the exception to the processor 2. The detection of the access exception by the processor 2 is performed based on the indexing of a TLB (not shown) in the processor 2 as usual.

2) Operation at the Time of Exception Detection

When an exception EXP is detected incidentally to a prefetch request, a data invalid flag DI attached to a PDR element corresponding to the corresponding request is set on to indicate the invalidity of data. Even in this case, the subsequent data prefetch continues. The reasons of this continuation are as follows:

Since there is the potential that the execution of the corresponding memory access instruction is suppressed under conditional execution control, the corresponding exception is not necessarily detected.

There may be cases where no exceptions are produced at the subsequent addresses when the subsequent data addresses are quite separate in the case of, for example, a non-contiguous sequential vector, an indexed vector and a prefetch of a linked list.

When the prefetch made to the subsequent data is stopped, the memory access instruction is kept waiting for prefetched data so that backup can be generated.

3) On-Interrupt Operation

When an exception is detected upon execution of the corresponding memory access instruction, the execution of the corresponding instruction is suppressed and an on-interrupt operation based on hardware is executed. At this time, the processor 2 reports the occurrence of the interrupt to the prefetch unit 105 using the INT signal. The prefetch unit 105 sets the SUSP flag of the corresponding PSR. Thus, all the prefetch operations stop the issuance of the subsequent requests and waits for data arrival completion relative to the already issued request. When all the data arrive, the PFBSY flag of the PSR is off under the hardware operation. This state of the prefetch mechanism is called a pause state. The processor 2 reads a PSR at the head of the interrupt routine and confirms that the prefetch mechanism is in the pause state, followed by execution of the subsequent interrupt routine. When the contents of a PSR, a PCR, a PDR and a PDSR, which are indicative of prefetch information, are saved upon a recoverable interrupt while the interrupt is being served, namely, when the prefetch mechanism illustrative of the present embodiment is not used at all until the program returns to the original program, it is unnecessary to save these in accordance with the interrupt routine. Thus, processing overheads necessary for the corresponding process are not produced.

When there is no assurance that the corresponding prefetch information are saved upon the recoverable interrupt while the interrupt is being served, the interrupt routine needs saving of only the PSR and PCR in the present embodiment. The saving/recovery is executed in accordance with the instruction. Since the re-reading of the PDR is performed after its reset from the interrupt even in this case, the saving of the PDR is unnecessary. While the saving of the PDSR is also unnecessary, it is necessary to initialize status information as will be described subsequently.

Upon the recoverable interrupt, the prefetch operation is made invalid by resetting the valid flags VLD of all the PCR in accordance with the interrupt routine. In this case, the saving of various resources related to the prefetch is unnecessary.

4) On-Reset Operation From Interrupt

The interrupt routine effects recovery processing on a PSR and a valid PCR upon resetting of the program from an interrupt being unable to assure the storage of the prefetch information. During that time, the SUSP flag is set to ensure that the prefetch operation does not run forward with the PCR information while being recovered. When the storage of the prefetch information is ensured while the interrupt is being served, the corresponding recovery operation is unnecessary.

The SUSP flag is reset by executing an instruction immediately before the returning of the interrupt routine to the original program. Thus, the prefetch mechanism is brought into an operating state according to the designation of the recovered PCR so that the prefetch operation is resumed. By executing a return instruction from the interrupt routine, the processor 2 resumes the execution of the original program. With the return from the interrupt, a prefetch request is issued by using the recovered PFA and data is stored from a PDR element designated by the recovered PDRTP. This element is positioned next to PDR elements corresponding to the number indicated by the BAL field, which have been abandoned by the interrupt.

When the resumption of the prefetch is not suited after the interrupt upon hard failure detection of a specific circuit related to the prefetch mechanism, for example, the VLD flag is set off in accordance with a PCR initialize instruction so as to enable the invalidity of the prefetch. Even in this case, the proper operation of the program is ensured by the following prefetch buffer redirection.

5) Prefetch Buffer Redirection

When the prefetched data is invalid due to the updating or the occurrence of the access exception, the control for reading the proper data from the cache memory 1001 or the memory 1 is executed upon execution of the corresponding memory access instruction as already described. As already described, this control is performed by unissuing the PDRHIT signal for suppressing the processing of the memory access instruction according to the memory request PRREQ. This operation is called prefetch buffer redirection, which will be abbreviated as PBR.

Even when it is desired to access the prefetched data abandoned upon interruption after the interrupted program has been resumed, the above PBR is used. Namely, a redirection data count RDC field of a PCR is set to a BAL at the time of the occurrence of the interrupt upon program recovery from the interrupt. If the RDC is not zero each time the memory access instruction is executed, then the prefetch unit continuously performs the PBR. The RDC is decremented one by one each time memory data is read. A PDROP points a PDR element position where the oldest one of the abandoned data has been held, upon its reset. Thereafter, the PDROP is incremented each time the PBR operation is performed.

Figure 19A:
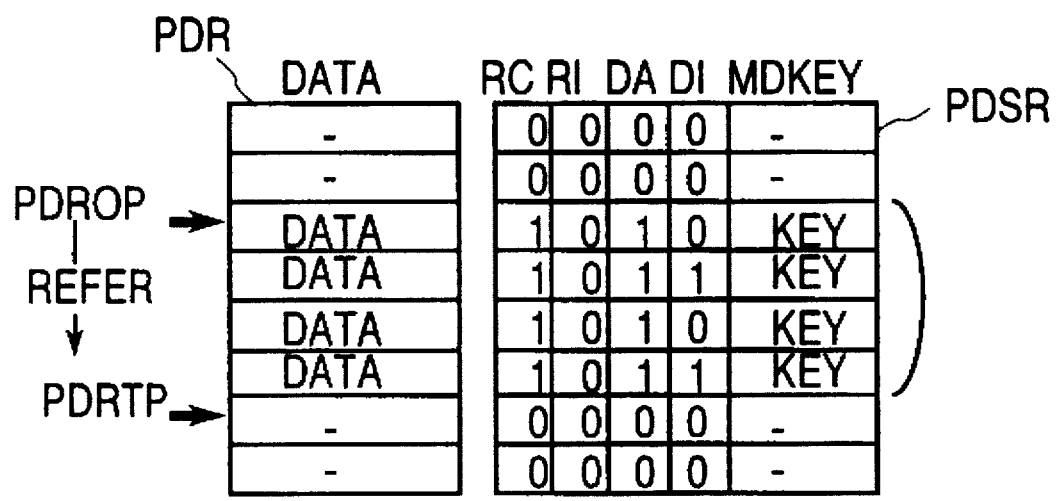
FIG. 19A shows an example of an status of a PDR and a PDSR before control is shifted to an interrupt processing routine in the information processing apparatus shown in FIG. 1.
Figure 19B:
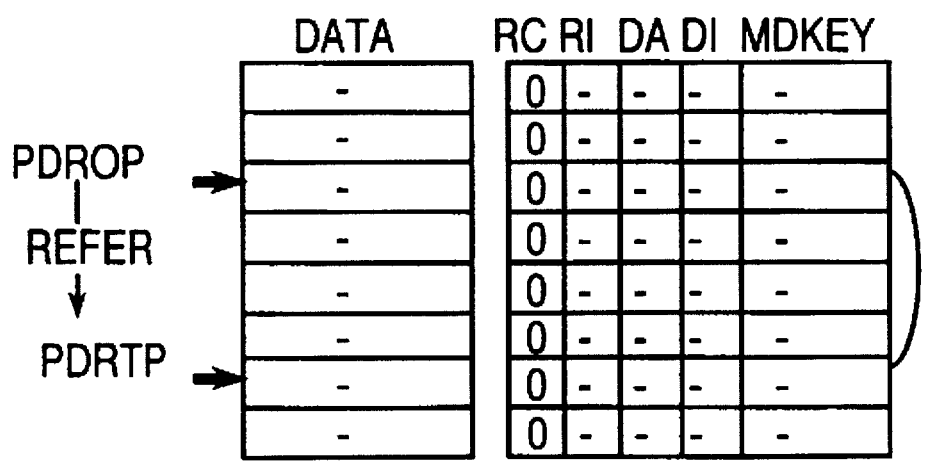
FIG. 19B shows an example of an status of the PDR and the PDSR after control is returned to an interrupted program in the information processing apparatus shown in FIG. 1.

FIGS. 19A and 19B show status examples of PDR and PDSR at the context switch. FIG. 19A illustrates the status of a PDR and a PDSR before the control is delivered to the interrupt routine. In this case, n data indicated in the BAL field are stored in the corresponding PDR and data invalid flags DI are set to some of them by updating. Even if the interrupt occurs, these PDR and PDSR are not saved. FIG. 19B shows the status of a PDR and a PDSR immediately after the control has returned to the interrupted program. In this case, the PDROP, PDRTP and BAL recover the contents at interruption in accordance with the program and the redirection data count RDC is set to the same value n as the BAL. All the contents of RC fields of the PDSR are initially set to 0. When a memory access instruction associated with the corresponding PDR is executed and a PDR read request is issued, data is read from the cache memory 1001 or the memory 1 under the prefetch buffer redirection. This prefetch buffer redirection is performed while the RDC is not 0. Further, the RDC is decremented by 1 at each PDR reading and the PDROP proceeds to the next stage. In doing so, the proper program operation can be ensured even if the data in the PDR are not saved and recovered upon interruption. Further, the efficiency of interrupt processing can be enhanced by reducing a processing time required to save and recover the data.

(4) Coherency Control

In the present prefetch system, hardware assures the coherency between the PDR and the cache memory 1001 in accordance with the prefetch buffer redirection. Namely, when the corresponding data is updated under a store instruction until the data is read out in accordance with a memory access instruction after the execution of a prefetch start-up instruction, the program ensures that the memory access instruction accepts the updated data.

Figure 20:
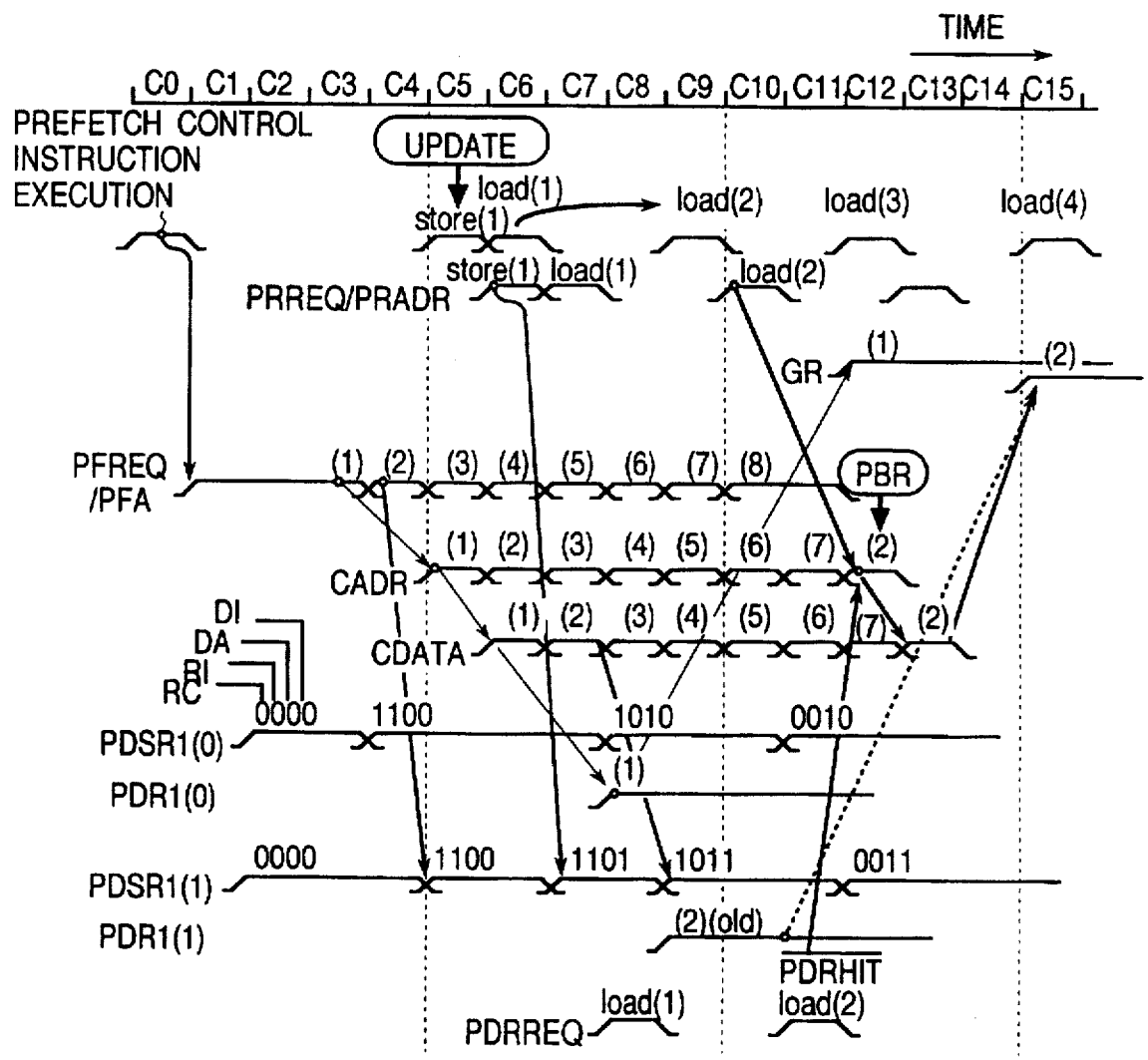
FIG. 20 shows a time chart for describing coherency assurance under the control of hardware in the information processing apparatus shown in FIG. 1.

An example of this control time chart will be shown in FIG. 20. The same drawing illustrates the manner in which load instructions for accessing the corresponding data are repeatedly executed under loop control after a prefetch has been started up by the execution of an instruction for setting the prefetch. Numerals with ( ) affixed to the load instructions indicate the number of times that loops exist. In the case of the present program, a store instruction of a first loop updates an operand for a load instruction of a second loop. In the present example, the prefetch unit starts to issue a prefetch request from a third cycle (C3) at each cycle after a prefetch address has been set to the corresponding PFA. The prefetch address PFA is converted into a cache address CADR and read cache data CDATA is stored in its corresponding PDR1(0). When a load instruction (1) is executed, a PDR read request PDRREQ is generated. Further, the data stored in the PDR1(0) is read out and stored in the general purpose register GR of the processor 2 in C12. A prefetch request corresponding to a load instruction (2) is issued in C4 and the status of a PDSR1(1) is changed to (1100) correspondingly. Since updating is detected upon execution of a store instruction (1), the state of the PDSR is changed to (1101). Since the data arrives subsequently, the status thereof is changed to (1011). When a load instruction (2) is executed, the invalidity of the data is recognized or identified from the status of the PDSR and hence a PDRHIT is suppressed so that the PBR is executed. Thus, a memory request address for the load instruction (2) is set as the cache address in C12 in place of the prefetch address. The read data of the load instruction (2) is changed to data in a PDR1(1), which is antecedent to being updated, and is stored in the corresponding register in the processor 2 in C15.

Owing to the assurance of the coherency by hardware, the program logically no requires considering the order of the store instruction and the prefetch start-up instruction upon ensuring the operation at the time that the prefetch is applied. Therefore, this is effective with a view toward achieving code optimization for executing the prefetch start-up instruction as earlier as possible and reducing start-up overheads.

In the present embodiment, the coherency is ensured by hardware. When, however, the updating of prefetched data frequently occurs, embodiments are also considered wherein an influence is exerted on the performance. In such a case, the coherency can be ensured while avoiding the influence exerted on the performance by look-ahead or prefetch control. This will be described by the following example.

<Example>

```
        DO 10 I = 1, N =
          A (I - M)
          A(I) =
       10 CONTINUE
```

Figures 21A, 21B, 22A, 22B:
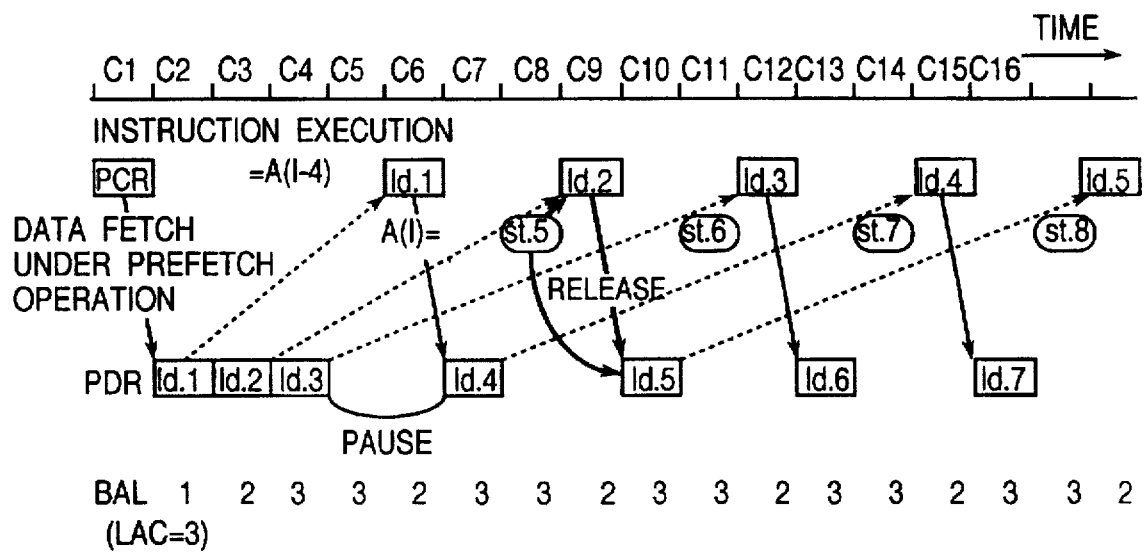
FIG. 21A shows an example of a program used for describing coherency assurance under look-ahead control in the information processing apparatus shown in FIG. 1.
FIG. 21B shows a time chart for describing the coherency assurance under look-ahead control in the information processing apparatus shown in FIG. 1.
FIG. 22A shows an example of a source program employed in the information processing apparatus shown in FIG. 1.
FIG. 22B shows an example of a program obtained after triple loop unrolling of the source program.

In the present example, symbol M is regarded as has been known at compile time. In the example, the prefetch is regarded as being effective for an improvement in performance even if a look-ahead count LAC is designated so as to meet LAC<M. Since the prefetch does not proceed ahead of the data finally transferred to the memory access instruction in excess of the number indicated by LAC at this time, data prefetch based on the A(I–M) is not generated before the updating of A(I) to the corresponding data. Accordingly, the updated data is always prefetched so that the coherency is ensured. One example of a time chart for describing a data coherency assuring operation under the look-ahead control is shown in FIGS. 21A and 21B.

The present example shows the coherency assurance at the time of reading of an array element A(I–4) in a DO loop shown in the same drawing. Since the array element A(I–4) in the loop is always updated upon execution of a loop before four times, it is necessary to read the result of its updating. Therefore, the look-ahead count LAC is designated as 3 and the look ahead based on the prefetch is limited to three elements. Since the value of the BAL reaches the LAC when data reading for a load instruction (3) is completed in a fourth cycle (C4), the issuance of a request is put on held. When a load instruction (1) (abbreviated as ld.1) is executed in C6 and PDR data is read out, the BAL is brought to 2, so that a prefetch request can be issued. It is thus possible to ensure that the next prefetch of ld.5 is executed after execution of an instruction of ld.2. On the other hand, the writing st.5 of data into an array element A(5) to be executed before prefetching of ld.5 is executed before ld.2 as is apparent from the program. Accordingly, the instruction ld.5 is executed after completion of st.5 and thereby updated data can be obtained.

<Program Examples>

Several programs, which access or refer to the data structures corresponding to objects, will now be described in accordance with an optimizing system for providing the speeding up, an object program to which the system is applied, and instruction execution traces employed in the present information processing apparatus.

FIGS. 22A and 22B show a program which accesses or refers to a sequential vector B. This case assumes that a loop length 3N is long and a vector B(I) exceeds the capacity of the cache in the processor 2. The optimization for accessing an externally-provided cache (hereinafter called simply cache memory) of the processor 2 is performed. Assuming that about 7 cycles are required to access the cache memory 1001 in the present embodiment, the following loop unrolling and instruction scheduling are applied. A source program is first brought to triple loop unrolling as shown in FIG. 22B. Instructions obtained by unrolling this loop portion to the object program and subjecting it to the instruction scheduling will be shown in FIG. 23. In the drawing, the instructions are described three by three per row. This is intended to easily see the correspondence with the source program after the loop unrolling as shown in FIG. 22B. Instruction positions on the memory 1 are aligned in the form of a first row and a first column (hereinafter described as (1,1)), (1,2),(1, 3)(2,1), . . . Namely, if the instructions up to three rows are described in accordance with a normal writing way, then they are expressed as follows:

| | |
|---|---|
| [MR2]Fload(GR12)→FR2; B(I) | (1,1) |
| [MR3]And MR3, MR10→MR3 | (1,2) |
| [MR2]Add GR12+d1→GR12 | (2,1) |
| [MR1]Set 1 to MR3 | (2,2) |
| [MR4]Fstore FR4→(GR13); A(I+2) | (2,3) |
| (3,2)[MR1]And MR3, MR10→MR3 | |
| (3,3)[MR4]Add GR13+d2→GR13 | |

Mask register numbers (designated by rm) for controlling the presence or absence of execution of the instructions are assigned to the heads of the instructions. FIGS. 24 and 25 show alignment (traces) of executed instructions at the time that the objects have been executed. In the original program, however, a loop length is set to 6 (N=2) for simplicity. Upon a first execution of an object program in a loop, the initial one instruction on a second column and the initial three instructions on a third column are of instructions whose executions are unnecessary. They are executed under condition execution control because the initial values of mask registers are set as shown in the same drawing. It is necessary to note that MR1 is always 1 (expressed as true in a logical value). A first program execution stage including this execution suppression is called prologue stage. In the case of a second execution, all the instructions in the loop are executed. This program execution stage is called body stage. In this example, the body stage is executed once. However, the body stage is normally repeatedly executed according to the loop length. In the case of a third execution, the instructions of twenty-first through twenty-sixth rows and a twenty-eighth row of the first column, the instructions of twenty-fourth through twenty-ninth rows of the second column and the instructions of twenty-seventh and twenty-eighth rows of the third column are suppressed from execution. This final loop execution stage is called epilogue stage. Eventually, an actual ATA is stored in a PDR1(0) in practice. When the load instruction (1) is executed, a PDR read request PDRREQ is generated and the data stored in the PDR1(0) is read out and stored in the general purpose register GR of the processor 2 in C12. A prefetch request associated with the load instruction (2) is issued in C4 and correspondingly the state of a PDSR1(1) is changed to (1100). Since updating is detected upon execution of the store instruction (1), the status of the PDSR is changed to (1101). Since data arrives subsequently, the state of the PDSR is changed to (1011). When the load instruction (2) is executed, it is recognized that the data is invalid from the status of the PDSR, so that the PDRHIT is suppressed to execute the PBR. Thus, a memory request address for the load instruction (2) is set as the cache address in C12 in place of the prefetch address. The read data of the load instruction (2) is changed to data in a PDR1(1), which is antecedent to being updated, and is stored in the corresponding register in the processor 2 in C15.

Owing to the assurance of the coherency by hardware, the program logically no requires considering the order of the store instruction and the prefetch start-up instruction upon ensuring the operation at the time that the prefetch is applied. Therefore, this is effective at achieving code optimization for executing the prefetch start-up instruction as earlier as possible and reducing start-up overheads.

In the present embodiment, the coherency is ensured by hardware. When, however, the updating of prefetched data frequently occurs, embodiments are also considered wherein an influence is exerted on the performance. In such a case, the coherency can be ensured while avoiding the influence exerted on the performance by look-ahead or prefetch control. This will be described by the following example.

<Example>

```
DO 10 I = 1, N =
   A (I - M)
   A(I) =
10 CONTINUE
```

In the present example, symbol M is regarded as has been known at compile time. In this example, the prefetch is regarded as being effective for an improvement in performance even if a look-ahead count LAC is designated so as to meet LAC<M. Since the prefetch does not proceed ahead of the data finally transferred to the memory access instruction in excess of the number indicated by LAC at this time, data prefetch based on the A(I–M) is not generated before the updating of A(I) to the corresponding data. Accordingly, the updated data is always prefetched so that the coherency is ensured. One example of the time chart for describing the data coherency assuring operation under the look-ahead control is shown in FIGS. 21A and 21B.

The present example shows the coherency assurance at the time of reading of an array element A(I–4) in a DO loop shown in the same drawing. Since the array element A(I–4) in the loop is always updated upon execution of a loop before four times, it is necessary to read out the result of its updating. Therefore, the look-ahead count LAC is designated as 3 and the look ahead based on the prefetch is limited to three elements. Since the value of the BAL reaches the LAC when data reading for a load instruction (3) is completed in a fourth cycle (C4), the issuance of a request is put on held. When a load instruction (1) (abbreviated as ld.1) is executed in C6 and PDR data is read out, the BAL is brought to 2, so that a prefetch request can be issued. It is thus possible to ensure that the next prefetch of ld.5 is executed after execution of an instruction of ld.2. On the other hand, the writing st.5 of data into an array element A(5) to be executed before prefetching of ld.5 is executed before ld.2 as is apparent from the program. Accordingly, the instruction ld.5 is executed after completion of st.5 and thereby updated data can be obtained.

<Program Examples>

Several programs, which access or refer to the data structures corresponding to objects, will now be described in accordance with an optimizing system for providing the speeding up, an object program to which the system is applied, and instruction execution traces employed in the present information processing apparatus.

FIG. 22A shows a program which accesses or refers to a sequential vector B. This case assumes that a loop length 3N is long and a vector B(I) exceeds the capacity of the cache in the processor 2. The optimization for accessing an externally-provided cache (hereinafter called simply cache memory) of the processor 2 is performed. Assuming that about 7 cycles are required to access the cache memory 1001 in the present embodiment, the following loop unrolling and instruction scheduling are applied. A source program is first brought to triple loop unrolling as shown in FIG. 22B. Instructions obtained by unrolling this loop portion to the object program and subjecting it to the instruction scheduling will be shown in FIG. 23. In the drawing, the instructions are described three by three per row. This is intended to easily see the correspondence with the source program after the loop unrolling as shown in FIG. 22B. The instruction positions on the memory 1 are aligned in the form of a first row and a first column (hereinafter described as (1,1)), (1,2),(1,3)(2,1), . . . Namely, if the instructions up to three rows are described in accordance with a normal writing way, then they are expressed as follows:

| | |
|---|---|
| [MR2]Fload(GR12)→FR2; B(I) | (1,1) |
| [MR3]And MR3, MR10→MR3 | (1,2) |
| [MR2]Add GR12+d1→GR12 | (2,1) |
| [MR1]Set 1 to MR3 | (2,2) |
| [MR4]Fstore FR4→(GR13); A(I+2) | (2,3) |
| [MR1]And MR3, MR10→MR3 | (3,2) |
| [MR4]Add GR13+d2→GR13 | (3,3) |

Mask register numbers (designated by rm) for controlling the presence or absence of execution of the instructions are assigned to the heads of the instructions. FIGS. 24 and 25 show alignment (traces) of executed instructions at the time that the objects have been executed. In the original program, however, a loop length is set to 6 (N=2) for simplicity. Upon a first execution of an object program in a loop, the initial one instruction on a second column and the initial three instructions on a third column are of instructions whose executions are unnecessary. They are executed under condition execution control because the initial values of mask registers are set as shown in the same drawing. It is necessary to note that MR1 is always 1 (expressed as true in a logical value). A first program execution stage including this execution suppression is called prologue stage. In the case of a second execution, all the instructions in the loop are executed. This program execution stage is called body stage. In this example, the body stage is executed once. However, the body stage is normally repeatedly executed according to the loop length. In the case of a third execution, the instructions of twenty-first through twenty-sixth rows and a twenty-eighth row of the first column, the instructions of twenty-fourth through twenty-ninth rows of the second column and the instructions of twenty-seventh and twenty-eighth rows of the third column are suppressed from execution. This final loop execution stage is called epilogue stage. Eventually, the instructions to be executed would be only those surrounded by frames.

When this code is executed, a floating point number memory access instruction Fload at a position (1,1) causes a floating point register FR2 to take a vector element B(I) from a seventh cycle. Addresses have been stored in a general purpose register GR12. It is necessary to process nine instructions until a floating point number store instruction Fstore at a position (5,1), which accesses an FR2, is executed. The present processor 2 needs nine cycles. Thus, since the necessary data has been already captured in the FR2, the Fstore instruction is executed without queuing. A Fload instruction at a position (4,2) reads out the next vector element B(I+1). Since, however, the FR2 is being used, the vector element B(I+1) is taken in an FR3. However, a register for storing an address shares the use of the GR12.

A data reference latency longer than a pipeline pitch can be hidden in other instruction process by optimally scheduling the object code after the loop unrolling in this way. In the present embodiment, if all the data are held in the cache memory 1001, then the object program can be executed without queuing for data reference as described above. If, however, the data are unable to fully enter into the cache memory 1001, then the queuing takes place. In order to avoid this, there is considered a method of making a further enhancement in multiplicity of the loop unrolling. Since, however, the number of necessary registers increases, limitations are imposed to this method. The present embodiment is effective at solving this problem.

FIG. 26A shows an example of a program that refers to an indexed vector B. The indexed vector is L. In the same manner as the program example 1, the program is also brought to triple loop unrolling as shown in FIG. 26B to thereby generate objects as shown in FIG. 27. For simplicity, the length of a loop is defined as 3 (N=1) and traces resultant from its instruction execution are illustrated in FIGS. 28 and 29. Instructions executed under condition execution control are surrounded and indicated by frames.

FIG. 30A illustrates an example of a program that refers to an indexed vector. The result is saved in a vector A only in the case of the stipulation that the value of an index is positive. In regard to this as well, a translated source program is shown in FIG. 30B, an object program is illustrated in FIG. 31 and instruction execution traces are depicted in FIGS. 32 and 33.

As has been described above, the information processing apparatus according to the present embodiment can bring about the following features.

1) Data Prefetch Asynchronous with Processor

A prefetch operation with respect to each individual data is performed asynchronously with the processor 2 without executing an explicit prefetch instruction. It is thus possible to avoid a reduction in performance, which is caused by an instruction execution neck developed in synchronous prefetching.

2) Prefetch in Data Units

In a data unit prefetch mechanism, data are read one by one in association with a memory access instruction that needs the data and held in the corresponding prefetch data register (PDR). Even in the case of data on the same address, the data are read out again according to the memory access instruction and stored in different places on the prefetch data register (PDR). The above prefetch in the data units is fit to refer to a large-scale sequential vector, a non-contiguous sequential vector large in stride, etc. and prefetch data low in re-use probability.

3) Prefetch in Address Units

Since there is provided a function for storing prefetched data in the cache memory 1001, an advantageous effect can be brought about in that a load imposed on the memory 1 is reduced by prefetching the data from this cache, where the prefetch made to the same address frequently occurs. This is effective at referring to a target vector in indexed vectors and low data of a linked list, for example.

4) Prefetch Address

Since an address generated for a prefetch request should be identical to an operand address for a memory access instruction, it is a virtual address. The prefetch request is generated asynchronously with the processor 2 and is held in a dedicated prefetch address register.

5) Prefetched-Data Buffer

Dedicated prefetch data registers (PDR) for holding read data therein are provided to perform data prefetching in data units. Since the PDR are provided, the required value of throughput accessed to the cache can be suppressed to the same degree as when no prefetch is used. Thus, the provision of the PDR is effective at reducing an increase in cost.

6) Initialize and Request Control

Upon prefetch execution, the initialization and startup of control information and the stoppage of its supply are performed in accordance with dedicated instructions.

7) Control on Transfer of Data to Processor 2

The transfer of the data from a prefetch buffer to the processor 2 is requested by executing the corresponding memory access instruction. However, the memory access instruction is identified with its base address register number as a key. Thus, an instruction dedicated to the transfer is unnecessary. Further, an extension such as provision of an identification field for the conventional instruction or the like is also unnecessary.

8) Look-Ahead Control

When the execution time of the corresponding memory access instruction is defined as reference, the time at which the corresponding data is read, can be controlled. Namely, control for allowing only data necessary for instruction execution that stays n times ahead of the execution of the memory access instruction to be prefetched can be carried out. It is therefore possible to avoid contamination of the cache with the unnecessary data. Further, the look-ahead control can be also used for the assurance of data coherency.

9) Coherency Control on PDR

The coherency between the PDR and cache is ensured by hardware using a store address check and a mechanism called prefetch buffer redirection PBR. Namely, when a store instruction updates a prefetching region after the startup of prefetch, the hardware ensures that a memory access instruction refers to updated data.

10) Data Skip Function Associated with IF Statement

Even if an IF statement exists in a loop, the present prefetch can be applied by skipping prefetched data under empty transfer even when a conditional memory access instruction is suppressed from execution.

11) Address Skip Function

Upon generating prefetch addresses relative to a sequential vector, the addresses can be updated on a non-linear basis at predetermined intervals. Thus, when the innermost loop is repeatedly executed to partially access a multidimensional array, the entire necessary data can be prefetched by one prefetch startup. This is effective at reducing startup overheads at the prefetch and providing the speeding up.

12) Context Switch that Eliminates the Need for Saving and Recovery of Data

A context switch incident to an interrupt makes it unnecessary to perform saving and recovery of a PDR. Data abandoned upon interruption are read again by a PBR mechanism after their return. This is effective at speeding up the context switch.

According to various features of the present invention, as has been described above, an information processing apparatus having a prefetch circuit with a higher function can be provided.

According to one feature of the present invention, for example, data held in a cache memory can be used at prefetching in the information processing apparatus in which the cache memory exists in a memory such as a main memory or the like.

According to another feature of the present invention, a plurality of groups of data can be prefetched.

According to a further feature of the present invention, data having structures complex as compared with a simple vector such as an indexed vector or the like can be also prefetched.

According to a still further feature of the present invention, a prefetch circuit can be obtained which is applicable even when an IF statement exists in a loop, by skipping prefetched data under empty transfer even when a conditional memory access instruction is suppressed from execution.

According to a still further feature of the present invention, when prefetch addresses relative to a sequential vector are generated, the addresses can be non-linearly updated at predetermined intervals. Thus, when the innermost loop is repeatedly executed to partially access a multidimensional array, the entire necessary data can be prefetched by one prefetch startup. This is effective at reducing startup overheads at the prefetch and providing the speeding up.

According to a still further feature of the present invention, even if an interrupt is generated within the information processing apparatus, the use or non-use of prefetched data can be controlled.

What is claimed is:

1. An information processing apparatus, comprising:

(a) a storage device for holding a program and data;

(b) a processor connected to said storage device for executing instructions included in the program;

(c) a cache memory connected to said storage device for holding a copy of blocks held therein;

(d) a cache control circuit connected to said cache memory and said processor for controlling accesses to said cache memory;

(e) a prefetch circuit connected to said processor and said storage device for prefetching a group of data designated by said program from said storage device, before said program uses said group of data;

wherein said prefetch circuit includes:

(e1) a group of storage regions;

(e2) a prefetch data request circuit responsive to a data prefetch request issued by said processor for sequentially issuing to said cache control circuit, a group of prefetch data read requests which request readout of a group of data designated by said data prefetch request, and responsive to subsequent supply of said group of data to said prefetch circuit for sequentially writing said supplied group of data into said group of storage regions, according to a predetermined order of said storage regions; and (e3) a prefetch data supply circuit responsive to a data read request issued by said processor after said data prefetch request for detecting whether data designated by said data read request is held in one of said group of storage regions, and for transferring said designated data from one of said group of storage regions to said processor, in case said designated data is held in said one storage region;

wherein said cache control circuit includes:

(d1) a prefetch data transfer circuit responsive to each of said group of prefetch data read requests issued by said each prefetch data read request circuit for transferring data designated by said prefetch data read request to said prefetch circuit, in case said designated data is held in said cache memory; and (d2) a prefetch data read request circuit responsive to said each prefetch data read request for requesting said storage device to read said designated data, in case said designated data is not held in said cache memory.

2. An information processing apparatus according to claim 1, wherein said prefetch circuit further includes:

(e4) a data transfer prohibit circuit which prohibits said cache control circuit from transferring said data designated by said data read request issued by said processor, in case said designated data is held in one of said group of storage regions within said prefetch circuit;

wherein said cache control circuit further includes:
- (d3) a read data transfer circuit connected to said processor and responsive to said data read request issued thereby for transferring said data designated by said data read request from said cache memory to said processor, under a condition that transfer of said designated data is not prohibited by said transfer prohibit circuit, in case said designated data is held in said cache memory; and
- (d4) a read data request circuit responsive to said data read request for supplying said storage device with a first block transfer request which requests transfer a first block which includes said designated data, in case said designated data is not held in said cache memory, under a condition that transfer of said designated data is not prohibited by said transfer prohibit circuit, said read data request circuit further transferring said designated data included in said first block to said processor, in case said first block is transferred to said cache memory from said storage device.

3. An information processing apparatus according to claim 2, further comprising a storage device control circuit for controlling accesses to said storage device;

wherein said data request circuit provided in said cache control circuit includes a first circuit for supplying said storage device control circuit with a second block transfer request which requests said storage device to read out a second block which includes data designated by one of said group of prefetch data read requests, in case said data designated by said one prefetch data read request is not held in said cache memory;

wherein said storage device control circuit includes a storage device access circuit responsive to said second block transfer request for reading out and transferring said second block from said storage device to said cache memory and for transferring said data designated by said one prefetch data read request and included in said read out second block to said prefetch circuit.

4. An information processing apparatus according to claim 3, wherein said prefetch data read request circuit further includes:
a second circuit responsive to said one of said group of prefetch data read requests for supplying said storage device control circuit with a prefetch data transfer request which requests readout of said data designated by said one prefetch data read request from said storage device and transfer of said designated data to said prefetch circuit; and
a third circuit connected to said first and second circuit and responsive to said data prefetch request issued by said processor for controlling said first and second circuits so that either said first circuit supplies said second block transfer request or said second circuit supplies said prefetch data transfer request, depending upon whether said data prefetch request issued by said processor includes predetermined information;

wherein said storage device access circuit included in said storage device control circuit includes; a fourth circuit connected to said third circuit and responsive to said second block transfer request for reading out and transferring said second block from said storage device to said cache memory and transferring said data designated by said one prefetch data read request and included in said read out data to said prefetch circuit, and responsive to said prefetch data transfer request for reading and transferring said data designated by said one prefetch data read request from said storage device to said prefetch circuit.

5. An information processing apparatus according to claim 3, wherein said cache control circuit includes a circuit responsive to a write request issued by said processor which designates data to be written and an address of a location of said storage device for writing into said cache memory, said data designated by said write request;

wherein said prefetch circuit includes:
a circuit responsive to said write request for detecting whether data having said address designated by said write request is held in one of said group of storage regions; and
a circuit connected to said detecting circuit and responsive to detection that data having said designated address is held in one of said group of storage regions for invalidating said data held in said one region;

wherein said data transfer prohibit circuit includes a circuit responsive to said data read request issued by said processor for not prohibiting said cache control circuit from transferring said data designated by said data read request issued by said processor, in case said designated data is held in one of said group of storage regions but has been invalidated by said invalidating circuit.

6. An information processing apparatus, comprising:
(a) a storage device for holding a program and data;
(b) a processor connected to said storage device for executing instructions included in the program;
(c) a prefetch circuit connected to said processor and said storage device for prefetching a plurality of groups of data designated by said program from said storage device, before said program uses said plurality of groups of data;

wherein said processor includes:
- (b1) a plurality of registers which can be designated by instructions included in said program;
- (b2) a circuit for issuing a plurality of data prefetch requests to said prefetch circuit, each data prefetch request designating at least data structure of a group of data to be fetched by said each data prefetch request and a base register number of a base register for holding a base address used in common to said group of data;
- (b3) a circuit responsive to a data read instruction which requests readout of data from said storage device for calculating an address of said data, based upon contents held in one of said registers having a base register number designated by said instruction and other address information designated by said instruction;
- (b4) a circuit responsive to said data read instruction for issuing to said prefetch circuit a data read request which includes said calculated address of said data and said base register number designated by said data read instruction;

said program being programmed so that a group of data read instructions which are included in said program and each of which requests readout of one of said group of data prefetched by one of said plurality of data prefetch requests, designate a same base register number as one designated by said one data prefetch request;

wherein said prefetch circuit includes:
 (c1) a plurality of groups of storage regions;
 (c2) a circuit connected to said processor and said plurality of groups of storage regions and responsive to each group of said groups of data prefetch requests issued by said processor for assigning one group of storage regions within said groups of storage regions to said each data prefetch request;
 (c3) a circuit connected to said circuit for assigning, for holding, in correspondence to each group of storage regions within said groups of storage regions, a base register number designated by one of said groups of data prefetch requests which has been assigned to said each group of storage regions;
 (c4) a prefetch data read circuit responsive to each of said groups of data prefetch requests issued by said processor for reading from said storage device, a group of data having data structure designated by said each data prefetch request, and for sequentially writing said group of data into a group of storage regions within said groups of storage regions as have been assigned to said each data prefetch request according to a predetermined order of storage regions;
 (c5) a circuit connected to said processor and responsive to a data read request issued thereby for detecting, based upon a base register number held in correspondence to each group of storage regions, whether one group of storage regions among said groups of storage regions have been assigned to a data prefetch request which has designated a same base register number as one designated by said data read request, said detecting being executed based upon said base register number held for each group of storage regions; and
 (c6) a prefetch data supply circuit connected to said processor and said circuit for detecting, for supplying said processor with one of group of data held in one group of storage regions, in case said one group of storage regions has been assigned to said base register number as designated by said data read request, wherein said prefetch data supply circuit includes a circuit for sequentially reading a group of data from one group of storage regions within said groups of storage regions according to said predetermined order of storage regions, in response to a group of data read requests issued by said processor, wherein said group of data read requests designate a same base register number as one which has been designated by one of said group of data prefetch requests which has been assigned to said one group of regions.

7. An information processing apparatus according to claim 6, wherein said circuit included in said processor for issuing said plurality of data prefetch requests includes a circuit for issuing a data prefetch request which designates data structure of a simple vector whose elements have a predetermined address increment, as data structure of a group of data to be prefetched.

8. An information processing apparatus according to claim 6, wherein said circuit included in said processor for issuing said plurality of data prefetch requests includes a circuit for issuing a data prefetch request which designates data structure of a two-dimensional array, as data structure of a group of data to be prefetched, wherein said two-dimensional array comprises a plurality of simple vectors which are mutually separated by a predetermined address increment, wherein each simple vector has elements which have a predetermined address increment.

9. An information processing apparatus according to claim 6, wherein said circuit included in said processor for issuing said plurality of data prefetch requests includes a circuit for issuing a data prefetch request which designates data structure of an indexed vector, as data structure of a group of data to be prefetched, wherein said indexed vector comprises a first simple vector and a second simple vector whose elements includes indexes to elements of said first vector to be prefetched, wherein said elements of each of said first and second simple vectors have a predetermined address increment.

10. An information processing apparatus according to claim 6, wherein said circuit included in said processor for issuing said plurality of data prefetch requests includes a circuit for issuing a data prefetch request which designates data structure of a link list, as data structure of a group of data to be prefetched, wherein said link list comprises a plurality of stages of tables, elements of each table including positional information of an element of one of said plurality of tables succeeding to said each table.

11. An information processing apparatus, comprising:
 (a) a storage device for holding a program and data;
 (b) a processor connected to said storage device for executing instructions included in the program; and
 (c) a prefetch circuit connected to said processor and said storage device for prefetching a plurality of groups of data designated by said program from said storage device, before said program uses said plurality of groups of data;
wherein said processor includes a circuit for issuing a plurality of data prefetch requests to said prefetch circuit, each data prefetch request designating a group of data to be fetched, said plurality of data prefetch requests including at least one data prefetch request which includes, a data structure designation information which designates a group of data to be fetched by said one data prefetch request, data structure information designating at least one other group of data which are used to calculate addresses of said group of data to be fetched;
wherein said prefetch circuit includes:
 (c1) a plurality of groups of storage regions;
 (c2) a first read circuit connected to said processor and said plurality of groups of storage regions and responsive to said one data prefetch request issued by said processor for sequentially reading said other group of data from said storage device and for sequentially writing said other group of data into a first group of storage regions within said groups of storage regions according to a predetermined order of storage regions;
 (c3) a circuit connected to said groups of storage regions and responsive to said one data prefetch request for generating a group of addresses for said group of data to be fetched, based upon said other group of data held in said first group of storage regions;
 (c4) a second read circuit connected to said circuit for generating said group of addresses, for sequentially reading out said group of data from said storage device, based upon said generated group of addresses, and for sequentially writing said read out group of data into a second group of storage regions within said plurality of groups of storage regions according to predetermined order of storage regions;

(c5) a circuit connected to said processor and responsive to a data read request issued thereby for detecting whether data requested by said data read request is held in said second group of storage regions, based upon address information designated by said data read request; and (c6) a prefetch data supply circuit connected to said processor and said circuit for detecting, for supplying said processor with said data requested by said data read request from said one region, in case said second group of storage regions holds said data requested by said data read request.

12. An information processing apparatus, comprising:
(a) a storage device for holding a program and data;
(b) a processor connected to said storage device for executing instructions included in the program; and
(c) a prefetch circuit connected to said processor and said storage device for prefetching a group of data designated by said program from said storage device, before said program uses said group of data;
wherein said processor includes a circuit for issuing a data prefetch request requesting to prefetch a group of data comprised of a plurality of sequentially-ordered partial groups of data, each partial group including elements addresses thereof being spaced from an adjacent element by a first predetermined address increment, an address of a last element of each partial group being spaced by a second predetermined address increment from an address of a start element of a partial group of data succeeding to said each partial group;
wherein said prefetch circuit includes:
(c1) a plurality of storage regions;
(c2) an address generating circuit connected to said processor and said plurality of storage regions and responsive to said data prefetch request issued by said processor for sequentially generating addresses of said group of data, said circuit including;
a first circuit for sequentially generating addresses of data belonging to each partial group, based upon said first address increment, and
a second circuit responsive to generation of addresses of data of each partial group by said first circuit for generating an address of starting data of a partial group succeeding to said each partial group, based upon said second address increment,
(c3) a data read circuit connected to said address generating circuit and said plurality of storage regions for sequentially reading out said group of data from said storage device, based upon said addresses generated by said address generating circuit and for sequentially writing said read out group of data into said group of storage regions;
(c4) a circuit connected to said processor and responsive to a data read request issued thereby for said storage device, for detecting whether data requested by said data read request is held in said group of storage regions, based upon address information designated by said data read request; and
(c5) a prefetch data supply circuit connected to said processor and said circuit for detecting, for supplying said processor with said data requested by said data read request from said one region, in case said second group of storage regions holds said data requested by said data read request.

13. An information processing apparatus, comprising:
(a) a storage device for holding a program and data;
(b) a processor connected to said storage device for executing instructions included in the program; and
(c) a prefetch circuit connected to said processor and said storage device for prefetching a group of data designated by said program from said storage device, before said program uses said group of data;
wherein said processor includes:
(b1) a plurality of mask registers, each mask register holding mask information which controls execution of an instruction which designates said each mask register;
(b2) a circuit for issuing a data prefetch request to said prefetch circuit, said data prefetch request designating a group of data to be fetched and one of said plurality of mask registers; and
(b3) a circuit responsive to each of a plurality of data read instructions each of which requests readout of data from said storage device for issuing each of a plurality of data read requests to said prefetch circuit, each data read request including address information designated by said each data read instruction and contents of one of said plurality of mask registers designated by said each data read instruction;
wherein said prefetch circuit includes:
(c1) a group of storage regions;
(c2) a prefetch data read circuit connected to said processor, said storage device and said group of storage regions and responsive to said data prefetch request issued by said processor for sequentially reading said group of data designated by said data prefetch request from said storage device and for sequentially writing said group of data into said group of storage regions according to a predetermined order of storage regions;
(c3) a circuit connected to said processor and responsive to each of said plurality of data read requests issued thereby for detecting whether said data requested by said each data read request is held in said group of storage regions, based upon said address information designated by said each data read request; and
(c4) a prefetch data supply circuit connected to said processor, said circuit for detecting and said group of storage region, for supplying said processor with data requested by each of said plurality of data read requests from said group of storage regions, in case said group of storage regions holds said data requested by said each data read request;
wherein said prefetch data supply circuit includes:
a circuit connected to said group of storage regions and responsive to a group of data read requests within said plurality of data read requests issued by said processor for sequentially reading a group of data from said group of storage regions according to said predetermined order of said storage regions, wherein said group of data read requests are ones data requested by each of which is held in said group of storage regions; and
a circuit connected to said circuit for sequentially reading and responsive to contents of one of said plurality of mask register designated by each of said group of data read requests for controlling readout of data requested by said each data read request so that said requested data is read out or not read out, depending upon whether said contents of said designated mask has a predetermined value or not.

14. An information processing apparatus according to claim 13, wherein said data prefetch request issued by said processor includes mask use information which indicates use of contents of one of said plurality of mask registers designated by a data read request issued by said processor;

wherein said prefetch data supply circuit includes a circuit connected to said circuit for controlling, for prohibiting said circuit for controlling from responding to contents of one of said plurality of mask registers designated by each of said group of data read requests, in case said mask use information designated by said data prefetch request does not indicate use of contents of a mask register.

15. An information processing apparatus, comprising:

(a) a storage device for holding a program and data;

(b) a processor connected to said storage device for executing instructions included in the program; and (c) a prefetch circuit interposed between said processor and said storage device;

wherein said processor includes a circuit for issuing a data prefetch request to said prefetch circuit, said data prefetch request designating a group of data to be fetched:

wherein said prefetch circuit includes:

(c1) a prefetch data read circuit connected to said processor and said storage device and responsive to said data prefetch request issued by said processor for sequentially reading said group of data designated by said data prefetch request from said storage device;

(c2) a group of storage regions for holding said group of data;

(c3) a prefetch data supply circuit connected to said processor and said prefetch data read circuit and responsive to execution of an instruction by said processor which requests reference to one of said group of data held in said group of storage regions, for supplying said processor with said data designated by said instruction from said group of storage regions, in case said group of storage regions hold said data requested;

(c4) a circuit connected to said processor, said prefetch data read circuit and said prefetch data supply circuit and responsive to an interruption generated in said processor for saving first information specifying said group of data, second information specifying data not yet read from said storage device by said prefetch data read circuit among said group of data at occurrence of said interruption, and third information specifying data already supplied to said processor by said prefetch data supply circuit at occurrence of said interruption among data already read out by said prefetch data read circuit;

(c5) a circuit connected to said processor and responsive to completion of interruption processing executed by said processor for recovering said saved first to third information; and (c6) a circuit connected to said circuit for recovering and responsive to said recovered first to third data for sequentially prefetching part of said group of data from said storage device, said part of data including data already read from said storage device by said prefetch data read circuit but not yet supplied to said processor by said prefetch data supply circuit, until occurrence of said interruption, and said part of said group of data further including data not yet read from said storage device by said prefetch data read circuit among said group of data, until occurrence of said interruption.

* * * * *